(12) United States Patent
Niederst et al.

(10) Patent No.: US 11,525,018 B2
(45) Date of Patent: Dec. 13, 2022

(54) METHODS OF PREPARING COMPOSITIONS FOR CONTAINERS AND OTHER ARTICLES AND METHODS OF USING SAME

(71) Applicant: SWIMC LLC, Cleveland, OH (US)

(72) Inventors: Jeffrey Niederst, Pittsburgh, PA (US); Robert M. O'Brien, Monogahela, PA (US); Kevin Romagnoli, Coraopolis, PA (US); Mark S. Von Maier, Harmony, PA (US); Lan Deng, Solon, OH (US); Richard H Evans, Wexford, PA (US); David J. Santure, Gibsonia, PA (US); Benoit Prouvost, Nantes (FR)

( * ) Notice: Subject to any disclaimer, the term of this patent is extended or adjusted under 35 U.S.C. 154(b) by 0 days.

(21) Appl. No.: 16/994,624

(22) Filed: Aug. 16, 2020

(65) Prior Publication Data

US 2021/0130533 A1    May 6, 2021

Related U.S. Application Data

(60) Continuation of application No. 16/161,677, filed on Oct. 16, 2018, now Pat. No. 10,745,514, which is a division of application No. 15/290,765, filed on Oct. 11, 2016, now Pat. No. 10,113,027, which is a continuation of application No. PCT/US2015/025723, filed on Apr. 14, 2015.

(60) Provisional application No. 61/979,274, filed on Apr. 14, 2014.

(51) Int. Cl.
| | |
|---|---|
| *C08F 4/04* | (2006.01) |
| *C08L 71/00* | (2006.01) |
| *C09D 171/00* | (2006.01) |
| *C08F 220/18* | (2006.01) |
| *B65D 1/12* | (2006.01) |
| *B65D 25/14* | (2006.01) |
| *C08F 283/10* | (2006.01) |
| *C08G 59/06* | (2006.01) |
| *C08G 59/24* | (2006.01) |
| *C08G 59/62* | (2006.01) |
| *C08G 59/68* | (2006.01) |
| *C09D 5/08* | (2006.01) |
| *C09D 163/00* | (2006.01) |

(52) U.S. Cl.
CPC .................. *C08F 4/04* (2013.01); *B65D 1/12* (2013.01); *B65D 25/14* (2013.01); *C08F 220/1802* (2020.02); *C08F 283/10* (2013.01); *C08G 59/063* (2013.01); *C08G 59/245* (2013.01); *C08G 59/621* (2013.01); *C08G 59/686* (2013.01); *C08L 71/00* (2013.01); *C09D 5/08* (2013.01); *C09D 163/00* (2013.01); *C09D 171/00* (2013.01); *C08G 2150/90* (2013.01); *C08G 2390/40* (2013.01); *C08G 2650/56* (2013.01)

(58) Field of Classification Search
CPC .. C08G 59/063; C08G 59/245; C08G 59/621; C08G 59/686; C08G 2150/90; C08G 2390/40; C09D 163/00; C08F 283/10; B65D 25/14; B65D 1/12
See application file for complete search history.

(56) References Cited

U.S. PATENT DOCUMENTS

| | | |
|---|---|---|
| 1,011,302 A | 12/1911 | Abel, Jr. |
| 2,500,449 A | 3/1950 | Bradley |
| 2,528,933 A | 11/1950 | Wiles |
| 2,633,458 A | 3/1953 | Shokal |
| 2,681,901 A | 6/1954 | Wiles et al. |
| 2,694,694 A | 11/1954 | Owen et al. |
| 2,767,157 A | 10/1956 | Masters et al. |
| 2,824,855 A | 2/1958 | Freeman et al. |
| 2,951,778 A | 9/1960 | Haberlin |
| 3,006,891 A | 10/1961 | Leroy et al. |
| 3,041,300 A | 6/1962 | Morrison |
| 3,085,992 A | 4/1963 | Lee et al. |
| 3,102,043 A | 8/1963 | Arthur et al. |
| 3,121,727 A | 2/1964 | Baliker et al. |
| 31,221,727 | 2/1964 | Baliker et al. |
| 3,153,008 A | 10/1964 | Fox |
| 3,220,974 A | 11/1965 | Fox |
| 3,275,601 A | 9/1966 | Schnell et al. |
| 3,288,884 A | 11/1966 | Sonnabend et al. |
| 3,297,724 A | 1/1967 | Mcconnell et al. |
| 3,313,775 A | 4/1967 | Frankel |

(Continued)

FOREIGN PATENT DOCUMENTS

| | | |
|---|---|---|
| CA | 2378191 A1 | 1/2001 |
| CA | 2280409 A1 | 2/2001 |

(Continued)

OTHER PUBLICATIONS

"Poly(p-phenylene oxide)." Wikipedia: The Free Encyclopedia, (accessed Apr. 6, 2015), 3 pages.
Anon, "FAQs for Basic Plastic and Eastman Tritan™," Eastman Chemical, Tritan Safe, FAQS, Mar. 25, 2017, 2 pages.
Anon, "What's under the coat of Section 175.300?", Keller and Heckman, LLP, Nov. 1, 2002, 2 pages.
Application and File History for U.S. Appl. No. 13/570,632, filed Aug. 9, 2012, Inventors: Niederst, et al., 1250 pages.
Application and File History for U.S. Appl. No. 13/570,743, filed Aug. 9, 2012, Inventors: Niederst, et al., 571 pages.
Application and File History for U.S. Appl. No. 14/453,203, filed Aug. 6, 2014, Inventors: Niederst, et al., 572 pages.

(Continued)

*Primary Examiner* — Shane Fang
(74) *Attorney, Agent, or Firm* — Patterson Thuente IP

(57) ABSTRACT

This invention provides a polymer, which is preferably a polyether polymer. The polymer may be uses in coating compositions. Containers and other articles comprising the polymer and methods of making such containers and other articles are also provided. The invention further provides compositions including the polymer (e.g., powder coatings), which have utility in a variety of coating end uses, including, for example, valve and pipe coatings.

29 Claims, No Drawings

(56) References Cited

U.S. PATENT DOCUMENTS

| | | |
|---|---|---|
| 3,321,424 A | 5/1967 | Imes et al. |
| 3,366,600 A | 1/1968 | Haberlin et al. |
| 3,377,406 A | 4/1968 | Newey et al. |
| 3,379,684 A | 4/1968 | Wiesner et al. |
| 3,404,102 A | 10/1968 | Starcher et al. |
| 3,475,266 A | 10/1969 | Albert |
| 3,477,990 A | 11/1969 | Mark et al. |
| 3,480,695 A | 11/1969 | Warren |
| 3,491,111 A | 1/1970 | Lin |
| 3,491,112 A | 1/1970 | Lin |
| 3,491,116 A | 1/1970 | Lin |
| 3,509,174 A | 4/1970 | Lin |
| 3,553,119 A | 1/1971 | Wright et al. |
| 3,578,615 A | 5/1971 | Robert et al. |
| 3,624,107 A | 11/1971 | Lin |
| 3,627,787 A | 12/1971 | Lin |
| 3,641,011 A | 2/1972 | Lin et al. |
| 3,642,828 A | 2/1972 | Sheldon et al. |
| 3,681,390 A | 8/1972 | Lin |
| 3,775,424 A | 11/1973 | Farber |
| 3,853,869 A | 12/1974 | Farber |
| 3,876,606 A | 4/1975 | Kehr |
| 3,879,348 A | 4/1975 | Serini et al. |
| 3,888,812 A | 6/1975 | Plettner |
| 3,905,926 A | 9/1975 | D'Alelio |
| 3,920,510 A | 11/1975 | Hatano et al. |
| 3,943,187 A | 3/1976 | Wu et al. |
| 3,950,451 A | 4/1976 | Suzuki et al. |
| 3,959,571 A | 5/1976 | Yahagi et al. |
| RE28,862 E | 6/1976 | Siemonsen et al. |
| 3,971,808 A | 7/1976 | Baumann et al. |
| 3,984,363 A | 10/1976 | D'Alelio |
| 4,009,224 A | 2/1977 | Warnken |
| 4,011,184 A | 3/1977 | Van Reijendam et al. |
| 4,051,195 A | 9/1977 | McWhorter |
| 4,076,676 A | 2/1978 | Sommerfeld et al. |
| 4,076,764 A | 2/1978 | Bauer |
| 4,111,910 A | 9/1978 | Baggett |
| 4,122,060 A | 10/1978 | Yallourakis |
| 4,172,103 A | 10/1979 | Cohen et al. |
| 4,173,594 A | 11/1979 | Dyszlewski |
| 4,212,781 A | 7/1980 | Evans et al. |
| 4,247,439 A | 1/1981 | Matthews et al. |
| 4,283,428 A | 8/1981 | Birkmeyer |
| 4,285,847 A | 8/1981 | Ting et al. |
| 4,333,809 A | 6/1982 | Schreckenberg et al. |
| 4,340,716 A | 7/1982 | Hata et al. |
| 4,368,315 A | 1/1983 | Sikdar |
| 4,374,233 A | 2/1983 | Loucks et al. |
| 4,399,241 A | 8/1983 | Ting et al. |
| 4,413,015 A | 11/1983 | Anderson et al. |
| 4,446,258 A | 5/1984 | Chu et al. |
| 4,468,483 A | 8/1984 | Yeakey et al. |
| 4,476,262 A | 10/1984 | Chu et al. |
| 4,487,861 A | 12/1984 | Winner |
| 4,510,513 A | 4/1985 | Yamaguchi et al. |
| 4,517,322 A | 5/1985 | Birkmeyer et al. |
| 4,522,961 A | 6/1985 | Martino et al. |
| 4,522,984 A | 6/1985 | Watanabe et al. |
| 4,552,814 A | 11/1985 | Cavitt et al. |
| 4,564,655 A | 1/1986 | Liu |
| 4,600,737 A | 7/1986 | Georgalas et al. |
| 4,622,368 A | 11/1986 | Verbicky, Jr. et al. |
| 4,647,612 A | 3/1987 | Ranka et al. |
| 4,665,149 A | 5/1987 | Bertram et al. |
| 4,707,534 A | 11/1987 | Schultz |
| 4,729,983 A | 3/1988 | Satake et al. |
| 4,757,132 A | 7/1988 | Brunelle et al. |
| 4,794,102 A | 12/1988 | Petersen et al. |
| 4,794,156 A | 12/1988 | Ho et al. |
| 4,806,597 A | 2/1989 | Gallucci et al. |
| 4,849,502 A | 7/1989 | Evans et al. |
| 4,880,892 A | 11/1989 | Urano et al. |
| 4,963,602 A | 10/1990 | Patel |
| 4,994,217 A | 2/1991 | Banevicius et al. |
| 5,010,147 A | 4/1991 | Westeppe et al. |
| 5,068,284 A | 11/1991 | Ullman et al. |
| 5,080,961 A | 1/1992 | Macy et al. |
| 5,102,608 A | 4/1992 | Frencken et al. |
| 5,115,082 A | 5/1992 | Mercer et al. |
| 5,162,406 A | 11/1992 | Meyer et al. |
| 5,201,436 A | 4/1993 | Owens et al. |
| 5,212,241 A | 5/1993 | Woo et al. |
| 5,264,503 A | 11/1993 | Marx et al. |
| 5,288,839 A | 2/1994 | Greco |
| 5,296,525 A | 3/1994 | Spencer et al. |
| 5,310,854 A | 5/1994 | Heinmeyer et al. |
| 5,387,625 A | 2/1995 | Parekh et al. |
| 5,446,009 A | 8/1995 | Minami et al. |
| 5,494,950 A | 2/1996 | Asakage et al. |
| 5,496,921 A | 3/1996 | Sakashita et al. |
| 5,527,840 A | 6/1996 | Chutko et al. |
| 5,567,781 A | 10/1996 | Martino et al. |
| 5,571,907 A | 11/1996 | Sachinvala et al. |
| 5,576,413 A | 11/1996 | Bussink et al. |
| 5,591,788 A | 1/1997 | Anderson et al. |
| 5,612,394 A | 3/1997 | Pfeil et al. |
| 5,623,031 A | 4/1997 | Imura et al. |
| 5,654,382 A | 8/1997 | Dubois et al. |
| 5,677,398 A | 10/1997 | Motoshima et al. |
| 5,686,185 A | 11/1997 | Correll et al. |
| 5,718,352 A | 2/1998 | Diekhoff et al. |
| 5,718,353 A | 2/1998 | Kanfer et al. |
| 5,803,301 A | 9/1998 | Sato et al. |
| 5,807,912 A | 9/1998 | Wu et al. |
| 5,811,498 A | 9/1998 | Perumal et al. |
| 5,830,952 A | 11/1998 | Pedersen et al. |
| 5,859,172 A | 1/1999 | Sakashita et al. |
| 5,872,196 A | 2/1999 | Murata et al. |
| 5,880,248 A | 3/1999 | Sakashita et al. |
| 5,916,933 A | 6/1999 | Johnson et al. |
| 5,922,817 A | 7/1999 | Pedersen et al. |
| 5,925,694 A | 7/1999 | Stengel-Rutkowski et al. |
| 5,962,622 A | 10/1999 | Darnell et al. |
| 5,994,462 A | 11/1999 | Srinivasan et al. |
| 6,008,273 A | 12/1999 | Leibelt et al. |
| 6,034,157 A | 3/2000 | Craun et al. |
| 6,043,333 A | 3/2000 | Kuboki et al. |
| 6,046,284 A | 4/2000 | Shinohara et al. |
| 6,048,931 A | 4/2000 | Fujita et al. |
| 6,060,577 A | 5/2000 | Davis |
| 6,133,402 A | 10/2000 | Coates et al. |
| 6,201,070 B1 | 3/2001 | Kumabe et al. |
| 6,225,436 B1 | 5/2001 | Eiffler et al. |
| 6,242,533 B1 | 6/2001 | Kurimoto et al. |
| 6,306,934 B1 | 10/2001 | Bode et al. |
| 6,376,021 B1 | 4/2002 | Spellane |
| 6,382,454 B1 | 5/2002 | Buffard et al. |
| 6,399,738 B1 | 6/2002 | Ito |
| 6,451,878 B1 | 9/2002 | Fukuzawa et al. |
| 6,451,926 B1 | 9/2002 | Kuo et al. |
| 6,458,439 B1 | 10/2002 | Jung et al. |
| 6,469,127 B1 | 10/2002 | Furunaga et al. |
| 6,472,472 B2 | 10/2002 | Jung et al. |
| 6,566,426 B1 | 5/2003 | Kanaida et al. |
| 6,576,718 B1 | 6/2003 | Yeager et al. |
| 6,579,829 B2 | 6/2003 | Nishimura et al. |
| 6,608,163 B2 | 8/2003 | Bailly et al. |
| 6,660,688 B2 | 12/2003 | Yamada et al. |
| 6,706,350 B2 | 3/2004 | Sato et al. |
| 6,777,464 B1 | 8/2004 | Watanabe et al. |
| 6,784,228 B2 | 8/2004 | Ogura et al. |
| 6,794,445 B2 | 9/2004 | Reusmann et al. |
| 6,808,752 B2 | 10/2004 | Mallen |
| 6,833,398 B2 | 12/2004 | Agarwal et al. |
| 6,844,071 B1 | 1/2005 | Wang et al. |
| 6,894,093 B2 | 5/2005 | Bittner |
| 6,916,874 B2 | 7/2005 | Mazza et al. |
| 6,924,328 B2 | 8/2005 | Legleiter et al. |
| 6,984,262 B2 | 1/2006 | King et al. |
| 6,984,608 B2 | 1/2006 | Makitalo et al. |
| 7,022,765 B2 | 4/2006 | Adedeji et al. |
| 7,037,584 B2 | 5/2006 | Wind et al. |
| 7,063,914 B2 | 6/2006 | Kawano et al. |

(56) References Cited

U.S. PATENT DOCUMENTS

| | | |
|---|---|---|
| 7,078,077 B2 | 7/2006 | Lynch et al. |
| 7,150,902 B2 | 12/2006 | Farha |
| 7,157,119 B2 | 1/2007 | Tang et al. |
| 7,189,787 B2 | 3/2007 | O'Brien et al. |
| 7,198,849 B2 | 4/2007 | Stapperfenne et al. |
| 7,208,538 B2 | 4/2007 | Taylor et al. |
| 7,256,228 B2 | 8/2007 | Agarwal et al. |
| 7,261,843 B2 | 8/2007 | Knox et al. |
| 7,262,261 B2 | 8/2007 | Brindopke et al. |
| 7,266,261 B2 | 9/2007 | Vidal et al. |
| 7,332,557 B2 | 2/2008 | Shinohara et al. |
| 7,332,560 B2 | 2/2008 | Heuer et al. |
| 7,397,139 B2 | 7/2008 | Ikezawa et al. |
| 7,446,234 B2 | 11/2008 | More et al. |
| 7,544,727 B2 | 6/2009 | Ikezawa et al. |
| 7,585,904 B2 | 9/2009 | Nakamura |
| 7,592,047 B2 | 9/2009 | O'Brien et al. |
| 7,619,056 B2 | 11/2009 | East et al. |
| 7,635,662 B2 | 12/2009 | Kabashima et al. |
| 7,666,953 B2 | 2/2010 | Nakamura et al. |
| 7,675,185 B2 | 3/2010 | Tendou et al. |
| 7,682,674 B2 | 3/2010 | Vogt et al. |
| 7,709,582 B2 | 5/2010 | Kouchi et al. |
| 7,803,439 B2 | 9/2010 | Crawford et al. |
| 7,803,440 B2 | 9/2010 | Crawford et al. |
| 7,820,772 B2 | 10/2010 | Usui et al. |
| 7,838,577 B2 | 11/2010 | Hayakawa et al. |
| 7,846,998 B2 | 12/2010 | Akagi et al. |
| 7,910,170 B2 | 3/2011 | Evans et al. |
| 7,915,743 B2 | 3/2011 | Ishizawa et al. |
| 7,981,511 B2 | 7/2011 | Maenaka et al. |
| 7,981,515 B2 | 7/2011 | Ambrose et al. |
| 7,985,522 B2 | 7/2011 | Tajima et al. |
| 8,013,052 B2 | 9/2011 | Nakamura et al. |
| 8,110,614 B2 | 2/2012 | Ito et al. |
| 8,129,495 B2 | 3/2012 | Evans et al. |
| 8,142,858 B2 | 3/2012 | Mayr et al. |
| 8,168,276 B2 | 5/2012 | Cleaver et al. |
| 8,168,721 B2 | 5/2012 | Marsh et al. |
| 8,178,598 B2 | 5/2012 | Hakuya |
| 8,367,171 B2 | 2/2013 | Stenson et al. |
| 8,449,960 B2 | 5/2013 | Skillman et al. |
| 8,465,846 B2 | 6/2013 | O'Brien et al. |
| 8,492,467 B2 | 7/2013 | Yamaguchi |
| 8,519,085 B2 | 8/2013 | Evans et al. |
| 8,927,075 B2 | 1/2015 | Gibanel et al. |
| 9,029,461 B2 | 5/2015 | Marsh et al. |
| 9,249,237 B2 | 2/2016 | Perichaud et al. |
| 9,303,184 B2 | 4/2016 | Kainz et al. |
| 9,409,219 B2 | 8/2016 | Niederst et al. |
| 9,475,328 B2 | 10/2016 | Niederst et al. |
| 9,540,484 B2 | 1/2017 | Craun et al. |
| 9,605,177 B2 | 3/2017 | Tang et al. |
| 9,724,276 B2 | 8/2017 | Niederst et al. |
| 9,944,749 B2 | 4/2018 | Niederst et al. |
| 10,113,027 B2 | 10/2018 | Niederst et al. |
| 10,294,388 B2 | 5/2019 | Niederst et al. |
| 10,435,199 B2 | 10/2019 | Niederst et al. |
| 2001/0053449 A1 | 12/2001 | Parekh et al. |
| 2003/0087208 A1 | 5/2003 | Bourdelais et al. |
| 2003/0170396 A1 | 9/2003 | Yokoi et al. |
| 2003/0171527 A1 | 9/2003 | Burgoyne et al. |
| 2003/0181628 A1 | 9/2003 | Horn et al. |
| 2003/0203991 A1 | 10/2003 | Schottman et al. |
| 2003/0209553 A1 | 11/2003 | Horn et al. |
| 2003/0232145 A1 | 12/2003 | Inomata et al. |
| 2004/0044101 A1 | 3/2004 | Hirose et al. |
| 2004/0092674 A1 | 5/2004 | Brindopke et al. |
| 2004/0110908 A1 | 6/2004 | Idemura et al. |
| 2004/0171746 A1 | 9/2004 | Parekh et al. |
| 2004/0176563 A1 | 9/2004 | Shinohara et al. |
| 2004/0214916 A1 | 10/2004 | Patel et al. |
| 2004/0214926 A1 | 10/2004 | Bittner |
| 2004/0220372 A1 | 11/2004 | Qi et al. |
| 2005/0014004 A1 | 1/2005 | King et al. |
| 2005/0075465 A1 | 4/2005 | Bolle et al. |
| 2005/0090044 A1 | 4/2005 | Kayaba et al. |
| 2005/0090593 A1 | 4/2005 | Heuer et al. |
| 2005/0131195 A1 | 6/2005 | Asakage et al. |
| 2005/0196629 A1 | 9/2005 | Bariatinsky et al. |
| 2005/0215670 A1 | 9/2005 | Shimasaki et al. |
| 2006/0025559 A1 | 2/2006 | Wehrmann et al. |
| 2006/0052523 A1 | 3/2006 | Bushendorf et al. |
| 2006/0093768 A1 | 5/2006 | Parekh et al. |
| 2006/0134541 A1 | 6/2006 | Fujii et al. |
| 2006/0142442 A1 | 6/2006 | Scherzer et al. |
| 2007/0008714 A1 | 1/2007 | Kilfedder |
| 2007/0036903 A1 | 2/2007 | Mayr et al. |
| 2007/0065589 A1 | 3/2007 | Florian |
| 2007/0065608 A1 | 3/2007 | Niederst |
| 2007/0087146 A1 | 4/2007 | Evans et al. |
| 2007/0099130 A1 | 5/2007 | Takahashi et al. |
| 2007/0141356 A1 | 6/2007 | Fugier et al. |
| 2007/0154643 A1 | 7/2007 | Schmid et al. |
| 2007/0281179 A1 | 12/2007 | Ambrose et al. |
| 2008/0009599 A1 | 1/2008 | East et al. |
| 2008/0033080 A1 | 2/2008 | Mader et al. |
| 2008/0171195 A1 | 7/2008 | Gothlich et al. |
| 2008/0193689 A1 | 8/2008 | Masselin et al. |
| 2008/0233390 A1 | 9/2008 | Gothlich et al. |
| 2008/0246173 A1 | 10/2008 | Braidwood et al. |
| 2008/0251757 A1 | 10/2008 | Yamamoto et al. |
| 2008/0319102 A1 | 12/2008 | Eckert et al. |
| 2008/0319156 A1 | 12/2008 | Fischer et al. |
| 2009/0036631 A1 | 2/2009 | Kaji et al. |
| 2009/0068473 A1 | 3/2009 | Van Wessel et al. |
| 2009/0088535 A1 | 4/2009 | Arita et al. |
| 2009/0092827 A1 | 4/2009 | Robinson |
| 2009/0158963 A1 | 6/2009 | O'Dell et al. |
| 2009/0198005 A1 | 8/2009 | Brandenburger et al. |
| 2009/0247032 A1 | 10/2009 | Mori et al. |
| 2009/0280423 A1 | 11/2009 | Yahiro et al. |
| 2009/0281224 A1 | 11/2009 | Koh et al. |
| 2009/0326107 A1 | 12/2009 | Bittner |
| 2010/0056663 A1 | 3/2010 | Ito et al. |
| 2010/0056721 A1 | 3/2010 | Wright et al. |
| 2010/0056726 A1 | 3/2010 | Payot et al. |
| 2010/0068433 A1 | 3/2010 | Gibanel et al. |
| 2010/0086716 A1 | 4/2010 | Ruediger et al. |
| 2010/0143681 A1 | 6/2010 | Yano et al. |
| 2010/0285309 A1 | 11/2010 | Barriau et al. |
| 2011/0042338 A1 | 2/2011 | Pecorini et al. |
| 2011/0160408 A1 | 6/2011 | De Brouwer et al. |
| 2011/0294921 A1 | 12/2011 | Smith |
| 2011/0315591 A1 | 12/2011 | Lespinasse et al. |
| 2012/0071599 A1 | 3/2012 | Yamaguchi et al. |
| 2012/0125800 A1 | 5/2012 | Doreau et al. |
| 2012/0149340 A1 | 6/2012 | Selph et al. |
| 2012/0165429 A1 | 6/2012 | Boutevin et al. |
| 2012/0172568 A1 | 7/2012 | Ueda |
| 2012/0282475 A1 | 11/2012 | Fuhry et al. |
| 2012/0301645 A1 | 11/2012 | Moussa et al. |
| 2012/0301646 A1 | 11/2012 | List et al. |
| 2012/0301647 A1 | 11/2012 | Moussa et al. |
| 2012/0302690 A1 | 11/2012 | Cunningham et al. |
| 2013/0052381 A1 | 2/2013 | Gallucci et al. |
| 2013/0196037 A1 | 8/2013 | O'Brien et al. |
| 2013/0206756 A1 | 8/2013 | Niederst et al. |
| 2013/0280455 A1* | 10/2013 | Evans .................. B21D 31/00 72/46 |
| 2013/0316109 A1 | 11/2013 | Niederst et al. |
| 2013/0324652 A1 | 12/2013 | Pompignano et al. |
| 2014/0113093 A1 | 4/2014 | Corbin et al. |
| 2014/0322465 A1 | 10/2014 | Kaleem et al. |
| 2014/0322641 A1 | 10/2014 | Zhou et al. |
| 2014/0378565 A1 | 12/2014 | Gelmont et al. |
| 2015/0021323 A1 | 1/2015 | Niederst et al. |
| 2015/0151878 A1 | 6/2015 | Niederst et al. |
| 2015/0197657 A1 | 7/2015 | Niederst et al. |
| 2015/0203713 A1 | 7/2015 | Niederst et al. |
| 2016/0027257 A1 | 1/2016 | Yoseloff et al. |
| 2016/0075923 A1 | 3/2016 | Schmidt |
| 2016/0107818 A1 | 4/2016 | Kaleem et al. |
| 2016/0122581 A1 | 5/2016 | You et al. |

(56) References Cited

U.S. PATENT DOCUMENTS

| | | |
|---|---|---|
| 2016/0272576 A1 | 9/2016 | Gibanel et al. |
| 2017/0029657 A1 | 2/2017 | Niederst et al. |
| 2017/0051177 A1 | 2/2017 | Prouvost et al. |
| 2017/0088745 A1 | 3/2017 | Matthieu et al. |
| 2017/0096521 A1 | 4/2017 | Niederst et al. |
| 2018/0112101 A1 | 4/2018 | Evans et al. |
| 2018/0112102 A1 | 4/2018 | Evans et al. |
| 2018/0346199 A1 | 12/2018 | Niederst et al. |
| 2019/0031816 A1 | 1/2019 | Evans |
| 2019/0048126 A1 | 2/2019 | Niederst et al. |
| 2019/0241764 A1 | 8/2019 | Niederst et al. |

FOREIGN PATENT DOCUMENTS

| | | |
|---|---|---|
| CA | 2570312 A1 | 1/2006 |
| CA | 2280409 C | 5/2008 |
| CN | 1360619 A | 7/2002 |
| CN | 1363619 A | 8/2002 |
| CN | 1402767 A | 3/2003 |
| CN | 1935392 A | 3/2007 |
| CN | 1976581 A | 6/2007 |
| CN | 101096411 A | 1/2008 |
| CN | 101244290 A | 8/2008 |
| CN | 101370884 A | 2/2009 |
| CN | 101484548 A | 7/2009 |
| CN | 102858893 A | 1/2013 |
| CN | 103347967 A | 10/2013 |
| CN | 104479105 A | 4/2015 |
| EP | 0265791 A2 | 5/1988 |
| EP | 0475359 A2 | 3/1992 |
| EP | 0620238 A2 | 10/1994 |
| EP | 0185118 B1 | 9/1995 |
| EP | 0736052 B1 | 8/1999 |
| EP | 1333075 A1 | 8/2003 |
| EP | 1818350 A1 | 8/2007 |
| JP | S63165378 A | 7/1988 |
| JP | S63304068 A | 12/1988 |
| JP | H0255727 A | 2/1990 |
| JP | H0376770 A | 4/1991 |
| JP | H04120124 A | 4/1992 |
| JP | H04366124 A | 12/1992 |
| JP | H07109328 A | 4/1995 |
| JP | H07126574 A | 5/1995 |
| JP | H07138502 A | 5/1995 |
| JP | H07196770 A | 8/1995 |
| JP | H08151428 A | 6/1996 |
| JP | H08230328 A | 9/1996 |
| JP | H10316717 A | 12/1998 |
| JP | 2000005019 A | 1/2000 |
| JP | 2000007757 | 1/2000 |
| JP | 2000007891 | 1/2000 |
| JP | 2001526716 A | 12/2001 |
| JP | 2002097250 A | 4/2002 |
| JP | 2002097409 A | 4/2002 |
| JP | 2002138245 A | 5/2002 |
| JP | 2002155727 A | 5/2002 |
| JP | 2002220563 A | 8/2002 |
| JP | 2002316963 A | 10/2002 |
| JP | 2003012763 A | 1/2003 |
| JP | 2003176348 A | 6/2003 |
| JP | 2003178348 A | 6/2003 |
| JP | 2003183352 A | 7/2003 |
| JP | 3484546 B2 | 1/2004 |
| JP | 2004002635 A | 1/2004 |
| JP | 2004010874 | 1/2004 |
| JP | 2004010874 A | 1/2004 |
| JP | 2004053016 A | 2/2004 |
| JP | 2005298594 A | 10/2005 |
| JP | 2005320446 A | 11/2005 |
| JP | 2006176658 A | 7/2006 |
| JP | 2008151428 A | 7/2008 |
| JP | 2010064293 A | 3/2010 |
| JP | 2011207932 | 10/2011 |
| KR | 100804293 B1 | 2/2008 |
| KR | 20130061132 A | 6/2013 |
| WO | WO-9526997 A1 | 10/1995 |
| WO | WO-9728905 A1 | 8/1997 |
| WO | WO-0071337 A1 | 11/2000 |
| WO | WO-0105901 A1 | 1/2001 |
| WO | 0125358 A1 | 4/2001 |
| WO | WO-2004050740 A1 | 6/2004 |
| WO | WO-2007048094 A2 | 4/2007 |
| WO | WO-2007054304 A1 | 5/2007 |
| WO | WO-2008137562 A1 | 11/2008 |
| WO | WO-2009015493 A1 | 2/2009 |
| WO | WO-2009036790 A1 | 3/2009 |
| WO | WO-2009089145 A1 | 7/2009 |
| WO | 2010118343 A1 | 10/2010 |
| WO | WO-2010118349 A1 | 10/2010 |
| WO | WO-2010118356 A1 | 10/2010 |
| WO | WO-2010134608 A1 | 11/2010 |
| WO | 2011068644 A1 | 6/2011 |
| WO | WO-2011130671 A2 | 10/2011 |
| WO | 2012044458 A1 | 4/2012 |
| WO | WO-2012091701 A1 | 7/2012 |
| WO | WO-2012109278 A2 | 8/2012 |
| WO | WO-2012149340 A1 | 11/2012 |
| WO | WO-2012151184 A1 | 11/2012 |
| WO | WO-2012161758 A2 | 11/2012 |
| WO | WO-2012162298 A1 | 11/2012 |
| WO | WO-2012162299 A1 | 11/2012 |
| WO | WO-2013028607 A1 | 2/2013 |
| WO | WO-2013119686 A1 | 8/2013 |
| WO | WO-2013149234 A2 | 10/2013 |
| WO | WO-2013169459 A1 | 11/2013 |
| WO | WO-2014025997 A1 | 2/2014 |
| WO | 2014078618 A1 | 5/2014 |
| WO | WO-2014140233 A1 | 9/2014 |
| WO | WO-2014140234 A1 | 9/2014 |
| WO | WO-2016201407 A1 | 12/2016 |

OTHER PUBLICATIONS

Application and File History for U.S. Appl. No. 14/616,175, filed Feb. 6, 2015, Inventors: Niederst, et al., 143 pages.

Application and File History for U.S. Appl. No. 15/204,559, filed Jul. 7, 2016, Inventors: Niederst, et al., 195 pages.

Application and File History for U.S. Appl. No. 15/290,765, filed Oct. 11, 2016, Inventors: Niederst, et al., 215 pages.

Application and File History for U.S. Appl. No. 15/773,093, filed May 2, 2018, Inventors: Evans, et al., 249 pages.

Application and File History for U.S. Appl. No. 15/803,127, filed Nov. 3, 2017, Inventors: Evans, at al. 227 pages.

Application and File History for U.S. Appl. No. 15/803,657, filed Nov. 3, 2017, Inventors: Evans, et al., 221 pages.

Application and File History for U.S. Appl. No. 16/057,469, filed Aug. 7, 2018, Inventors: Niederst, et al., 111 pages.

Application and File History for U.S. Appl. No. 16/161,677, filed Oct. 16, 2018, Inventors: Niederst, et al., 188 pages.

Blaustein, "An estrogen by any other name . . . ," Endocrinology, Jun. 2008, 149(6):2697-2698.

Can Ends Product Brochure, www.canends.com, 2016, 36 pages.

CN Patent Application No. 201610835512.9, First Office Action dated Oct. 31, 2018, 7 pages.

Dow Chemical Company., D.E.N.™ 438 Epoxy Novolac Resin Product Data Sheet, 3 pages, (2012).

Dow Chemical Company., D.E.R.™ 331 Liquid Epoxy Resin Product Data Sheet, 5 pages, (2012).

Dow Chemical Company., D.E.R.™ 383 Liquid Epoxy Resin Product Data Sheet, 3 pages, (2009).

Eastman, "Eastman Tritan™ Copolyester—Lack of Estrogen and Testosterone Activity," TRS-270, Apr. 2010, 3 pages.

Epoxy Resins, J. S. Massingill ed., pp. 393-424, Applied Polymer Science: 21st Century, 2000.

ERL-4221 (3,4-Epoxycyclohexanemethyl 3,4-epoxycyclohexanecarboxylate) Product Data sheet, Polysciences, Inc., (2017), 3 pages.

ERL-4299 Bis (3,4-Epoxycycloheylmethy) adipate, Product Data sheet, ChemNet™ (2019), 2 pages.

(56) References Cited

OTHER PUBLICATIONS

Examination Report for Indian Application No. 6558/DELNP/2013, dated Aug. 31, 2018, 5 pages.
Extended European Search Report for Application No. 18197657.2, dated Mar. 18, 2019, 7 pages.
Extended European Search Report for Application No. 19195021.1, dated Jan. 20, 2020, 6 pages.
First Office Action dated Feb. 25, 2019 for Chinese Application No. 201710250900.5, 11 pages.
Geueke, "Can Coatings," Food Packaging Forum, Dec. 15, 2016, url: https://www.foodpackaingforum.org/food-packaging-health/can-coatings, 4 pages.
Grese et al., "Selective Estrogen Receptor Modulators (SERMs)," Current Pharmaceutical Design, 1998, 4, 71-92.
Honshu Chemical Industry Website, http://www.honshuchemical.co.jp/en/product list_06.html, Apr. 23, 2018, 2 pages.
International Preliminary Report on Patentability for Application No. PCT/US2012/024193, dated Aug. 22, 2013, 6 pages.
Jungang, "Kinetics of Epoxy Resins Formation from Bisphenol-A, Bisphenol-S, and Epichlorohydrin", Journal of Applied Polymer Science, (Dec. 31, 1993), vol. 48, pp. 237-241, XP055382541.
Kojima et al., "Profiling of bisphenol A and eight of its analogues on transcriptional activity via human nuclear receptors," Tosicology, 413 (2019) 48-55.
Lei et al., "Activation of G Protein-coupled Receptor 30 by Thiodiphenol Promotes Proliferation of estrogen receptor alpha-positive breast cancer cells," Chemosphere, 169 (2017) 204-211.
Liu Z., et al., "Preparation, Characterization and Thermal Properties of Tetramethylbisphenol F Exposy Resin and Mixed Systems," Polymer International, Apr. 2012, vol. 61 (4), pp. 565-570.
Manling S., "Application Principle and Technology of Epoxy Resin," China Machine Press, 2002, 16 pages (including 9 pages of translation).
Maruyama et al., Structure-activity relationships of bisphenol A analogs at estrogen receptors (ERs): Discovery of an ERalpha-selective antagonist, Bioorganic & Medicinal Chemistry Letters, 23 (2013) 4031-4036.
Matasa, et al., "A wish list for orthodontic materials, 2005," The Orthodontic Materials Insider, Dec. 2004, vol. 16 Nr. 4 (8 pages).
Moss, Extension and Revision of the Von Baeyer System for Naming Polycyclic Compounds (Including Bicyclic Compounds), IUPAC Recommendations 1999, Pure Appl. Chem., vol. 71, No. 3, pp. 513-529, 1999 (17 pages).
Nippon Kasei Chemical, "Flame Retardant Bisphenol F" (2 pages)2014.
NORYL™ Resin GFN2, Polyphenylene Ether + PS, Product Data Sheet, 4 pages, (2018).
Notice of Acceptance dated Oct. 17, 2020 for Australian Patent Application No. 2020201397, 4 pages.
Notice of Reasons for Refusal dated Mar. 27, 2018 for Japanese Application No. 2017064686, 10 pages.
Notice of Reasons for Rejection dated Sep. 6, 2019 for Japanese Application No. 2013-552734, 5 pages.
Notice of Reasons for Rejection for Japanese Patent Application No. 2019-112665, dated Aug. 24, 2018, 9 pages.
Notice of Termination of Reconsideration by Examiners before Appeal Proceedings for Japanese Patent Application No. 2017-64686, dated Sep. 3, 2019, 7 pages.
Office Action for Brazilian Application No. BR112012026240-8, dated Aug. 6, 2020, 4 pages.
Office Action for Brazilian Application No. BR112013020026-0 dated Dec. 11, 2020, 3 pages.
Office Action for Brazilian Application No. BR122015001646-0 dated Mar. 13, 2020, 7 pages.
CertiChem Inc., "Test Method Nomination: MCF-7 Cell Proliferation Assay of Estrogenic Activity," National Toxicology Program Interagency Center for the Evaluation of Alternative Toxicological Methods (NICEATM), Jan. 2006, 102 pages, Retrieved from the Internet [URL: https://ntp.niehs.nih.gov/iccvam/methods/endocrine/endodocs/submdoc.pdf].
Declaration of Dr. Larry B. Brandenburger under 37 C.P.R. §1.132 for Control No. 95/001,950 Concerning Inter Partes Reexamination of U.S. Pat. No. 8,092,876, 12 pages.
Dow Chemical Company., "D.E.R.™ 661, Solid Epoxy Resin," Product Information, Form No. 296-01462-1007X-TD, 3 pages.
DYTEK® A-Amine, Downloaded from the Oct. 16, 2014, Internet Archives capture at [https://web.archive.org/web/20141016043145/http://dytek.invista.com/Products/Amines/dytek-a-amine].
European Search Report for Application No. 12744671.4, dated Dec. 17, 2015, 5 pages.
European Search Report for Application No. 12790169.2, dated Nov. 26, 2015, 5 pages.
European Search Report for Application No. 17182623.3, dated Oct. 11, 2017, 8 pages.
Extended European Search Report for Application No. 15779232.6, dated Feb. 23, 2018, 13 pages.
Extended European Search Report for Application No. EP13827304, dated Mar. 21, 2016, 11 pages.
Fang H., et al., "Quantitative Comparisons of in Vitro Assays for Estrogenic Activities," Environmental Health Perspectives, Aug. 2000, vol. 108 (8), pp. 723-729.
Fang H., et al., "Structure-Activity Relationships for a Large Diverse Set of Natural, Synthetic, and Environmental Estrogens," Chemical Research in Toxicology, Mar. 2001, vol. 14(3), pp. 280-294.
First Office Action dated Oct. 31, 2018 for Chinese Application No. 201610835512.9, 7 pages.
"Flame Retardant Bisphenol F", Product Information Sheets, Nippon Kasei Chemical, 2013, 2 pages.
Flick E.W., "Epoxy Resins, Curing Agents, Compounds, and Modifiers—An Industrial Guide," Second Edition, 1993, 10 pages, available at http://www.daryatamin.com/uploads/Books%20File/Epoxy%20Resins,%20Curing%20Agents,%20Compounds,%20and%20Modifiers%20An%20Industrial%20Guide.pdf.
GRACE DAREX® Packaging Technologies, A Global Partner for Your Global Business, Product Book, 2006, 4 pages.
Guilin, et al., "Environmentally friendly paint formulation design," Chemical Industry Press, ISBN: 978-7-5025-9943-0, 2007, pp. 207-209 (6 pages).
Hashimoto Y., et al., "Measurement of Estrogenic Activity of Chemicals for the Development of New Dental Polymers," Toxicology in Vitro, 2001, vol. 15 (4-5), pp. 421-425.
International Preliminary Report on Patentability for Application No. PCT/US2011/032738, dated Oct. 26, 2012, 5 pages.
International Preliminary Report on Patentability for Application No. PCT/US2012/024191, dated Aug. 22, 2013, 7 pages.
International Preliminary Report on Patentability for Application No. PCT/US2012/024193, dated Aug. 22, 2013, 7 pages.
International Preliminary Report on Patentability for Application No. PCT/US2013/024960, dated Aug. 21, 2014, 9 pages.
International Preliminary Report on Patentability for Application No. PCT/US2016/060332, dated May 17, 2018, 8 pages.
International Search Report and Written Opinion for Application No. PCT/US2011/032738 dated Jan. 18, 2012, 13 pages.
International Search Report and Written Opinion for Application No. PCT/US2012/024191, dated Dec. 28, 2012, 13 pages.
International Search Report and Written Opinion for Application No. PCT/US2012/024193 dated Oct. 31, 2012, 9 pages.
International Search Report and Written Opinion for Application No. PCT/US2013/024960, dated May 31, 2013, 11 pages.
International Search Report and Written Opinion for Application No. PCT/US2013/054132, dated Oct. 23, 2013, 10 pages.
International Search Report and Written Opinion for Application No. PCT/US2015/025723, dated Jun. 29, 2015, 16 pages.
International Search Report and Written Opinion for Application No. PCT/US2016/060332, dated Feb. 12, 2017, 10 pages.
Jungang G., "Kinetics of Epoxy Resins Formation from Bisphenol-A,Bisphenol-S, and Epichlorohydrin," Journal of Applied Polymer Science, vol. 48, 1993, pp. 237-241.
Kitamura S., et al., "Comparative Study of the Endocrine-Disrupting Activity of Bisphenol A and 19 Related Compounds," Toxicological Sciences, Jan. 5, 2005, vol. 84 (2), pp. 249-259.

(56) References Cited

OTHER PUBLICATIONS

Kobayashi S., et al., "Stereo Structure-Controlled and Electronic Structure-Controlled Estrogen-Like Chemicals to Design and Develop Non-estrogenic Bisphenol A Analogs Based on Chemical Hardness Concept," Chemical & Pharmaceutical Bulletin,Dec. 2006, vol. 54 (12), pp. 1633-1638.
Matasa C.G., et al., "A Wish List for Orthodontic Materials, 2005," The Orthodontic Materials Insider, Dec. 2004, vol. 16 (4), 8 pages.
Matsumoto S., et al., "The Crystal Structure of Two New Developers for High-Performance Thermo-Sensitive Paper: H-Bonded Network in Urea-Urethane Derivatives," Dyes and Pigments, May 2010, vol. 85 (3), pp. 139-142.
Mendum T., et al., "Concentration of Bisphenol A in Thermal Paper," Green Chemistry Letters and Reviews, Research Letter, Mar. 2011, vol. 4 (1), pp. 81-86.
Mesnage, et al., "Transcriptome Profiling Reveals Bisphenol A Alternatives Activate Estrogen Receptor Alpha in Human Breast Cancer Cells," Toxicological Sciences, 2017, vol. 158(2), pp. 431-443.
Meti, "Current Status of Testing Methods Development For Endocrine Distrupters," 6th Meeting of the Task Force on Edocrine Distrupters Testing and Assessment (EDTA), Tokyo, Ministry of Economy, Trade and Industry, Japan, Jun. 24-25, 2002, 70 pages.
Momentive Specialty Chemicals Inc . . . , "EPON™ and EPI-REZ™ Epoxy Resins," Product Selector, Aug. 2013, 16 pages.
Moss G.P., "Extension and Revision of the Von Baeyer System for Naming Polycyclic Compounds (Including Bicyclic Compounds)," Pure and Applied Chemistry, 1999, vol. 71 (3), pp. 513-529.
Olsen C.M., et al., "Effects of the Environmental Oestrogens Bisphenol A, Tetrachlorobisphenol A, Tetrabromobisphenol A, 4-Hydroxybiphenyl and 4,4'-Dihydroxybiphenyl on Oestrogen Receptor Binding, Cell Proliferation and Regulation of Oestrogen Sensitive Proteins in the Human Breast Cancer Cell Line MCF-7," Pharmacology and Toxicology, Apr. 2003, vol. 92 (4), pp. 180-188.
Parent Application, U.S. Appl. No. 13/651,796, Evans et al., filed Oct. 15, 2012.
Polycarbonates, 4th-5th Edition, Kirk-Othmer Encyclopedia of Chemical Technology, 2000, pp. 1-30.
Poly(p-phenylene oxide), Wikipedia: The Free Encyclopedia, accessed Apr. 6, 2015, http://en.wikipedia.org/wiki/Poly(p-phenylene_oxide, 3 pages.
Porter D.S., et al., "Hot-Fill Containers," New Tech for OPP & PET, Plastics Technology, Eastman Chemical Co., Dec. 2007, 6 pages.
Ravdin, et al., "Estrogenic Effects Of Phenolphthalein On Human Breast Cancer Cells In Vitro," Breast Cancer Research and Treatment, Jun. 1987, vol. 9 (2), pp. 151-154.
Rosenmai, et al., "Are Structural Analogues To Bisphenol A Safe Alternatives?," Toxicological Sciences, vol. 139 (1), 2014, pp. 35-47.
Song K.H., et al., "Endocrine Disrupter Bisphenol A Induces Orphan Nuclear Receptor Nur77 Gene Expression and Steroidogenesis in Mouse Testicular Leydig Cells," Endocrinology, Jun. 2002, vol. 143 (6), pp. 2208-2215.
Extended European Search Report for Application No. 18166398.0, dated Oct. 26, 2018, 6 pages.
Olin North America Epoxy Resins (2016) brochure available at: https://www.brenntag.com/media/documents/bsi/product_data_sheets/material_science/olin_ epoxy_resins/olin_epoxy_resins_brochure.pdf, 12 pages.
Extended European Search Report for Application No. 18150643.7, dated Oct. 26, 2018, 6 pages.
International Preliminary Reporton Patentability for Application No. PCT/US2013/054132, dated Feb. 19, 2015, 8 pages.
International Preliminary Reporton Patentability for Application No. PCT/US2015/025723, dated Oct. 27, 2016, 11 pages.
Supplementary European Search Report for Application No. 11769696.3, dated Jun. 27, 2014, 7 pages.
Supplementary European Search Report for Application No. 13746877.3, dated Nov. 30, 2015, 8 pages.
Supplementary Partial European Search Report for Application No. 15779232.6, dated Oct. 17, 2017, 14 pages.
Tice R.R. , "The Single Cell Gel/Comet Assay: A Microgel Electrophoretic Technique for the Detection of DNA Damage and Repair in Individual Cells," Environmental Mutagenesis, 1995, pp. 315-339.
U.S. Food and Drug Administration, "Bisphenol A (BPA): Use in Food Contact Application," 9 pages, [retrieved on Dec. 28, 2017], Retrieved from the Internet [URL: www.fda.gov/newsevents/publichealthfocus/ucm064437.htm].
Vinas P., et al., "Comparison of Two Derivatization-Based Methods for Solid-Phase Microextraction-Gas Chromatography-Mass Spectrometric Determination of Bisphenol A, Bisphenol S and Biphenol Migrated from Food Cans," Analytical and Bioanalytical Chemistry, Feb. 2010, vol. 397 (1), pp. 115-125.
Vogel S., "A Non-Estrogenic Alternative to Bisphenol A at Last?," Environmental Defense Fund, (A blog post dated Jan. 23, 2017), 6 pages.
Woo B.G., et al., "Melt Polycondensation of Bisphenol A Polycarbonate by a Forced Gas Sweeping Process," Industrial & Engineering Chemistry Research, Feb. 2001, vol. 40 (5), pp. 1312-1319.
Chinese Office Action dated Apr. 10, 2019, 16 pages.
Sun, M., "Epoxy resin application principle and technology", 7 pages (2002).
Extended European Search Report for Application No. EP16862969.9, dated Jul. 1, 2019, 7 pages.
Application and File History for U.S. Appl. No. 16/384,263, filed Apr. 15, 2019, Inventors: Niederst, et al.
"Capabilities and Product Selection Guide," CVC Thermoset Specialties, 2019, 28 pages.
"Metal Ends," Ball Corporation, 2 pages, 2015.
Preliminary Industry Characterization: Metal Can Manufacturing—Surface Coating, U.S. EPA Coatings and Consumer Products Group, 1998, 52 pages.
Office Action for Chinese Application No. 201580019708.4 dated Apr. 10, 2019, 19 pages.
Office Action for Chinese Application No. 201610454406.6, dated Nov. 1, 2017, 6 pages.
Office Action for Chinese Patent Application No. 201710250900.5 dated Jan. 7, 2021, 8 pages.
Office Action for Indian Application No. 8654/DELNP/2012, dated Jan. 25, 2018, 7 pages.
Paris, et al., "Polyphenols, biphenols, bisphenol-A and 4-tert-octylphenol exhibit alpha and beta estrogen activities and antiandrogen activity in reporter cell lines," Molecular and Cellular Endocrinology, 193 (2002), 43-49.
Q-Panel Standard Substrate Applications Guide, Technical Bulletin LP-0867, 2011, 2 pages.
Report of Reconsideration by Examiner before Appeal for Japanese Patent Application No. 2017-64686, dated Aug. 29, 2019, 7 pages.
SABIC Product Brochure, 2010, 16 pages.
Soto A.M., "Evidence of Absence: Estrogenicity Assessment of a New Food-Contact Coating and the Bisphenol Used in Its Synthesis," Environmental Science and Technology, 2017, vol. 51 (3), pp. 1718-1726.
Stoye, "BPA Substitute made from paper industry leftovers," Chemistry World, www.chemistryworld.com, Mar. 17, 2014, 10 pages.
Supplementary European Search Report for application No. 11769696 dated Jun. 27, 2014., 7 pages.
Supplementary European Search Report for Application No. 16862969.9 dated Jul. 1, 2019, 6 pages.
Vinas et al., "Comparison of two derivatization-based methods for solid-phase microextraction-gas chromotography-mass spectrometric determination of bisphenol A, bisphenol S. and bisphenol migarted from food cans," Anal. Bioanal. Chem. (2010, 397:115-125.

\* cited by examiner

METHODS OF PREPARING COMPOSITIONS FOR CONTAINERS AND OTHER ARTICLES AND METHODS OF USING SAME

CROSS-REFERENCE TO RELATED APPLICATIONS

This application is a continuation of U.S. patent application Ser. No. 16/161,677, filed Oct. 16, 2018, which is a division of U.S. patent application Ser. No. 15/290,765, filed Oct. 11, 2016, and issued on Oct. 10, 2018 as U.S. Pat. No. 10,113,027 B2 entitled "METHODS OF PREPARING COMPOSITIONS FOR CONTAINERS AND OTHER ARTICLES AND METHODS OF USING SAME," which in turn is a continuation of International Application No. PCT/US2015/025723, filed Apr. 14, 2015, and entitled "METHODS OF PREPARING COMPOSITIONS FOR CONTAINERS AND OTHER ARTICLES AND METHODS OF USING SAME," which claims the benefit of U.S. Provisional Application No. 61/979,274 filed Apr. 14, 2014, and entitled "METHODS OF PREPARING COMPOSITIONS FOR CONTAINERS AND OTHER ARTICLES AND METHODS OF USING SAME", each of which is incorporated herein by reference in its entirety.

BACKGROUND

The application of coatings to metals to retard or inhibit corrosion is well established. This is particularly true in the area of packaging containers such as metal food and beverage cans. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food and beverage containers to prevent corrosion in the headspace of the container between the fill line of the food product and the container lid.

Packaging coatings should preferably be capable of high-speed application to the substrate and provide the necessary properties when hardened to perform in this demanding end use. For example, the coating should be safe for food contact, not adversely affect the taste of the packaged food or beverage product, have excellent adhesion to the substrate, resist staining and other coating defects such as "popping," "blushing" and/or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

Various coatings have been used as interior protective can coatings, including polyvinyl-chloride-based coatings and epoxy-based coatings incorporating bisphenol A ("BPA"). Each of these coating types, however, has potential shortcomings. For example, the recycling of materials containing polyvinyl chloride or related halide-containing vinyl polymers can be problematic. There is also a desire by some to reduce or eliminate certain BPA-based compounds commonly used to formulate food-contact epoxy coatings.

What is needed in the marketplace is an improved binder system for use in coatings such as, for example, packaging coatings.

SUMMARY

This invention provides a polymer useful in a variety of applications, for example, as a binder polymer of a coating composition. In preferred embodiments, the polymer does not include any structural units derived from bisphenol A ("BPA"), bisphenol F ("BPF"), bisphenol S ("BPS"), or any diepoxides thereof (e.g., diglycidyl ethers thereof such as the diglycidyl ether of BPA ("BADGE")). In addition, the polymer preferably does not include any structural units derived from a dihydric phenol, or other polyhydric phenol, having estrogenic agonist activity greater than or equal to that of 4,4'-(propane-2,2-diyl)diphenol. More preferably, the polymer does not include any structural units derived from a dihydric phenol, or other polyhydric phenol, having estrogenic agonist activity greater than or equal to that of BPS. Even more preferably, the polymer does not include any structural units derived from a dihydric phenol, or other polyhydric phenol, having estrogenic agonist activity greater than 4,4'-(propane-2,2-diyl)bis(2,6-dibromophenol). Optimally, the polymer does not include any structural units derived from a dihydric phenol, or other polyhydric phenol, having estrogenic agonist activity greater than 2,2-bis(4-hydroxyphenyl)propanoic acid. The same is preferably true for any other components of a composition including the polymer.

In some embodiments, the polymer is a polyether polymer that contains a plurality of aromatic ether segments. The polyether polymer may be formed, for example, from reactants including a polyhydric phenol (more typically a dihydric phenol) and a polyepoxide of a polyhydric phenol (more typically a diepoxide of a dihydric phenol). While not intending to be bound by any theory, one or more of the following structural characteristics may help avoid undesirable estrogenic agonist activity should any residual unreacted polyhydric phenol persist: the presence of "bulky" substituent groups, molecular weight (e.g., of the "bridge" region of a bisphenol), and the presence of polar groups.

Preferred polymers of the present invention are suitable for use in a variety of end uses, including as a film-forming material of a coating. In some such embodiments, the polymer has a glass transition temperature ("Tg") of at least 30° C., more preferably at least 60° C., and a number average molecular weight of at least 1,000 or at least 2,000. Aryl or heteroaryl groups preferably constitute at least 25 weight percent of the polymer.

In some embodiments, the polymer preferably includes one or more segments having one or more optionally substituted aryl or heteroaryl groups in a backbone portion of the segment. In some embodiments, the one or more such aryl or heteroaryl groups include one or more substituent groups (preferably "bulky" substituent groups) that are attached to the ring preferably at an ortho or meta position, more preferably an ortho position, relative to an oxygen atom attached to the ring, which is typically an oxygen atom of an ether or ester linkage, more typically an ether linkage. In some embodiments, the one or more segments include two or more aryl or heteroaryl groups in which at least two of the aryl or heteroaryl groups include an oxygen atom attached to the ring and a substituent group (preferably a "bulky" substituent group) attached to the ring preferably at an ortho or meta position relative to the oxygen atom. Examples of suitable such segments include: —O—Ar—((R$^2$)$_n$—Ar)$_r$—O—, wherein "Ar" represents an aryl or heteroaryl group preferably having at least one R$^1$ group attached to the ring at an ortho or meta position relative to the depicted oxygen atom, which preferably belongs to an ether linkage, and wherein $R^1$, $R^2$, n, and t are as defined herein for Formula (I). In preferred embodiments, the polymer is a polyether polymer.

In preferred embodiments, the polymer includes one or more segments, and even more preferably a plurality of segments, of the below Formula (I):

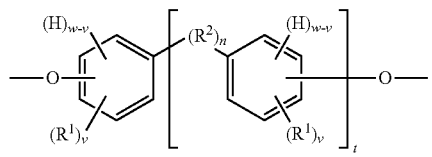

wherein:
each of the pair of oxygen atoms depicted in Formula (I) is preferably present in an ether or ester linkage, more preferably an ether linkage;
H denotes a hydrogen atom, if present;
each $R^1$ is independently an atom or group preferably having an atomic weight of at least 15 Daltons, wherein each of the phenylene groups depicted in Formula (I) preferably includes at least one $R^1$ attached to the phenylene ring at an ortho or meta position relative to the oxygen atom;
v is independently 0 to 4, more preferably 1 to 4, even more preferably 2 to 4;
w is 4;
$R^2$, if present, is preferably a divalent group;
n is 0 or 1, with the proviso that if n is 0, the phenylene groups depicted in Formula (I) can optionally join to form a fused ring system with each other (e.g., a substituted naphthalene group), in which case w is 3 (as opposed to 4) and v is 0 to 3 (as opposed to 0 to 4);
t is 0 or 1; and
wherein two or more $R^1$ and/or $R^2$ groups can join to form one or more cyclic groups.

When t is 1, the segment of Formula (I) is a segment of the below Formula (IA).

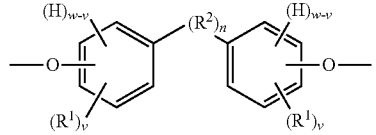

When t is 0, the segment of Formula (I) is a segment of the below Formula (IB).

Formula (IB)
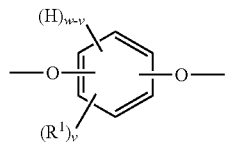

The segment of Formula (I) preferably includes at least one $R^1$ that is capable of providing steric hindrance to a phenol hydroxyl group. More preferably, each phenylene group depicted in Formula (IA) includes at least one such $R^1$ group, even more preferably includes at least two such $R^1$ groups. Preferred such $R^1$ groups are sufficiently "bulky" so that, when located at an ortho or meta position (more typically an ortho position) relative to a phenol hydroxyl group, the $R^1$ group provides sufficient steric hindrance to eliminate or reduce any undesirable level of estrogenic agonist activity associated with a polyhydric phenol including a segment of Formula (I).

In certain preferred embodiments, one or both of the following are true: (i) at least one $R^1$ is attached to each phenylene ring depicted in Formula (IA) at an ortho position relative to the depicted oxygen atom and (ii) at least one $R^1$ attached to the ring at an ortho or meta position relative to the depicted oxygen atom includes one or more carbon atoms. Non-limiting examples of $R^1$ groups include groups having at least one carbon atom, a halogen atom, a sulfur-containing group, or any other suitable group preferably having an atomic weight of at least 15 Daltons that is preferably substantially non-reactive with an epoxy group. Organic groups are presently preferred, with organic groups that are free of halogen atoms being particularly preferred.

In preferred embodiments, the polymer also includes pendant hydroxyl groups (e.g., secondary hydroxyl groups) and, more preferably, one or more —$CH_2$—$CH(OH)$—$CH_2$— or —$CH^2$—$CH_2$—$CH(OH)$— segments, which are preferably derived from an oxirane and located in a backbone of the polymer.

The present invention also provides a coating composition that includes the polymer described herein, more preferably a polyether polymer described herein. The coating composition preferably includes at least a film-forming amount of the polymer and may optionally include one or more additional polymers. The coating composition is useful in coating a variety of substrates, including as an interior or exterior coating on metal packaging containers or portions thereof. In preferred embodiments, the coating composition is useful as a food-contact coating on a food or beverage container. In preferred embodiments, the coating composition is at least substantially free of mobile BPA or BADGE, and more preferably is completely free of BPA or BADGE. More preferably, the coating composition is at least substantially free, and more preferably completely free, of mobile or bound polyhydric phenols having estrogenic agonist activity greater than or equal to that of 4,4'-(propane-2,2-diyl)diphenol. Even more preferably, the coating composition is at least substantially free, and more preferably completely free, of mobile or bound polyhydric phenols having estrogenic agonist activity greater than or equal to that of BPS. Even more preferably, the coating composition is at least substantially free, and more preferably completely free, of mobile or bound polyhydric phenols having estrogenic agonist activity greater than that of 4,4'-(propane-2,2-diyl)bis(2,6-dibromophenol). Optimally, the coating composition is at least substantially free, and more preferably completely free, of mobile or bound polyhydric phenols having estrogenic agonist activity greater than about that of 2,2-bis(4-hydroxyphenyl)propanoic acid). The coating composition may also have utility in a variety of other coating end uses, including, for example, coatings for valves and fittings, especially valves and fittings for use with potable water; pipes for conveying liquids, especially potable water pipes; and liquid storage tanks, especially potable water tanks, e.g., bolted steel water tanks.

In one embodiment, the coating composition of the present invention is a powder coating composition that preferably includes a base powder, formed at least in part, from the polymer of the present invention. The coating composition may include one or more optional ingredients in the particles of the base powder and/or in a separate particle. Such optional ingredients may include, for example, crosslinker, cure accelerator, colored pigment, filler, flow additives, etc.

The present invention also provides packaging articles having a coating composition of the present invention applied to a surface of the packaging article. In one embodiment, the packaging article is a container such as a food or beverage container, or a portion thereof (e.g., a twist-off closure lid, beverage can end, food can end, etc.), wherein at least a portion of an interior surface of the container is coated with a coating composition described herein that is suitable for prolonged contact with a food or beverage product or other packaged product.

In one embodiment, a method of preparing a container is provided that includes an interior, food-contact coating of the present invention. The method includes: providing a coating composition described herein that includes a binder polymer and optionally a liquid carrier; and applying the coating composition to at least a portion of a surface of a substrate prior to or after forming the substrate into a container or a portion thereof having the coating composition disposed on an interior surface. Typically, the substrate is a metal substrate, although the coating composition may be used to coat other substrate materials if desired. Examples of other substrate materials may include fiberboard, plastic (e.g., polyesters such as, e.g., polyethylene terephthalates; nylons; polyolefins such as, e.g., polypropylene, polyethylene, and the like; ethylene vinyl alcohol; polyvinylidene chloride; and copolymers thereof) and paper.

In one embodiment, a method of forming food or beverage cans, or a portion thereof, is provided that includes: applying a coating composition described herein to a metal substrate (e.g., applying the coating composition to the metal substrate in the form of a planar coil or sheet), hardening the coating composition, and forming the substrate into a food or beverage can or a portion thereof.

In certain embodiments, forming the substrate into an article includes forming the substrate into a can end or a can body. In certain embodiments, the article is a two-piece drawn food can, three-piece food can, food can end, drawn and ironed food or beverage can, beverage can end, easy open can end, twist-off closure lid, and the like. Suitable metal substrates include, for example, steel or aluminum.

In certain embodiments, a packaging container is provided having: (a) a coating composition of the present invention disposed on at least a portion of an interior or exterior surface of the container and (b) a product packaged therein such as a food, beverage, cosmetic, or medicinal product.

In one embodiment, a packaging container having a coating composition of the present invention disposed on an interior surface is provided that includes a packaged product intended for human contact or consumption, e.g., a food or beverage product, a cosmetic product, or a medicinal product.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list. Unless otherwise indicated, the structural representations included herein are not intended to indicate any particular stereochemistry and are intended to encompass all stereoisomers.

Definitions

As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

The term "cyclic group" means a closed ring hydrocarbon group that is classified as an alicyclic group or an aromatic group, both of which can include heteroatoms.

The term "alicyclic group" means a cyclic hydrocarbon group having properties resembling those of aliphatic groups.

The term "aryl group" (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.)

A group that may be the same or different is referred to as being "independently" something. Substitution on the organic groups of the compounds of the present invention is contemplated. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with 0, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The term "polyhydric phenol" (which includes dihydric phenols) as used herein refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

The term "phenylene" as used herein refers to a six-carbon atom aryl ring (e.g., as in a benzene group) that can have any substituent groups (including, e.g., hydrogen atoms, halogens, hydrocarbon groups, oxygen atoms, hydroxyl groups, etc.). Thus, for example, the following aryl groups are each phenylene rings: —$C_6H_4$—, —$C_6H_3$(CH$_3$)—, and —$C_6H(CH_3)_2Cl$—. In addition, for example, each of the aryl rings of a naphthalene group are phenylene rings.

The term "substantially free" of a particular mobile or bound compound means that the recited material or composition contains less than 1,000 parts per million (ppm) of the recited mobile or bound compound. The term "essentially free" of a particular mobile or bound compound means that the recited material or composition contains less than 100 parts per million (ppm) of the recited mobile or bound compound. The term "essentially completely free" of a particular mobile or bound compound means that the recited material or composition contains less than 5 parts per million (ppm) of the recited mobile or bound compound. The term "completely free" of a particular mobile or bound compound means that the recited material or composition contains less than 20 parts per billion (ppb) of the recited mobile or bound compound. If the aforementioned phrases are used without the term "mobile" or "bound" (e.g., "substantially free of BPA"), then the recited material or composition contains less than the aforementioned amount of the compound whether the compound is mobile or bound.

The term "mobile" means that the compound can be extracted from the cured coating when a coating (typically ~1 mg/cm$^2$) is exposed to a test medium for some defined set of conditions, depending on the end use. An example of these testing conditions is exposure of the cured coating to HPLC-grade acetonitrile for 24 hours at 25° C.

The term "bound" when used in combination with one of the aforementioned phrases in the context, e.g., of a bound compound of a polymer or other ingredient of a coating composition (e.g., a polymer that is substantially free of bound BPA) means that the polymer or other ingredient contains less than the aforementioned amount of structural units derived from the compound. For example, a polymer that is substantially free of bound BPA includes less than 1,000 ppm (or 0.1% by weight), if any, of structural units derived from BPA.

When the phrases "does not include any," "free of" (outside the context of the aforementioned phrases), and the like are used herein, such phrases are not intended to preclude the presence of trace amounts of the pertinent structure or compound which may be present due to environmental contaminants.

The terms "estrogenic activity" or "estrogenic agonist activity" refer to the ability of a compound to mimic hormone-like activity through interaction with an endogenous estrogen receptor, typically an endogenous human estrogen receptor.

The term "food-contact surface" refers to the substrate surface of a container (typically an inner surface of a food or beverage container) that is in contact with, or intended for contact with, a food or beverage product. By way of example, an interior surface of a metal substrate of a food or beverage container, or a portion thereof, is a food-contact surface even if the interior metal surface is coated with a polymeric coating composition.

The term "unsaturated" when used in the context of a compound refers to a compound that includes at least one non-aromatic double bond.

The term "crosslinker" refers to a molecule capable of forming a covalent linkage between polymers or between two different regions of the same polymer.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-ester copolymers).

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "a" polyether can be interpreted to mean that the coating composition includes "one or more" polyethers.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION OF ILLUSTRATIVE EMBODIMENTS

In one aspect, the present invention provides a coating composition that includes a polymer, more preferably a binder polymer, and even more preferably a polyether binder polymer. Although the ensuing discussion focuses primarily on coating end uses, it is contemplated that the polymer of the present invention, as well as intermediates thereof, may have utility in a variety of other end uses such as, for example, in adhesives or composites.

Coating compositions of the present invention preferably include at least a film-forming amount of the polymer described herein. In addition to the polymer, the coating composition may also include one or more additional ingredients such as, for example, a crosslinker, a liquid carrier, and any other suitable optional additives. Although any suitable cure mechanism may be used, thermoset coating compositions are preferred. Moreover, although coating compositions including a liquid carrier are presently preferred, it is contemplated that the polymer of the present invention may have utility in solid coating application techniques such as, for example, powder coating.

Coating compositions of the present invention may have utility in a variety of end uses, including packaging coating end uses. Other coating end uses may include industrial coatings, marine coatings (e.g., for ship hulls), storage tanks (e.g., metal or concrete), architectural coatings (e.g., on cladding, metal roofing, ceilings, garage doors, etc.), gardening tools and equipment, toys, automotive coatings, metal furniture coatings, coil coatings for household appliances, floor coatings, and the like.

Preferred coating compositions of the present invention exhibit a superior combination of coating attributes such as good flexibility, good substrate adhesion, good chemical resistance and corrosion protection, good fabrication properties, and a smooth and regular coating appearance free of blisters and other application-related defects.

In preferred embodiments, the coating composition is suitable for use as an adherent packaging coating and, more preferably, as an adherent coating on an interior and/or exterior surface of a food or beverage container. Thus, in preferred embodiments, the coating composition is suitable for use as a food-contact coating. It is also contemplated that the coating composition may have utility in cosmetic packaging or medical packaging coating end uses, and as a drug-contact coating in particular (e.g., as an interior coating of a metered dose inhaler can—commonly referred to as an "MDI" container). It is also contemplated that the coating composition may have utility in coating applications in which the coated substrate will contact bodily fluids such as, e.g., as an interior coating of a blood vial.

The ingredients used to make the polymer of the present invention are preferably free of any dihydric phenols, or corresponding diepoxides (e.g., diglycidyl ethers), that exhibit an estrogenic agonist activity in the MCF-7 assay (discussed later herein) greater than or equal to that that exhibited by 4,4'-(propane-2,2-diyl)diphenol in the assay. More preferably, the aforementioned ingredients are free of any dihydric phenols, or corresponding diepoxides, that exhibit an estrogenic agonist activity in the MCF-7 assay greater than or equal to that of bisphenol S. Even more preferably, the aforementioned ingredients are free of any dihydric phenols, or corresponding diepoxides, that exhibit an estrogenic agonist activity in the MCF-7 assay greater than that of 4,4'-(propane-2,2-diyl)bis(2,6-dibromophenol). Optimally, the aforementioned ingredients are free of any dihydric phenols, or corresponding diepoxides, that exhibit an estrogenic agonist activity in the MCF-7 assay greater than about that of 2,2-bis(4-hydroxyphenyl)propanoic acid. The same is preferably true for any other ingredients of a coating composition including the polymer.

While not intending to be bound by any theory, it is believed that a dihydric phenol is less likely to exhibit any appreciable estrogenic agonist activity if the compound's chemical structure is sufficiently different from compounds having estrogenic activity such as diethylstilbestrol. The structure of preferred dihydric phenol compounds, as will be discussed herein, are sufficiently different such that the compounds do not bind and activate a human receptor. These preferred compounds are, in some instances, at least about 6 or more, orders of magnitude less active than diethylstilbestrol (e.g., when assessing estrogenic agonist effect using an in vitro assay such as the MCF-7 cell proliferation assay discussed later herein). Without being bound by theory, it is believed that such desirable structural dissimilarity can be introduced via one or more structural features, including any suitable combination thereof. For example, it is believed that one or more of the following structural characteristics can be used to achieve such structural dissimilarity:
  segments of Formula IB
  steric hindrance (e.g., relative to one or more hydroxyl phenols),
  molecular weight that is arranged in three-dimensional space such that: (i) the compound does not fit, or does not readily fit, in the active site of a human estrogen receptor or (ii) the structural configuration interferes with activation of the human estrogen receptor once inside the active site, and
  the presence of polar groups (e.g., in addition to the two hydroxyl groups of a bisphenol compound).

In one preferred embodiment, the polymer of the present invention, which is preferably a polyether polymer, includes one or more segments of the below Formula (I), and more preferably a plurality of such segments.

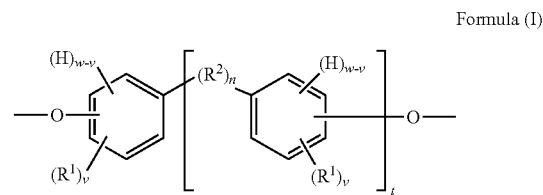

Formula (I)

wherein:
  each of the pair of oxygen atoms depicted in Formula (I) is preferably present in an ether or ester linkage, more preferably an ether linkage;
  H denotes a hydrogen atom, if present;
  each $R^1$ is preferably independently an atom or group preferably having at atomic weight of at least 15 Daltons that is preferably substantially non-reactive with an epoxy group;
  v is independently 0 to 4, more preferably 1 to 4, even more preferably 2 to 4;
  w is 4;
  when v is 1 to 4, each of the phenylene groups depicted in Formula (I) preferably includes at least one $R^1$ attached to the ring preferably at an ortho or meta position relative to the oxygen atom;
  $R^2$, if present, is preferably a divalent group;
  n is 0 or 1, with the proviso that if n is 0, the phenylene groups depicted in Formula (I) can optionally join to form a fused ring system (e.g., a substituted naphthalene group) in which case w is 3 (as opposed to 4) and v is 0 to 3 (as opposed to 3);
  t is 0 or 1; and
  two or more $R^1$ and/or $R^2$ groups can optionally join to form one or more cyclic groups.

When t is 1, the segment of Formula (I) is a segment of the below Formula (IA).

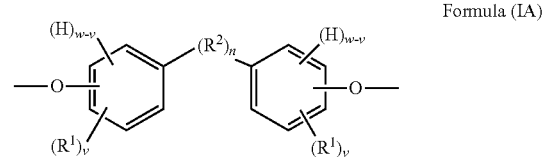

Formula (IA)

When t is 0, the segment of Formula (I) is a segment of the below Formula (IB).

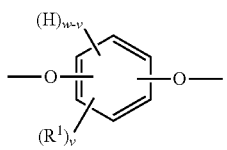

Formula (IB)

As depicted in the above Formula (I), the segment includes at least one phenylene group when t is 0 (illustrated in Formula (IB)) and includes at least two phenylene groups when t is 1 (illustrated in Formula (IA)). The segments of each of Formulas (IA) and (IB) may optionally include one or more additional phenylene or other aryl or heteroaryl groups in addition to those depicted. Although aryl groups having a six-carbon aromatic ring are presently preferred, it is contemplated that any other suitable aryl or heteroaryl groups may be used in place of the phenylene groups depicted in Formula (I). As depicted in the above Formula (I), the substituent groups (e.g., —O—, H, $R^1$, and $R^2$) of each phenylene group can be located at any position on the ring relative to one another, although in certain preferred embodiments at least one $R^1$ is positioned on the ring immediately adjacent to the oxygen atom. In other embodiments in which other aryl or heteroarylene group(s) are used in place of the depicted phenylene group(s) in Formula (I), it is contemplated that the same would hold true for the substituent groups of such other aryl or heteroarylene group(s).

In preferred embodiments, each $R^1$ and $R^2$, if present, are preferably not reactive with an oxirane group at a temperature of less than about 200° C.

In certain preferred embodiments, v is 1 or more and $R^1$ is preferably located at an ortho position on the ring relative to the oxygen atom. In some embodiments, an $R^1$ is located at each ortho position on the ring relative to the oxygen atom. While not intending to be bound by any theory, it is believed that the positioning of one or more $R^1$ groups at an ortho position relative to the oxygen atom depicted in Formula (I) may be beneficial in reducing or eliminating estrogenic agonist activity. The benefits of $R^1$ with regards to an absence of appreciable estrogenic activity in certain such potential migrants are discussed in greater detail below.

In another embodiment, the one or more hydroxyl groups present on each aryl ring of a polyhydric phenol compound (typically phenol hydroxyl groups of a dihydric phenol) are sterically hindered by one or more other substituents of the aryl ring, as compared to a similar polyhydric phenol compound having hydrogen atoms present at each ortho and/or meta position. It is believed that it may be preferable to have substituent groups positioned at each ortho position relative to the aforementioned hydroxyl groups to provide optimal steric effect. It is believed that the steric hindrance can prevent or limit the ability of a polyhydric phenol compound, and particularly a polyhydric phenol compound having two or more phenylene rings with hydroxyl groups, to act as an agonist for a human estrogen receptor.

Preferred $R^1$ groups are sufficiently "bulky" to provide a suitable level of steric hindrance for the aforementioned hydroxyl groups to achieve the desired effect. To avoid any ambiguity, the term "group" when used in the context of $R^1$ groups refers to both single atoms (e.g., a halogen atom) or molecules (i.e., two or more atoms). The optimal chemical constituents, size, and/or configuration (e.g., linear, branched, etc.) of the one or more $R^1$ groups may depend on a variety of factors, including, for example, the location of the $R^1$ group on the aryl group.

Certain Preferred segments of Formula (I) include up to four $R^1$ groups having an atomic weight of at least 15 Daltons. In some embodiments, the segments of Formula (I) include up to four $R^1$ groups having an atomic weight of at least 25, at least 40, or at least 50 Daltons. While the maximum suitable size of $R^1$ is not particularly limited, typically it will be less than 500 Daltons, more typically less than 100 Daltons, and even more typically less than 60 Daltons. Non-limiting examples of $R^1$ groups include groups having at least one carbon atom (e.g., organic groups), halogen atoms, sulfur-containing groups, or any other suitable group that is preferably substantially non-reactive with an epoxy group.

In presently preferred embodiments, the $R^1$ groups of each phenylene group, if present, preferably includes at least one carbon atom, more preferably 1 to 10 carbon atoms, and even more preferably 1 to 4 carbon atoms. $R^1$ will typically be a saturated or unsaturated hydrocarbon group, more typically saturated, that may optionally include one or more heteroatoms other than carbon or hydrogen atoms (e.g., N, O, S, Si, a halogen atom, etc.). Examples of suitable hydrocarbon groups may include substituted or unsubstituted: alkyl groups (e.g., methyl, ethyl, propyl, butyl, etc., including isomers thereof), alkenyl groups, alkynyl groups, alicyclic groups, aryl groups, or combinations thereof.

In certain preferred embodiments, each phenylene group depicted in Formula (I) includes at least one alkyl $R^1$ group. As discussed above, any suitable isomer may be used. Thus, for example, a linear butyl group may be used or a branched isomer such as an isobutyl group or a tert-butyl group. In one embodiment, a tert-butyl group (and more preferably a tert-butyl moiety) is a preferred $R^1$ group.

As previously mentioned, it is contemplated that $R^1$ may include one or more cyclic groups. In addition, $R^1$ may form a cyclic or polycyclic group with one or more other $R^1$ groups and/or $R^2$.

In some embodiments, one or both phenylene groups depicted in Formula (I) includes an $R^1$ located ortho to the oxygen that is a halogen atom, more preferably a higher molecular weight halogen such as bromine or iodine. However, in preferred embodiments, the segment of Formula (I) does not include any halogen atoms. Moreover, in presently preferred embodiments, the polymer including one or more segments of Formula (I) is preferably free of halogen atoms.

In some embodiments, a suitable $R^1$ is selected and positioned at the ortho position such that a width "f" measured perpendicular from a center-line of the phenylene group (or other suitable aryl group) to the maximal outside extent of the van der Waals volume of $R^1$ (corresponding to the radius of the van der Waals radius of $R^1$) is greater than about 4.5 Angstroms. This width measurement may be determined via theoretical calculation using suitable molecular modeling software and is illustrated below.

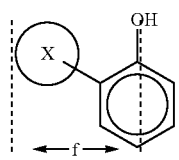

As illustrated above, the centerline for the depicted phenylene group includes the carbon atom to which the phenol hydroxyl group attaches and the para carbon atom. For example, while not intending to be bound by any theory, it is believed that it is generally desirable that f be greater than about 4.5 Angstroms if $R^2$ is a —C(CH$_3$)$_2$— group. In some embodiments, $R^1$ may be selected and positioned at an ortho position such that f is less than about 4.5 Angstroms. For example, if $R^2$ is a methylene bridge (—CH$_2$—), in some embodiments, $R^1$ can be selected and positioned such that f is less than about 4.5 Angstroms, which is believed to be the case for certain preferred segments of Formula (I) derived from, e.g., 4,4'-methylenebis(2,6-dimethylphenol).

$R^2$ is present or absent in the segment of Formula (IA) depending on whether n is 0 or 1. When $R^2$ is absent in the segment of Formula (IA), either (i) a carbon atom of one phenylene ring is covalently attached to a carbon atom of the other phenylene ring (which occurs when w is 4) or (ii) the phenylene groups depicted in Formula (IA) join to form a fused ring system (which occurs when w is 3 and the two phenylene groups are so fused). In some embodiments, $R^2$ (or the ring-ring covalent linkage if $R^2$ is absent) is preferably attached to at least one, and more preferably both, phenylene rings at a para position (i.e., 1,4 position) relative to the oxygen atom depicted in Formula (IA). An embodiment of the segment of Formula (IA), in which n is 0, w is 3, and v is independently 0 to 3 such that the two phenylene groups have joined to form a naphthalene group, is depicted below.

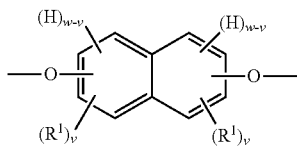

$R^2$ can be any suitable divalent group including, for example, carbon-containing groups (which may optionally include heteroatoms such as, e.g., N, O, P, S, Si, a halogen atom, etc.), sulfur-containing groups (including, e.g., a sulfur atom, a sulfinyl group (—S(O)—), a sulfonyl group (—S(O$_2$)—), etc.), oxygen-containing groups (including, e.g., an oxygen atom, a ketone group, etc.), nitrogen-containing groups, or a combination thereof.

In preferred embodiments of the segment of Formula (IA), $R^2$ is present and is typically an organic group containing less than about 15 carbon atoms, and even more typically an organic group containing 1 or 4-15 carbon atoms. In some embodiments, $R^2$ includes 8 or more carbon atoms. $R^2$ will typically be a saturated or unsaturated hydrocarbon group, more typically a saturated divalent alkyl group, and most preferably an alkyl group that doesn't constrain the movement of the connected phenylene groups in an orientation similar to that of diethylstilbestrol or dienestrol. In some embodiments, $R^2$ may include one or more cyclic groups, which may be aromatic or alicyclic and can optionally include heteroatoms. The one or more optional cyclic groups of $R^2$ can be present, for example, (i) in a chain connecting the two phenylene groups depicted in Formula (IA), (ii) in a pendant group attached to a chain connecting the two phenylene groups, or both (i) and (ii).

The atomic weight of the $R^2$ group, if present, may be any suitable atomic weight. Typically, however, $R^2$ has an atomic weight of less than about 500 Daltons, less than about 400 Daltons, less than 300 Daltons, or less than 250 Daltons.

In some embodiments, $R^2$ includes a carbon atom that is attached to a carbon atom of each of the phenylene groups depicted in Formula (I). For example, $R^2$ can have a structure of the formula —C($R^7$)($R^8$)—, wherein $R^7$ and $R^8$ are each independently a hydrogen atom, a halogen atom, an organic group, a sulfur-containing group, a nitrogen-containing group, or any other suitable group that is preferably substantially non-reactive with an epoxy group, and wherein $R^7$ and $R^8$ can optionally join to form a cyclic group. In some embodiments, at least one of $R^7$ and $R^8$ is a hydrogen atom, and more preferably both. In one preferred embodiment, $R^2$ is a divalent methylene group (—CH$_2$—). While not intending to be bound by theory, it is believed that it may be generally desirable to avoid using an $R^2$ group wherein each of $R^7$ and $R^8$ are methyl (—CH$_3$) groups. It may also be generally desirable to avoid using an $R^2$ group in which $R^7$ and $R^8$ join to form a monocyclic cyclohexyl group.

It is also thought to be generally desirable to avoid using either of the following "constrained" unsaturated structures (i) or (ii) as $R^2$: (i) —C($R^9$)=C($R^9$)— or (ii)) —C(=C($R^{10}$)$_y$)—C(=C($R^{10}$)$_y$)—, wherein y is 1 or 2 and each of $R^9$ or $R^{10}$ is independently a hydrogen atom, a halogen atom, an organic group, or a monovalent group. For example, the following unsaturated structures (i) and (ii) are preferably avoided as $R^2$: (i) —C(CH$_2$CH$_3$)=C(CH$_2$CH$_3$)— and (ii) —C(=CHCH$_3$)—C(=CHCH$_3$)—.

While not intending to be bound by theory it is believed that a suitably low atomic weight $R^2$ group such as, e.g., —CH$_2$— (14 Daltons), can help avoid estrogenic activity. In some embodiments where $R^2$ is a —C($R^7$)($R^8$)— group, it may be desirable that $R^2$ have an atomic weight of less than 42 Daltons or less than 28 Daltons. It is also believed that a suitably high atomic weight $R^2$ can also help interfere with the ability of a dihydric phenol to function as an agonist for a human estrogen receptor. In some embodiments where $R^2$ is a —C($R^7$)($R^8$)— group, it may be desirable that $R^2$ have an atomic weight that is greater than about: 125, 150, 175, or 200 Daltons. By way of example, a dihydric phenol compound has been determined to be appreciably non-estrogenic that: (a) is not "hindered" (the phenol hydroxyl groups are not surrounded by ortho hydrogens) and (b) has an $R^2$ group in the form of —C($R^7$)($R^8$)— having an atomic weight greater than 200 Daltons.

While not intending to be bound to theory, preferred $R^2$'s include divalent groups that promote that the orientation of a dihydric phenol compound in a three-dimensional configuration that is sufficiently different from 17β-estradiol or other compounds (e.g., diethylstilbestrol) having estrogenic activity. For example, while not intending to be bound to theory, it is believed that the presence of $R^2$ as an unsubstituted methylene bridge (—CH$_2$—) can contribute to the reduction or elimination of estrogenic activity. It is also contemplated that a singly substituted methylene bridge having one hydrogen attached to the central carbon atom of the methylene bridge (—C($R^7$)(H)—; see, e.g. the $R^2$ group of 4,4'Butylidenebis(2-t-butyl-5-methylphenol)) may also contribute such a beneficial effect, albeit perhaps to a lesser extent.

In some embodiments, $R^2$ is of the formula —C($R^7$)($R^8$)— wherein $R^7$ and $R^8$ form a ring together that includes one or more heteroatoms. In one such embodiment, the ring formed by $R^7$ and $R^8$ further includes one or more additional cyclic group such as, e.g., one or more aryl cyclic groups (e.g., two phenylene rings).

In one embodiment, $R^2$ is of the formula —C($R^7$)($R^8$)— wherein at least one of $R^7$ and $R^8$ form a ring with an $R^1$ of the depicted phenylene group. In one such embodiment, each of R⁷ and R⁸ forms such a ring with a different depicted phenylene group.

In some embodiments, the segment of Formula (I) does not include any ester linkages in a backbone of $R^2$ connecting the pair of depicted phenylene groups. In some embodiments, the polymer of the present invention does not include any backbone ester linkages.

The oxygen atom of a phenylene ring(s) depicted in Formula (I) can be positioned on the ring at any position relative to $R^2$ (or relative to the other phenylene ring if $R^2$ is absent). In some embodiments, the oxygen atom (which is preferably an ether oxygen) and $R^2$ are located at para positions relative to one another. In other embodiments, the oxygen atom and $R^2$ may be located ortho or meta to one another.

The segments of Formula (I) can be of any suitable size. Typically, the segments of Formula (I) will have an atomic weight of less than 1,000, less than 600, or less than 400 Daltons. More typically, the segments of Formula (I) will have an atomic weight of about 100 to about 400 Daltons.

In preferred embodiments, the substituted phenylene groups of Formula (IA) are symmetric relative to one another. Stated otherwise, the substituted phenylene groups are preferably formed from the same phenol compound, thereby resulting in the same substituent groups on each ring located at the same ring positions. An example of a compound having symmetric phenylene groups is provided below.

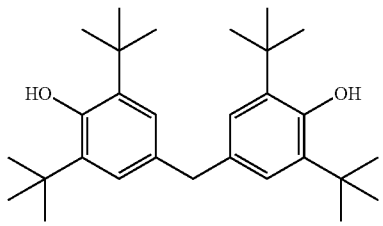 [SMILES: CC(C)(C)c1cc(Cc2cc(C(C)(C)C)c(O)c(C(C)(C)C)c2)cc(C(C)(C)C)c1O]

An example of a compound having phenylene groups that are not symmetric is provided below, in which a methyl group is at a meta position on one ring and at an ortho position on the other.

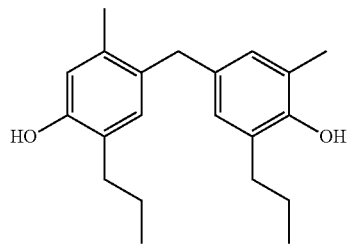 [SMILES: CCCc1cc(Cc2cc(C)c(O)c(CCC)c2)c(C)cc1O]

In preferred embodiments, the polymer of the present invention includes a plurality of segments of Formula (I), which are preferably dispersed throughout a backbone of the polymer, more preferably a polyether backbone. In preferred embodiments, the segments of Formula (I) constitute a substantial portion of the overall mass of the polymer. Typically, segments of Formula (I) constitute at least 10 weight percent ("wt-%"), preferably at least 30 wt-%, more preferably at least 40 wt-%, even more preferably at least 50 wt-%, and optimally at least 55 wt-% of the polymer.

The weight percent of segments of Formula (I) in the polymer of the present invention may be below the amounts recited above in certain situations, and can even be substantially below. By way of example, the concentration of segments of Formula (I) may be outside the ranges recited above if the polymer of the present invention, which is preferably a polyether polymer, includes large molecular weight additional components such as may occur, for example, when the polymer is a copolymer such as an acrylic-containing copolymer (e.g., an acrylic-polyether copolymer formed by grafting acrylic onto a polyether polymer of the present invention). In such embodiments, the weight percent of segments of Formula (I) present in the polymer is preferably as described above (e.g., ≥10 wt-%, ≥30 wt-%, ≥40 wt-%, ≥50 wt-%, ≥55 wt-%), based on the weight percent of segments of Formula (I) relative to the total polyether fraction of the polymer (while not considering the total weight of non-polyether portions such as, for example, acrylic portions). In general, the total polyether fraction of the polymer can be calculated based on the total weight of polyepoxide and polyhydric phenol reactants incorporated into the polymer.

Depending upon the particular embodiment, the polymer of the present invention is preferably amorphous or semi-crystalline.

The polymer can include branching, if desired. In preferred embodiments, however, the polymer of the invention is a linear or substantially linear polymer.

If desired, the backbone of the polymer may include step-growth linkages (e.g., condensation linkages) other than ether linkages (e.g., in addition to, or in place of, the ether linkages) such as, for example, amide linkages, carbonate linkages, ester linkages, urea linkages, urethane linkages, etc. Thus, for example, in some embodiments, the backbone may include both ester and ether linkages. In some embodiments, the backbone of the polymer does not include any condensation linkages or other step-growth linkages other than ether linkages.

The polymer of the present invention preferably includes hydroxyl groups. In preferred embodiments, the polymer includes a plurality of hydroxyl groups attached to the backbone. In preferred embodiments, polyether portions of the polymer backbone include secondary hydroxyl groups distributed throughout. Preferred secondary hydroxyl groups are present in —CH₂—CH(OH)—CH₂— or —CH₂—CH₂—CH(OH)— segments, which are preferably derived from an oxirane group. Such segments may be formed, for example, via reaction of an oxirane group and a hydroxyl group (preferably a hydroxyl group of a polyhydric phenol). In some embodiments, CH₂—CH(OH)—CH₂— or CH₂—CH₂—CH(OH)— segments are attached to each of the ether oxygen atoms of preferred segments of Formula (I).

The backbone of the polymer of the present invention may include any suitable terminal groups, including, for example, epoxy and/or hydroxyl groups (e.g., a hydroxyl group attached to a terminal aryl or heteroaryl ring).

In preferred embodiments, the polymer of the present invention is formed using reactants that include at least one polyepoxide compound, more typically at least one diepoxide compound. Although any suitable ingredients may be used to form the polymer, in presently preferred embodiments, the polymer is formed via reaction of ingredients that include: (a) one or more polyepoxides, more preferably one or more diepoxides, and (b) one or more polyols, more preferably one or more polyhydric phenols, and even more preferably one or more dihydric phenols. The polymer is preferably derived from ingredients including a diepoxide having one or more "hindered" aryl or heteroaryl groups, and more preferably one or more "hindered" phenylene groups described herein (e.g., as depicted in Formula (I)).

While it is contemplated that the segments of Formula (I) may be incorporated into the polymer using ingredients other than a polyepoxide compound, in preferred embodiments some, or all, of the segments of Formula (I) are incorporated into the polymer using a polyepoxide compound, and more preferably a diepoxide compound. The polyepoxide compound may be upgraded by reaction with an extender (e.g., a diol which is preferably a polyhydric phenol) to form a binder polymer, more preferably a polyether binder polymer, of a suitable molecular weight using any suitable extender or combinations of extenders. As discussed above, diols (e.g., polyhydric phenols, and dihydric phenols in particular) are preferred extenders. Examples of other suitable extenders may include polyacids (and diacids in particular) or phenol compounds having both a phenol hydroxyl group and a carboxylic group (e.g., para hydroxy benzoic acid and/or para hydroxy phenyl acetic acid). Conditions for such reactions are generally carried out using standard techniques that are known to one of skill in the art or that are exemplified in the examples section.

The epoxy groups (also commonly referred to as "oxirane" groups) of the polyepoxide compound may be attached to the compound via any suitable linkage, including, for example, ether-containing or ester-containing linkages. Glycidyl ethers of polyhydric phenols and glycidyl esters of polyhydric phenols are preferred polyepoxide compounds, with diglycidyl ethers being particularly preferred.

A preferred polyepoxide compound for use in incorporating segments of Formula (I) into the polymer of the present invention is depicted in the below Formula (II):

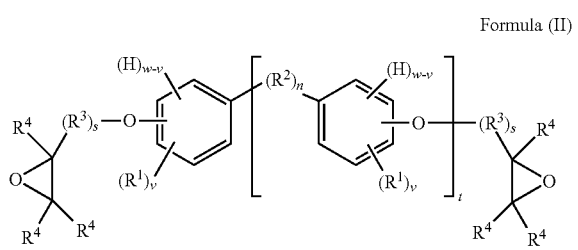

Formula (II)

wherein:

$R^1$, $R^2$, n, t, v, and w are as described above for Formula (I);

s is 0 to 1, more preferably 1;

$R^3$, if present, is a divalent group, more preferably a divalent organic group; and preferably each $R^4$ is independently a hydrogen atom, a halogen atom, or a hydrocarbon group that may include one or more heteroatoms; more preferably each $R^4$ is a hydrogen atom.

When t is 1, the polyepoxide of Formula (II) is a segment of the below Formula (IIA).

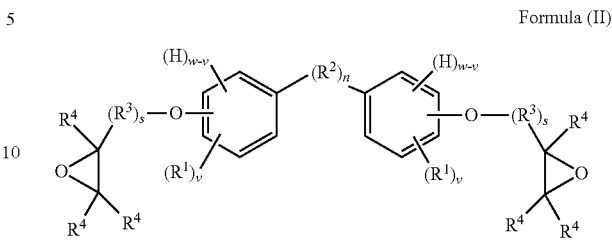

Formula (II)

When t is 0, the polyepoxide of Formula (II) is a segment of the below Formula (IIB).

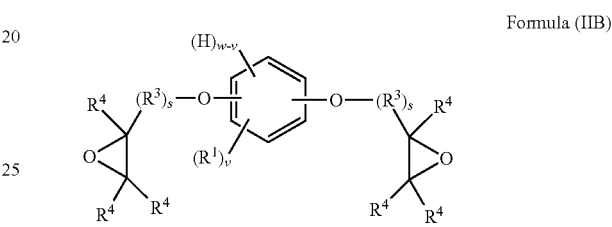

Formula (IIB)

$R^3$ is typically a hydrocarbyl group, which may optionally include one or more heteroatoms. Preferred hydrocarbyl groups include groups having from one to four carbon atoms, with methylene groups being particularly preferred. In some embodiments, $R^3$ includes a carbonyl group. In one such embodiment, $R^3$ includes a carbonyl group that is attached to the oxygen atom depicted in Formula (II) (e.g., as in an ester linkage).

In presently preferred embodiments, $R^4$ is a hydrogen atom.

Preferred polyepoxide compounds of Formula (II) are non-mutagenic, more preferably non-genotoxic. A useful test for assessing both mutagenicity and genotoxicity is the mammalian in vivo assay known as the in vivo alkaline single cell gel electrophoresis assay (referred to as the "comet" assay). The method is described in: Tice, R. R. "The single cell gel/comet assay: a microgel electrophoretic technique for the detection of DNA damage and repair in individual cells." *Environmental Mutagenesis*. Eds. Phillips, D. H and Venitt, S. Bios Scientific, Oxford, U D, 1995, pp. 315-339. A negative test result in the comet assay indicates that a compound is non-genotoxic and, therefore, non-mutagenic, though a positive test does not definitively indicate the opposite and in such cases a more definitive test may be utilized (e.g., a two-year rat feeding study).

If t of Formula (II) is 0, v is preferably 1 or more, more preferably 2 or more. While not intending to be bound by any theory, it is believed that the presence of one or more $R^1$ groups, and particularly one or more ortho $R^1$ groups, can contribute to the diepoxide of Formula (IIB) being non-genotoxic. By way of example, 2,5-di-tert-butylhydroquinone is non-genotoxic.

In some embodiments, the polyepoxide compound of Formula (II) is formed via epoxidation of a dihydric phenol compound (e.g., via a reaction using epichlorohydrin or any other suitable material). Such a dihydric phenol compound is depicted in the below Formula (III), wherein $R^1$, $R^2$, n, t, v, and w are as in Formula (I):

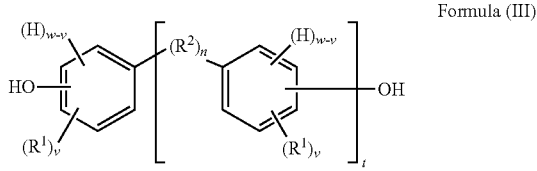

Formula (III)

When t is 1, the compound of Formula (III) is of the below Formula (IIIA).

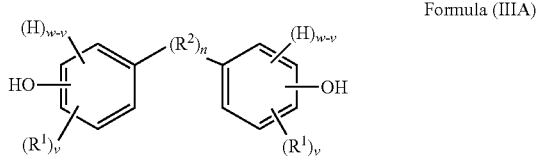

Formula (IIIA)

When t is 0, the compound of Formula (III) is of the below Formula (IIIB).

Formula (IIIB)

Preferred compounds of Formula (III) do not exhibit appreciable estrogenic activity. Preferred appreciably non-estrogenic compounds exhibit a degree of estrogen agonist activity, in a competent in vitro human estrogen receptor assay, that is preferably less than that exhibited by 4,4'-(propane-2,2-diyl)diphenol in the assay, even more preferably less than that exhibited by bisphenol S in the assay, even more preferably less than that exhibited by 4,4'-(propane-2,2-diyl)bis(2,6-dibromophenol) in the assay, and optimally less than about that exhibited by 2,2-bis(4-hydroxyphenyl)propanoic acid in the assay. It has been found that compounds such as 4,4'-methylenebis(2,6-di-t-butylphenol), 2,2'-methylenebis(4-methyl-6-t-butylphenol), 4,4'-methylenebis(2,6-dimethylphenol), 4,4'butylidenebis (2-t-butyl-5-methylphenol), and 2,5-di-t-butylhydroquinone do not exhibit appreciable estrogenic activity in a suitable in vitro assay whose results are known to be directly correlated to the results of the MCF-7 cell proliferation assay ("MCF-7 assay") through analysis of common reference compounds.

The MCF-7 assay is a useful test for assessing whether a polyhydric phenol compound is appreciably non-estrogenic. The MCF-7 assay uses MCF-7, clone WS8, cells to measure whether and to what extent a substance induces cell proliferation via estrogen receptor (ER)-mediated pathways. The method is described in "Test Method Nomination: MCF-7 Cell Proliferation Assay of Estrogenic Activity" submitted for validation by CertiChem, Inc. to the National Toxicology Program Interagency Center for the Evaluation of Alternative Toxicological Methods (NICEATM) on Jan. 19, 2006 (available online at http://iccvam.niehs.nih.gov/methods/endocrine/endodocs/SubmDoc.pdf).

A brief summary of the method of the aforementioned MCF-7 assay is provided below. MCF-7, clone WS8, cells are maintained at 37° C. in RMPI (or Roswell Park Memorial Institute medium) containing Phenol Red (e.g., GIBCO Catalog Number 11875119) and supplemented with the indicated additives for routine culture. An aliquot of cells maintained at 37° C. are grown for 2 days in phenol-free media containing 5% charcoal stripped fetal bovine serum in a 25 $cm^2$ tissue culture flask. Using a robotic dispenser such as an epMotion 5070 unit, MCF-7 cells are then seeded at 400 cells per well in 0.2 ml of hormone-free culture medium in Corning 96-well plates. The cells are adapted for 3 days in the hormone-free culture medium prior to adding the chemical to be assayed for estrogenic activity. The media containing the test chemical is replaced daily for 6 days. At the end of the 7-day exposure to the test chemical, the media is removed, the wells are washed once with 0.2 ml of HBSS (Hanks' Balanced Salt Solution), and then assayed to quantify amounts of DNA per well using a micro-plate modification of the Burton diphenylamine (DPA) assay, which is used to calculate the level of cell proliferation.

Examples of appreciably non-estrogenic polyhydric phenols include polyhydric phenols that, when tested using the MCF-7 assay, exhibit a Relative Proliferative Effect ("RPE") having a logarithmic value (with base 10) of less than about −2.0, more preferably an RPE of −3 or less, and even more preferably an RPE of −4 or less. RPE is the ratio between the EC50 of the test chemical and the EC50 of the control substance 17-beta estradiol times 100, where EC50 is "effective concentration 50%" or half-maximum stimulation concentration for cell proliferation measured as total DNA in the MCF-7 assay.

Preferred polyether polymers of the present invention are substantially free, more preferably completely free, of bound polyhydric phenols (and epoxides thereof) having an RPE of less than about −2.0. More preferably, the polyether polymer are free of bound polyhydric phenols (and epoxides thereof) having an RPE of −3 or less. Optimally, the polyether polymer are free of bound polyhydric phenols (and epoxides thereof) having an RPE of −3 or less.

A Table is provided below that includes some exemplary preferred polyhydric compounds of Formula (III) and their expected or measured logarithmic RPE values in the MCF-7 assay. The structures of some of the compounds included in the Table are provided following the Table, with the number listed below each structure corresponding to that listed in the Table.

| Polyhydric Compound of Formula (III) | Structure | Reference Compound | Log RPE |
|---|---|---|---|
| | | 17β-estradiol | 2.00 |
| | | diethylstilbestrol | about 2 |
| | | dienestrol | about 2 |
| | | Genistein | −2 |
| Bisphenol S (not preferred) | | | −2 |
| Bisphenol F (not preferred) | | | −2 |
| 4,4'-isopropylidenebis(2,6-dimethylphenol) | 1 | | −2 |
| 4,4'-(propane-2,2-diyl)bis(2,6-dibromophenol) | 16 | | −3 |
| 4,4'-(ethane-1,2-diyl)bis(2,6-dimethylphenol) | 2 | | −3 |
| 4,4',4''-(ethane-1,1,1-triyl)triphenol | 3 | | −3 |
| 4,4'-(1-phenylethane-1,1-diyl)diphenol | 4 | | −3 |
| 2,2-bis(4-hydroxyphenyl)propanoic acid | 5 | | less than −4 |
| 4,4'-methylenebis(2,6-dimethylphenol) | 6 | | less than −4 |
| 4,4'-butylidenebis(2-t-butyl-5-methylphenol) | 7 | | less than −4 |

-continued

| Polyhydric Compound of Formula (III) | Structure | Reference Compound | Log RPE |
|---|---|---|---|
| 4,4'-methylenebis(2,6-di-t-butylphenol) | 8 | | less than −4 |
| 2,2'-methylenebis(4-methyl-6-t-butylphenol | 9 | | less than −4 |
| 4,4'-(1,4-phenylenebis(propane-2,2-diyl))diphenol | 10 | | less than −4 |
| 2,2'methylenebis(phenol) | 11 | | less than −4 |
| 2,5-di-t-butylhydroquinone | 12 | | less than −4 |
| 2,2'-Methylenebis(6-(1-methylcyclohexyl)-4-methylphenol | 13 | | less than −4 |
| 2,2'-Methylenebis(6-t-butyl-4-methylphenol) | 14 | | less than −4 |
| 2,2'Methylenebis(4-ethyl-6-t-butylphenol) | 15 | | less than −4 |

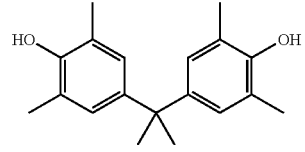

1

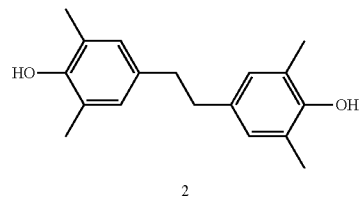 [SMILES: Cc1cc(CCc2cc(C)c(O)c(C)c2)cc(C)c1O]

2

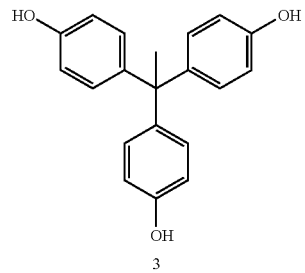 [SMILES: CC(c1ccc(O)cc1)(c1ccc(O)cc1)c1ccc(O)cc1]

3

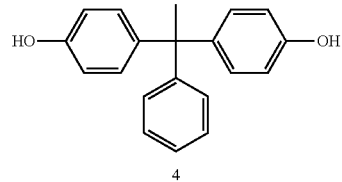 [SMILES: CC(c1ccccc1)(c1ccc(O)cc1)c1ccc(O)cc1]

4

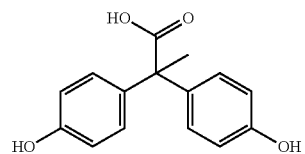

5

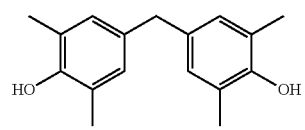

6

-continued

| Polyhydric Compound of Formula (III) | Structure | Reference Compound | Log RPE |
|---|---|---|---|

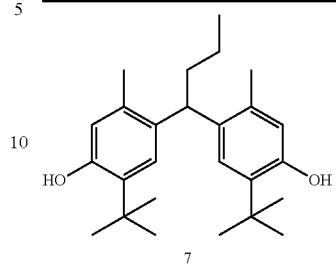

7

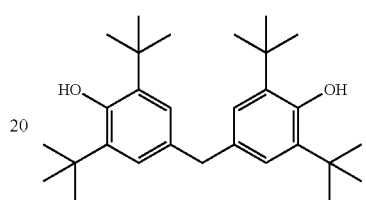

8

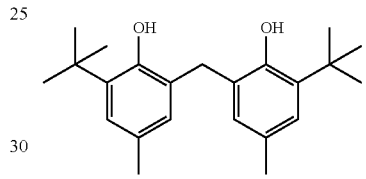

9

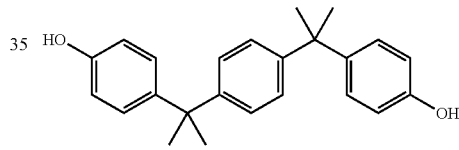

10

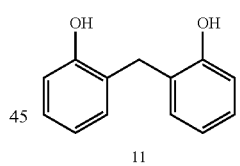

11

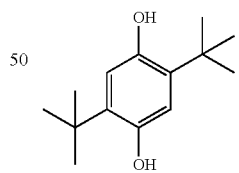

12

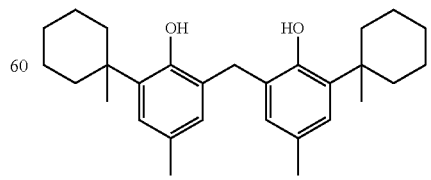

13

| Polyhydric Compound of Formula (III) | Structure | Reference Compound | Log RPE |
|---|---|---|---|
| | 14 | | |
| | 15 | | |
| | 16 | | |

Compounds having no appreciable estrogenic activity may be beneficial in the event that any unreacted, residual compound may be present in a cured coating composition. While the balance of scientific data does not indicate that the presence in cured coatings of very small amounts of residual compounds having estrogenic activity in an in vitro recombinant cell assay pose a human health concern, the use of compounds having no appreciable estrogenic activity in such an assay may nonetheless be desirable from a public perception standpoint. Thus, in preferred embodiments, the polymer of the present invention is preferably formed using polyhydric phenol compounds that do not exhibit appreciable estrogenic activity in the MCF-7 assay.

While not intending to be bound by any theory, as previously discussed, it is believed that the presence of substituent groups (i.e., a group other than a hydrogen atom) at one or more of the ortho and/or meta positions of each phenylene ring of the Formula (III) compound, relative to the phenol hydroxyl group of each ring, can reduce or effectively eliminate any estrogenic activity. It is believed that the inhibition/elimination of estrogenic activity may be attributable to one or more of the following: (a) steric hindrance of the phenol hydroxyl group (which may cause the overall polyhydric phenol structure to be sufficiently different from estrogenically active compounds such as diethylstilbestrol), (b) the compound having an arranged molecular weight due to the presence of the one or more substituent groups, (c) the presence of polar groups and/or (d) ortho hydroxyl groups relative to $R^2$. Substitution at one or both of the ortho positions of each phenylene ring is presently preferred for certain embodiments as it is believed that ortho substitution can provide the greatest steric hindrance for the hydroxyl group.

As previously discussed, structural features other than the presence of suitable $R^1$ groups (e.g., features such as (b), (c), and (d) of the preceding paragraph) are believed to inhibit/eliminate estrogenic activity, even in the absence of any $R^1$ groups.

It is believed that molecular weight may be a structural characteristic pertinent to whether a polyhydric phenol is appreciably non-estrogenic. For example, while not intending to be bound by any theory, it is believed that if a sufficient amount of relatively "densely" packed molecular weight is present in a polyhydric phenol, it can prevent the compound from being able to fit into the active site of an estrogen receptor (irrespective of whether the polyhydric phenol includes any ortho or meta $R^1$ groups). In some embodiments, it may be beneficial to form a polyether polymer from one or more polyhydric phenols (whether "hindered" or not) that includes at least the following number of carbon atoms: 20, 21, 22, 23, 24, 25, or 26 carbon atoms. In one such embodiment, a polyhydric phenol of Formula (III) is used to make the polyether polymer, where (a) v is independently 0 to 4 and (b) $R^2$ is of the formula —C($R^7$)($R^8$)— and includes at least 8, at least 10, at least 12, or at least 14 carbon atoms (or otherwise has an $R^2$ of sufficiently high atomic weight to prevent the compound from fitting into the active site).

The presence of one or more polar groups on the polyhydric phenol compounds of Formula (III) may be beneficial in certain embodiments, particularly for certain embodiment of Formula (IIIA). The polar groups may be located at any suitable location of the compounds of Formula (III), including in $R^1$ or $R^2$. Suitable polar groups may include ketone, carboxyl, carbonate, hydroxyl, phosphate, sulfoxide, and the like, any other polar groups disclosed herein, and combinations thereof.

The below compounds of Formula (III) may also be used in certain embodiments if desired.

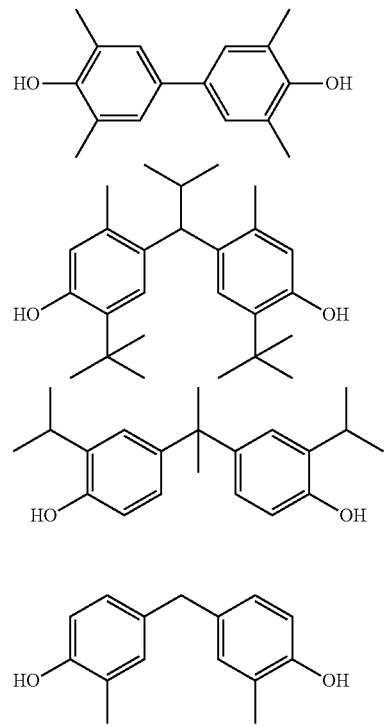

The below compounds are not presently preferred, but may be used in certain embodiments, if desired.

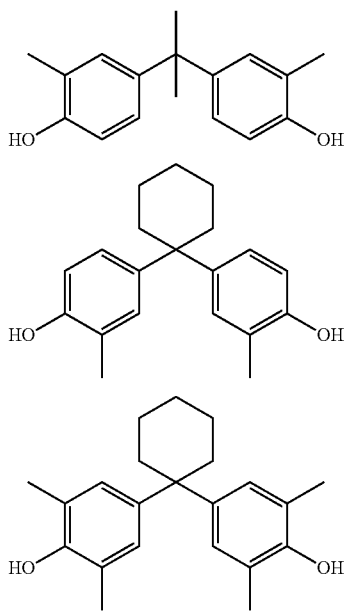

Additional polyhydric phenol compounds that may have utility in producing the polymer of the present invention are provided below. While the dihydric phenol structures listed below are not "hindered" in the sense of having bulky substituent groups at one or more ortho or meta positions of the phenylene ring(s), it is contemplated that each of the below dihydric phenol structures may be used in place of, or in addition to, the compounds of Formula (III). Such compounds are believed to be appreciably non-estrogenic for one or more of the reasons previously described herein.

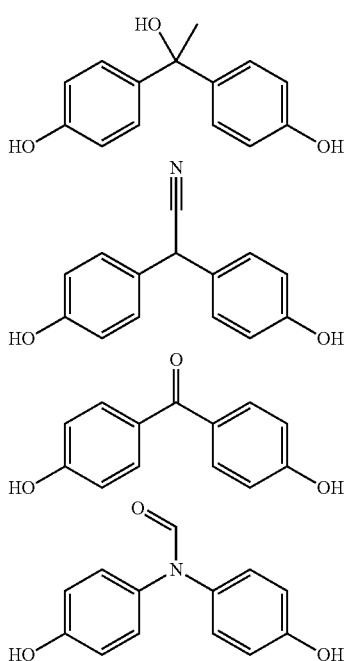

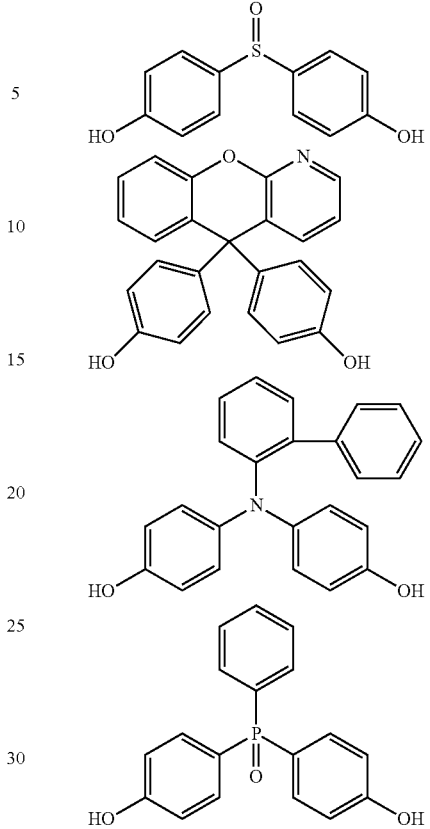

Dihydric phenol compounds of Formula (III) can be converted to a diepoxide using any suitable process and materials. The use of epichlorohydrin in the epoxidation process is presently preferred. By way of example, below is a diepoxide formed via an epichlorohydrin epoxidation of 4,4'-methylenebis(2,6-di-t-butylphenol).

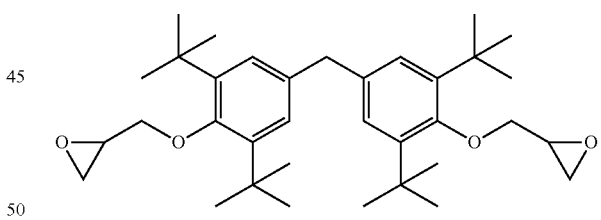

Numerous diepoxides have been successfully generated using various dihydric phenol compounds of Formula (III), and polyether polymers have been successfully produced therefrom. In general, it is much more difficult to successfully form a polyether polymer (using reasonable process times and conditions) using, as a dihydric phenol component, a compound of Formula (III) substituted at the ortho ring positions. For example, the inventors have found it difficult using conventional industrial processes to efficiently react 4,4'-methylenebis(2,6-di-t-butylphenol) with diepoxide monomer to form a polyether polymer. (Somewhat surprisingly, however, dihydric phenol compounds such as 4,4'-methylenebis(2,6-di-t-butylphenol) can undergo a condensation reaction with epichlorohydrin to form a diepoxide that is reactive with conventional dihydric phenols that are not substituted at the ortho or meta positions.) While not wishing to be bound by theory, it is believed that the hydroxyl groups of such dihydric phenol compounds are generally not sufficiently accessible to efficiently react under standard processes with an oxirane group of a diepoxide monomer and form an ether linkage. Nonetheless, it is contemplated that a "hindered" dihydric phenol compound of Formula (III) may be selected such that the hydroxyl groups are sufficiently sterically hindered so that the compound does not exhibit appreciable estrogenic activity, while the hydroxyl groups are still sufficiently accessible so that the compound can react under standard processes with a diepoxide and build molecular weight under reasonable process times and conditions (e.g., less than 24 hours of reaction time at a reaction temperature of less than about 240° C.).

It has been surprisingly found that sterically hindered dihydric phenol compounds of formula (III) may be successfully upgraded as described herein using (i) the so-called "taffy" process or (ii) nitrogen-containing catalysts having sufficient basicity and sufficiently "available" lone pair electrons (e.g., catalysts having a bridgehead nitrogen atom, such as a polycyclic amidine base catalysts or an azabicycloalkane) or (iii) combinations of these methods. Details of these embodiments follow below.

The "taffy process" is a well-known process that has long been used to produce high molecular weight epoxide resins. As described in U.S. Pat. Nos. 2,694,694; 2,767,157; and 2,824,855, which are herein incorporated by reference, high melting point epoxide resins may be produced by the reaction of a mixture of a dihydric phenol (e.g., bis-phenol) with halohydrin (e.g., epichlorohydrin) and caustic alkali. The proportions of halohydrin to dihydric phenol being such as to give directly a high melting point high molecular weight epoxide resin. This process differs from the "fusion" process wherein a polyether polymer is prepared by reacting a digylcidyl ether with a diphenol.

As noted in U.S. Pat. No. 2,767,157 at column 3, lines 59-73, illustrative dihydric phenols useful in making the new complex polymerization products via the taffy process include mononuclear phenols such as resorcinol, hydroquinone, and catechol, and polynuclear phenols such as bisphenol (p,p'-dihydroxydiphenyl dimethyl methane), p,p'-dihydroxybenzo-bis-(4-hydroxyphenyl) sulfone, 2,2'-dihydroxy 1,1'-dinaphthyl methane, polyhydroxy naphthalenes and anthracenes, o,p,o',p'-tetrahydroxy diphenyl dimethyl methane and other dihydroxy or polyhydroxy diphenyl or dinaphthyl methanes, etc. The '157 patent, however, cautions that the dihydric phenols used in making the high melting point epoxide may contain substituents (on the phenolic nuclei or on the chains linking phenolic nuclei) "provided they do not interfere with the desired reaction of the chlorhydrins with the phenolic hydroxyl groups." Notably, U.S. Pat. Nos. 2,694,694; 2,767,157; and 2,824,855 only exemplify unhindered phenols in their process, such as bisphenol-A, bisphenol-S, and resorcinol.

It has been surprisingly found that sterically hindered dihydric phenol compounds of formula (III), which are generally not upgradable using the standard fusion process, may be successfully upgraded using the taffy process.

Polymers made using the taffy process are expected to have the following advantages:

a. Polyether polymers made via the taffy process would be produced using fewer "ingredients." Consequently, the resulting polymers should have more streamlined regulatory filings. In fact, a polymer made from 4,4'-methylenebis(2,6-dimethylphenol) and epi-chlorohydrin is believed to be compliant with FDA regulation 175.300.

b. The taffy process is expected to be highly cost effective.

c. Polymers based on hindered phenols can be manufactured that are not able to be made using the traditional fusion process and standard catalysts.

In one embodiment a high melting point epoxide material can be made by using the taffy process and reacting 4,4'-methylenebis(2,6-dimethylphenol) and epi-chlorohydrin.

The reaction results in straight chain polymeric products having the general formula $R_1—[O—R—O—R_2]_n—O—R—O—R_1$, where R is the residue of the dihydric phenol, $R_2$ is an intermediate hydroxyl-containing residue of the chlorohydrin, $R_1$ is mainly an epoxy-containing residue, and n represents the degree of polymerization.

The reaction can be managed through stoichiometric balance methods to produce polymers having an average number of repeat units ("n") of over 4, more preferably over 6, even more preferably over 8, even more preferably over 12 and most preferably over 16.

In addition to carrying out the reaction of the dihydric phenol and halohydrin in the presence of a caustic alkali, the reaction may further be optionally catalyzed using a nitrogen-containing catalyst as is described below. The catalyst, for example, may be used to facilitate the further upgrading of a DGE-material that was made using the taffy process.

The following procedure is illustrative of a method of preparing epoxide resins using the taffy process:

A caustic soda solution is made containing 1 mol caustic soda per mol of sterically hindered dihydric phenol compound of formula (III) dissolved in an amount of water, e. g., twice the weight of the phenol used. The phenol is then added to the caustic solution in a reaction kettle and with the aid of heat and agitation the phenol is dissolved. Epichlorhydrin is then added to the solution at a temperature of 35-45° C. with continuous agitation of the reaction mixture. The temperature rises to about 60-75° C. in 30 minutes, depending on the initial temperature, the batch size and the amount of water used. Larger amounts of water can be used to control the exothermic reaction. After this preliminary reaction, an additional amount of sodium hydroxide in water solution sufficient in amount together with that previously added to react completely with the chlorine of the epichlorhydrin, is added and heat applied if necessary to raise the temperature to around 80-85° C. over a period of 15-20 minutes. A further amount of sodium hydroxide is then added in water in excess of the theoretical amount required to react with all the chlorine present in the epichlorhydrin. This excess may be 15 to 100 percent more than theoretically required. The mixture is then heated to around 95-100° C. for a sufficient time to produce the desired products, e. g., from ½ hour to 3 hours.

The reactive mixture separates into an upper aqueous layer which is drawn off and a taffy-like resin which settles to the bottom. Practically, it is not conveniently possible to draw off more than about 90 percent of the aqueous layer containing dissolved sodium hydroxide and sodium chloride due to entrainment of the resin in the water. The resin products are then washed by stirring with hot water for ~30 minutes and the wash water drained off. This washing procedure is repeated 4 to 6 times or more to remove all the unreacted sodium hydroxide and the sodium chloride. It is also possible to incorporate the use of acid such as acetic or hydrochloric in the wash water to neutralize the excess caustic. The last traces of caustic and of basic salts such as sodium acetate must be removed before the drying step to follow, since their presence may catalyze further polymerization of the resin to a gel at the temperatures used to dehydrate the resins. After thorough washing, the resin is heated with agitation to drive off the residual water. This requires temperatures substantially above the boiling point of water to effect dehydration, e. g., up to 150° C.

Many resins, especially those useful in coating, have softening points of 95° C. and higher. Without the use of pressure to obtain higher temperatures with the water system, resins with softening points higher than 95° C. cannot be produced by the method described above since it is impossible mechanically to agitate the mass.

In preparing these resins, it is essential to remove the alkali entirely in order to avoid undesirable polymerization either during the dehydration step or upon standing or aging. The neutralization of the alkali produces salts and the removal of these salts has presented an impracticable burden because of the vast quantities of washing required. One may dissolve the resin in acetone and after filtering to free it from Water and solvent, but this requires a great deal of solvent and may be costly. Mere washing of the resin with water to remove alkali and salts is difficult because of the high viscosity and taffy-like character of the resin. These difficulties can be avoided by use of a stripping liquid, preferably in an amount sufficient to give about 20-50% of this volatile liquid in the reaction vessel. Preferred stripping liquid(s), which are further described in U.S. Pat. No. 2,824,855, should be capable of boiling in the presence of water thereby assisting in the removal of the water from the resin. In addition, the fluid should be substantially immiscible with the water at the temperature of the condensed liquids in the separator, and capable of boiling either at atmospheric pressure or non-atmospheric pressure within the range of about 71 to 99° C., preferably about 82 to 93.3° C. Preferred stripping liquids should not be capable of appreciable reaction with the resin or residual material.

Polymers (or oligomers) obtained by the taffy process may be further upgraded using a fusion process as described herein. Sterically hindered dihydric phenol compounds of formula (III) are conveniently upgraded using the nitrogen-containing catalysts described herein.

In certain preferred embodiments, the dihydric phenol compound of Formula (III) is substituted at one or both ortho ring positions of each depicted phenylene group with an $R^1$ group that includes from 1 to 4 carbon atoms, more preferably from 1 to 3 carbon atoms, and even more preferably 1 to 2 carbon atoms. In some embodiments, methyl groups are preferred ortho $R^1$ groups, with the methyl moiety (i.e., —CH$_3$) being particularly preferred. While not intending to be bound by any theory, it has been observed that the presence of large ortho substituent groups can sometimes affect the efficiency under standard processes by which certain dihydric phenol compounds of Formula (III) are converted into diepoxides using epichlorohydrin and, moreover, the efficiency under standard processes by which the resulting diepoxide can be upgraded into a polyether polymer having segments of Formula (I). Where desired the conversion and/or upgrade can be facilitated using the taffy process and/or the nitrogen-containing catalysts described herein.

The term "upgrade dihydric phenol" is used hereinafter to refer to a polyhydric phenol capable of participating in a reaction with the polyepoxide of Formula (II) to build molecular weight and preferably form a polymer. Any suitable upgrade polyhydric phenol may be used in forming a polymer of the present invention. However, the use of bisphenol A is not preferred. Preferred upgrade dihydric phenols are free of bisphenol A and preferably do not exhibit appreciable estrogenic activity.

Examples of suitable upgrade dihydric phenols for use in forming the polyether polymer under standard or improved processes include any of the compounds of Formula (III), with compounds of Formula (III) in which the hydroxyl group are unhindered by adjacent R groups being generally preferred for purposes of reaction efficiency when standard processes are used. Some specific examples of suitable upgrade dihydric phenols include hydroquinone, catechol, p-tert-butyl catechol, resorcinol, substituted variants thereof, or a mixture thereof. Hydroquinone is a presently preferred compound.

In some embodiments, the upgrade dihydric phenol is a compound of Formula (III) and includes an $R^2$ group having one or more cyclic groups (e.g., alicyclic and/or aromatic groups), which may be monocyclic or polycyclic groups (e.g., a divalent: norbornane, norbornene, tricyclodecane, bicyclo[4.4.0] decane, or isosorbide group, or a combination thereof). In some embodiments, $R^2$ of the upgrade dihydric phenol includes one or more ester linkages. For example, in some embodiments, $R^2$ is a —$R^6_w$—Z—$R^5$—Z—$R^6_w$— segment, where: $R^5$ is a divalent organic group; each $R^6$, if present, is independently a divalent organic group; each Z is independently an ester linkage that can be of either directionality (e.g., —C(O)—O— or —O—C(O)—; and each w is independently 0 or 1. In one such embodiment, $R^5$ includes at least one divalent cyclic group such as, for example, a divalent polycyclic group, a divalent aryl or heteroarylene group (e.g., a substituted or unsubstituted phenylene group) or a divalent alicyclic group (e.g., a substituted or unsubstituted cyclohexane or cyclohexene group). In one embodiment, $R^2$ is —$R^6_w$—C(O)—O—$R^5$—O—C(O)—$R^6_w$—. A further discussion of suitable segments containing ester linkages and materials for incorporating such segments into the polymer of the invention is provided in U.S. Published Application No. 2007/0087146 by Evans et. al. and Published International Application No. WO 2011/130671 by Niederst et al.

By way of example, an upgrade dihydric phenol having a cyclic-group-containing $R^2$ may be formed by reacting (a) a suitable amount (e.g., about 2 moles) of a Compound A having a phenol hydroxyl group and a carboxylic acid or other active hydrogen group with (b) a suitable amount (e.g., about 1 mole) of a di-functional or higher Compound B having one or more cyclic groups (monocyclic and/or polycyclic) and two or more active hydrogen groups capable of reacting with the active hydrogen group of Compound A. Examples of preferred Compounds A include 4-hydroxy phenyl acetic acid, 3-hydroxybenzoic acid, 4-hydroxybenzoic acid, and derivatives or mixtures thereof. Examples of preferred Compounds B include cyclic-containing diols such as cyclohexane dimethanol (CHDM); tricyclodecane dimethanol (TCDM); 2,2,4,4-Tetramethyl-1,3-cyclobutanediol; a polycyclic anyhydrosugar such as isosorbide, isomannide, or isoidide; and derivatives or mixtures thereof. In some embodiments, the cyclic group may be formed after reaction of Compounds A and B. For example, a Diels-Alder reaction (using, e.g., cyclopentadiene as a reactant) could be used to incorporate an unsaturated bicyclic group such as a norbornene group into Compound B, in which case Compound B in its unreacted form would need to include at least one non-aromatic carbon-carbon double bond in order to participate in the Diels-Alder reaction. For further discussion of suitable materials and techniques relating to such Diels-Alder reactions see, for example, Published International App. Nos. WO 2010/118356 by Skillman et al. and WO 2010/118349 by Hayes et al.

Some examples of cyclic-group-containing and ester-link-containing upgrade dihydric phenol compounds are provided below. These compounds are discussed in further detail in the previously referenced Published International Application No. WO 2011/130671 by Niederst et al.

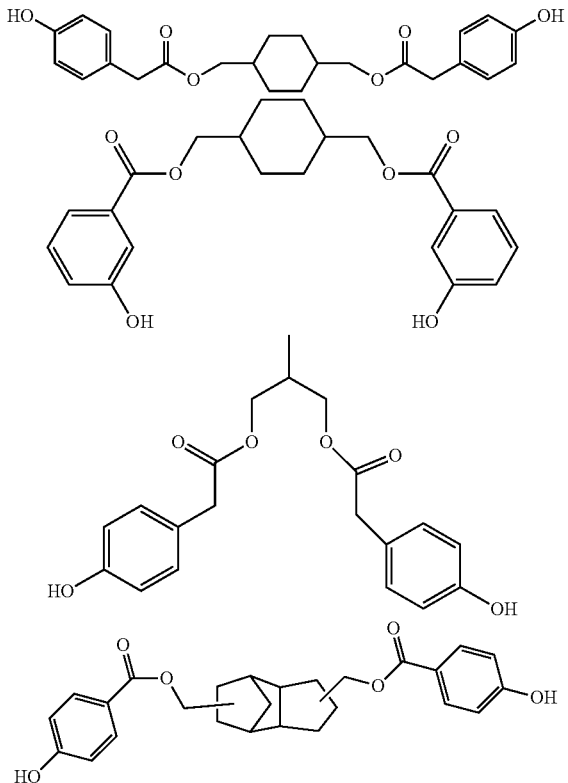

It is also contemplated that the polymer of the present invention may be formed via reaction of ingredients including the dihydric phenol compound of Formula (III) and a diepoxide other than that of Formula (II). Examples of such compounds include compounds such as 1,4-cyclohexanedimethanol diglycidyl ether (CHDMDGE), neopentyl glycol diglycidyl ether, 2-methy-1,3-propanediol diglycidyl ether, tricyclodecane dimethanol diglycidyl ether, and combinations thereof. While not intending to be bound by any theory, some such aliphatic diepoxides (e.g., CHDMDGE and neopentyl glycol diglycidyl ether) that tend to yield polymers having lower Tg values may not be suitable for certain interior packaging coating applications in which a relatively high Tg polymer is desirable for purposes of corrosion resistance, although they may be suitable for exterior packaging coating applications or other end uses.

If desired, one or more comonomers and/or co-oligomers may be included in the reactants used to generate the polymer of the present invention. Non-limiting examples of such materials include adipic acid, azelaic acid, terephthalic acid, isophthalic acid, and combinations thereof. The comonomers and/or cooligomers may be included in an initial reaction mixture of polyepoxide and polyhydric phenol and/or may be post-reacted with the resulting polyether oligomer or polymer. In presently preferred embodiments, a comonomer and/or co-oligomer is not utilized to produce a polyether polymer of the present invention.

Preferred polymers of the present invention may be made in a variety of molecular weights. Preferred polyether polymers of the present invention have a number average molecular weight (Mn) of at least 2,000, more preferably at least 3,000, and even more preferably at least 4,000. The molecular weight of the polyether polymer may be as high as is needed for the desired application. Typically, however, the Mn of the polyether polymer, when adapted for use in a liquid coating composition, will not exceed about 11,000. In some embodiments, the polyether polymer has an Mn of about 5,000 to about 8,000. In embodiments where the polymer of the present invention is a copolymer, such as for example a polyether-acrylic copolymer, the molecular weight of the overall polymer may be higher than that recited above, although the molecular weight of the polyether polymer portion will typically be as described above. Typically, however, such copolymers will have an Mn of less than about 20,000.

The polymer of the present invention may exhibit any suitable polydispersity index (PDI). In embodiments in which the polymer is a polyether polymer intended for use as a binder polymer of a liquid applied packaging coating (e.g., a food or beverage can coating), the polyether polymer will typically exhibit a PDI of from about 1.5 to 5, more typically from about 2 to 3.5, and in some instances from about 2.2 to 3 or about 2.4 to 2.8.

Advancement of the molecular weight of the polymer may be enhanced by the use of a catalyst in the reaction of a diepoxide with one or more upgrade co-monomers such as, e.g., a polyhydric phenol of Formula (IV). Typical conventional catalysts usable in the advancement of the molecular weight of the epoxy material of the present invention include conventional amines, hydroxides (e.g., potassium hydroxide), phosphonium salts, and the like. A presently preferred conventional catalyst is a phosphonium salt catalyst. The phosphonium catalyst useful in the present invention is preferably present in an amount sufficient to facilitate the desired condensation reaction.

As noted herein, some of the dihydric phenols of the present invention contain hindered phenol groups that lower the conversion and/or upgrade reaction efficiency of standard processes. While not intending to be bound by theory, it is believed that suitable catalysts for use when upgrading a hindered phenol have a balance of good basicity, good availability of the Nitrogen lone pair electrons, and poor or average nucleophilicity. A base, by one definition, is something that is good at donating its electrons, allowing it to accept a proton. A nucleophile is good at donating its electrons, allowing it to react with certain species called electrophiles, forming a bond. Sometimes a good base is also a good nucleophile (e.g., hydroxide and trimethylamine).

In general, for the purposes of facilitating the upgrade reaction of a hindered phenol it is believed that the catalyst should be both a good base and be configured such that the Nitrogen atom's lone pair electrons are readily "available." Preferred catalysts are sometimes poor nucleophiles, though this is not required. Catalysts having a "bridgehead nitrogen atom" generally have the steric configuration to make the lone pair electrons "available."

When using these phenols it is advantageous to use a nitrogen-containing catalyst having a balance of (i) sufficient basicity; (ii) sufficiently "available" lone pair electrons; and optionally (iii) generally poor or at best average nucleophilicity.

Particularly preferred catalysts have a pka of at least 9, more preferably at least 10, and most preferably at least 11.

Particularly preferred nitrogen-containing catalysts include catalysts having a bridgehead nitrogen atom, such as a polycyclic amidine base catalysts or an azabicycloalkane. The bridgehead structure tends to "pull back" the ligands of the Nitrogen atom, making the lone pair more readily available or unhindered.

In general terms suitable polycyclic amidine base catalysts are polycyclic and have segments of the following structure:

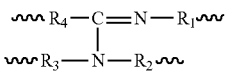

Where the $R_3$ and $R_4$ groups are preferably joined to form a ring structure and the $R_1$ and $R_2$ groups are preferably joined to form a ring structure.

Suitable polycyclic amidine base catalysts include by way of example:

1,5,7-Triazabicyclo(4.4.0)dec-5-ene (aka 1,3,4,6,7,8-Hexahydro-2H-pyrimido[1,2-a] pyrimidine, CAS #: 5807-14-7) (hereinafter "TBD")

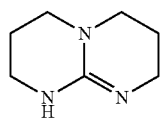

7-Methyl-1,5,7-triazabicyclo(4.4.0)dec-5-ene (aka 1,3,4,6,7,8-Hexahydro-1-methyl-2H-pyrimido [1,2-a]pyrimidine, CAS #: 84030-20-6) (hereinafter "MTBD")

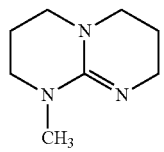

1,8-diazabicyclo[5.4.0]undec-7-ene (hereinafter "DBU")

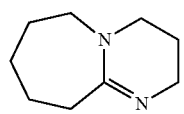

1,5-diazabicyclo[4.3.0]non-5-ene (hereinafter "DBN")

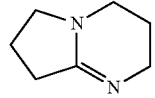

Other similar catalysts may be used if desired.

Suitable other catalysts having a bridgehead nitrogen atom include Quinuclidine (aka 1-Azabicyclo[2.2.2]octane, CAS #: 100-76-5).

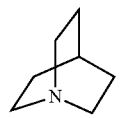

The order of basicity strength of some amines are listed below in decreasing order or strength:

Group I: polycyclic amidines (TBD, MTBD, DBU, DBN);

Group II: some aliphatic amines (Quinuclidine, 2,2,6,6-tetramethylpiperidine, Pempidine);

Group III: other aliphatic amines (e.g., Triethylamine, Triethylenediamine, Tributylamine);

Group IV: Aromatic amines (e.g., Collidine, Lutidine.

In general, stronger bases (e.g., bases having Group I and II level strength) are preferred, though it is the combination of base strength, lone pair availability and poor nucleophilicity that should be considered when selecting a suitable catalyst.

While not intending to be bound by theory, some compounds can be eliminated as suitable catalysts if the compound has (i) poor basicity and/or (ii) hindered lone pair electrons. For example, TED: 1,4-Diazabicyclo[2.2.2]octan; Triethylenediamine, CAS #: 280-57-9 was found not to function as a catalyst for a hindered phenol even though it has an otherwise promising bridgehead nitrogen atom. While not intending to be bound by theory, it is believed that this compound is deficient because its basicity is simply too low.

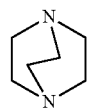

Also for example, Pempidine: 1,2,2,6,6-Pentamethylpiperidine, CAS #: 79-55-0 was found not to work function as a catalyst for a hindered phenol even though it has an otherwise promising basicity. While not intending to be bound by theory, it is believed that this compound is deficient because its lone pair is not sufficiently "available." Rather, the lone pair electrons are surrounded by five methyl groups.

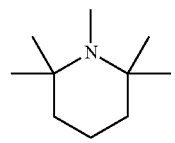

The amount of catalyst used may vary depending on the particular phenols being reacted, and other reaction conditions known in the art. In general, the amount of catalyst is generally less than 5 wt. %, preferably less than 1 wt. %, more preferably less than 0.5 wt. %, and optimally less than 0.2 wt. %, based on the total weight of polymer being made. Preferably the amount of catalyst used is at least 0.01 wt. %, more preferably at least 0.05 wt. % and most preferably at least 0.01 wt. %, based on the total weight of the polymer being made.

In preferred embodiments the reaction is carried out at somewhat elevated temperatures. Preferred reactions are carried out at temperatures between 110 and 210° C., more preferably between 120 and 200° C. Preferred reactions are completed in less than 24 hours, more preferably less than about 12 hours, and optimally in less than about 8 hours.

Alternatively, epoxy-terminated polymers of the present invention may be reacted with fatty acids to form polymers having unsaturated (e.g., air oxidizable) reactive groups, or with acrylic acid or methacrylic acid to form free-radically curable polymers.

Advancement of the molecular weight of the polymer may also be enhanced by the reaction of a hydroxyl- or epoxy-terminated polymer of the present invention with a suitable diacid (such as adipic acid).

As discussed above, in certain preferred embodiments, the coating composition of the present invention is suitable for use in forming a food-contact packaging coating. In order to exhibit a suitable balance of coating properties for use as a food-contact packaging coating, including suitable corrosion resistance when in prolonged contact with packaged food or beverage products which may be of a corrosive nature, the polymer of the present invention preferably has a glass transition temperature ("Tg") of at least 60° C., more preferably at least 70° C., and even more preferably at least 80° C. In preferred embodiments, the Tg is less than 150° C., more preferably less than 130° C., and even more preferably less than 110° C. Tg can be measured via differential scanning calorimetry ("DSC") using the methodology disclosed in the Test Methods section. In preferred embodiments, the polymer is a polyether polymer exhibiting a Tg pursuant to the aforementioned Tg values.

While not intending to be bound by any theory, it is believed that it is important that the polymer exhibit a Tg such as that described above in applications where the coating composition will be in contact with food or beverage products during retort processing at high temperature (e.g., at temperatures at or above about 100° C. and sometimes accompanied by pressures in excess of atmospheric pressure), and particularly when retort processing food or beverage products that are more chemically aggressive in nature. It is contemplated that, in some embodiments, such as, for example, where the coating composition is intended for use as an exterior varnish on a food or beverage container, the Tg of the polymer may be less than that described above (e.g., as low as about 30° C.) and the coating composition may still exhibit a suitable balance of properties in the end use.

When the Tg of a polymer is referenced herein in the context of a coating composition including the polymer or a coated article coated with such a coating composition, the indicated Tg value for the polymer refers to the Tg of the polymer prior to any cure of a coating composition including the polymer.

While not intending to be bound by any theory, it is believed that the inclusion of a sufficient number of aryl and/or heteroaryl groups (typically phenylene groups) in the binder polymer of the present invention is an important factor for achieving suitable coating performance for food-contact packaging coatings, especially when the product to be packaged is a so called "hard-to-hold" food or beverage product. Sauerkraut is an example of a hard-to-hold product. In preferred embodiments, aryl and/or heteroaryl groups constitute at least 25 wt-%, more preferably at least 30 wt-%, even more preferably at least 35 wt-%, and optimally at least 45 wt-% of the polyether polymer, based on the total weight of aryl and heteroaryl groups in the polymer relative to the weight of the polyether polymer. The upper concentration of aryl/heteroaryl groups is not particularly limited, but preferably the amount of such groups is configured such that the Tg of the polyether polymer is within the Tg ranges previously discussed. The total amount of aryl and/or heteroaryl groups in the polyether polymer will typically constitute less than about 80 wt-%, more preferably less than 75 wt-%, even more preferably less than about 70 wt-%, and optimally less than 60 wt-% of the polyether polymer. The total amount of aryl and/or heteroaryl groups in the polyether polymer can be determined based on the weight of aryl- or heteroaryl-containing monomer incorporated into the polyether polymer and the weight fraction of such monomer that constitutes aryl or heteroaryl groups. In embodiments where the polymer is a polyether copolymer (e.g., a polyether-acrylic copolymer), the weight fraction of aryl or heteroaryl groups in the polyether polymer portion(s) of the copolymer will generally be as described above, although the weight fraction relative to the total weight of the copolymer may be less.

Preferred aryl or heteroaryl groups include less than 20 carbon atoms, more preferably less than 11 carbon atoms, and even more preferably less than 8 carbon atoms. The aryl or heteroaryl groups preferably have at least 4 carbon atoms, more preferably at least 5 carbon atoms, and even more preferably at least 6 carbon atoms. Substituted or unsubstituted phenylene groups are preferred aryl or heteroaryl groups. Thus, in preferred embodiments, the polyether fraction of the polymer includes an amount of phenylene groups pursuant to the amounts recited above.

In one embodiment, the polymer of the present invention does not include any structural units derived from hydrogenated bisphenol A or a diepoxide of hydrogenated bisphenol A.

The polymers of the present invention can be applied to a substrate as part of a coating composition that includes a liquid carrier. The liquid carrier may be water, organic solvent, or mixtures of various such liquid carriers. Accordingly, liquid coating compositions of the present invention may be either water-based or solvent-based systems. Examples of suitable organic solvents include glycol ethers, alcohols, aromatic or aliphatic hydrocarbons, dibasic esters, ketones, esters, and the like, and combinations thereof. Preferably, such carriers are selected to provide a dispersion or solution of the polymer for further formulation.

It is expected that a polyether polymer of the present invention may be substituted for any conventional epoxy polymer present in a packaging coating composition known in the art. Thus, for example, the polyether polymer of the present invention may be substituted, for example, for a BPA/BADGE-containing polymer of an epoxy/acrylic latex coating system, for a BPA/BADGE-containing polymer of a solvent based epoxy coating system, etc. The amount of binder polymer of the present invention included in coating compositions may vary widely depending on a variety of considerations such as, for example, the method of application, the presence of other film-forming materials, whether the coating composition is a water-based or solvent-based system, etc. For liquid-based coating compositions, however, the binder polymer of the present invention will typically constitute at least 10 wt-%, more typically at least 30 wt-%, and even more typically at least 50 wt-% of the coating composition, based on the total weight of resin solids in the coating composition. For such liquid-based coating compositions, the binder polymer will typically constitute less than about 90 wt-%, more typically less than about 80 wt-%, and even more typically less than about 70 wt-% of the coating composition, based on the total weight of resin solids in the coating composition.

In one embodiment, the coating composition is an organic solvent-based composition preferably having at least 20 wt-% non-volatile components ("solids"), and more preferably at least 25 wt-% non-volatile components. Such organic solvent-based compositions preferably have no greater than 40 wt-% non-volatile components, and more preferably no greater than 25 wt-% non-volatile components. For this embodiment, the non-volatile film-forming components preferably include at least 50 wt-% of the polymer of the present invention, more preferably at least 55 wt-% of the polymer, and even more preferably at least 60 wt-% of the polymer. For this embodiment, the non-volatile film-forming components preferably include no greater than 95 wt-% of the polymer of the present invention, and more preferably no greater than 85 wt-% of the polymer.

In some embodiments, the coating composition of the present invention is a solvent-based system that includes no more than a de minimus amount of water (e.g., less than 2 wt-% of water), if any. One example of such a coating composition is a solvent-based coating composition that includes no more than a de minimus amount of water and includes: on a solids basis, from about 30 to 99 wt-%, more preferably from about 50 to 85 wt-% of polyether polymer of the present invention; a suitable amount of crosslinker (e.g., a phenolic crosslinker or anhydride crosslinker); and optionally inorganic filler (e.g., $TiO_2$) or other optional additives. In one such solvent-based coating composition of the present invention, the polyether polymer is a high molecular weight polyether polymer that preferably has an Mn of about 7,500 to about 10,500, more preferably about 8,000 to 10,000, and even more preferably about 8,500 to about 9,500.

In one embodiment, the coating composition is a water-based composition preferably having at least 15 wt-% non-volatile components. In one embodiment, the coating composition is a water-based composition preferably having no greater than 50 wt-% non-volatile components, and more preferably no greater than 40 wt-% non-volatile components. For this embodiment, the non-volatile components preferably include at least 5 wt-% of the polymer of the present invention, more preferably at least 25 wt-% of the polymer, even more preferably at least 30 wt-% of the polymer, and optimally at least 40 wt-% of the polymer. For this embodiment, the non-volatile components preferably include no greater than 70 wt-% of the polymer of the present invention, and more preferably no greater than 60 wt-% of the polymer.

If a water-based system is desired, techniques may be used such as those described in U.S. Pat. Nos. 3,943,187; 4,076,676; 4,247,439; 4,285,847; 4,413,015; 4,446,258; 4,963,602; 5,296,525; 5,527,840; 5,830,952; 5,922,817; 7,037,584; and 7,189,787. Water-based coating systems of the present invention may optionally include one or more organic solvents, which will typically be selected to be miscible in water. The liquid carrier system of water-based coating compositions will typically include at least 50 wt-% of water, more typically at least 75 wt-% of water, and in some embodiments more than 90 wt-% or 95 wt-% of water. Any suitable means may be used to render the polymer of the present invention miscible in water. For example, the polymer may include a suitable amount of salt groups such as ionic or cationic salt groups to render the polymer miscible in water (or groups capable of forming such salt groups). Neutralized acid or base groups are preferred salt groups.

In some embodiments, the polymer of the present invention is covalently attached to one or more materials (e.g., oligomers or polymers) having salt or salt-forming groups to render the polymer water-dispersible. The salt or salt-forming group containing material may be, for example, oligomers or polymers that are (i) formed in situ prior to, during, or after formation of the polymer of the present invention or (ii) provided as preformed materials that are reacted with a preformed, or nascent, polymer of the present invention. The covalent attachment may be achieved through any suitable means including, for example, via reactions involving carbon-carbon double bonds, hydrogen abstraction (e.g., via a reaction involving benzoyl peroxide mediated grafting via hydrogen abstraction such as, e.g., described in U.S. Pat. No. 4,212,781), or the reaction of complimentary reactive functional groups such as occurs, e.g., in condensation reactions.

In one embodiment, a linking compound is utilized to covalently attach the polyether polymer and the salt- or salt-forming-group-containing material. In certain preferred embodiments, the one or more materials having salt or salt-forming groups is an acrylic material, more preferably an acid- or anhydride-functional acrylic material.

In one embodiment, a water-dispersible polymer may be formed from preformed polymers (e.g., (a) an oxirane-functional polymer, such as, e.g., a polyether polymer, preferably having at least one segment of Formula (I) and (b) an acid-functional polymer such as, e.g., an acid-functional acrylic polymer) in the presence of an amine, more preferably a tertiary amine. If desired, an acid-functional polymer can be combined with an amine, more preferably a tertiary amine, to at least partially neutralize it prior to reaction with an oxirane-functional polymer preferably having at least one segment of Formula (I).

In another embodiment, a water-dispersible polymer may be formed from an oxirane-functional polymer (more preferably a polyether polymer described herein) preferably having at least one segment of Formula (I) that is reacted with ethylenically unsaturated monomers to form an acid-functional polymer, which may then be neutralized, for example, with a base such as a tertiary amine. Thus, for example, in one embodiment, a water-dispersible polymer preferably having at least one segment of Formula (I) may be formed pursuant to the acrylic polymerization teachings of U.S. Pat. Nos. 4,285,847 and/or 4,212,781, which describe techniques for grafting acid-functional acrylic groups (e.g., via use of benzoyl peroxide) onto epoxy-functional polymers. In another embodiment, acrylic polymerization may be achieved through reaction of ethylenically unsaturated monomers with unsaturation present in the polymer preferably containing at least one segment of Formula (I). See, for example, U.S. Pat. No. 4,517,322 and/or U.S. Published Application No. 2005/0196629 for examples of such techniques.

In another embodiment, a water-dispersible polymer may be formed having the structure E-L-A, wherein E is an epoxy portion of the polymer formed from a polyether polymer described herein, A is a polymerized acrylic portion of the polymer, and L is a linking portion of the polymer which covalently links E to A. Such a polymer can be prepared, for example, from (a) a polyether polymer described herein preferably having about two epoxy groups, (b) an unsaturated linking compound preferably having (i) a carbon-carbon double bond, a conjugated carbon-carbon double bonds or a carbon-carbon triple bond and (ii) a functional group capable of reacting with an epoxy group (e.g., a carboxylic group, a hydroxyl group, an amino group, an amido group, a mercapto group, etc.). Preferred linking compounds include 12 or less carbon atoms, with sorbic acid being an example of a preferred such linking compound. The acrylic portion preferably includes one or more salt groups or salt-forming groups (e.g., acid groups such as present in α,β-ethylenically saturated carboxylic acid monomers). Such polymers may be formed, for example, using a BPA- and BADGE-free polyether polymer of the present invention in combination with the materials and techniques disclosed in U.S. Pat. No. 5,830,952 or U.S. Published Application No. 2010/0068433.

In some embodiments, the coating composition of the present invention is substantially free of acrylic components. For example, in some embodiment the coating composition includes less than about 5 wt-% or less than about 1 wt-% of polymerized acrylic monomers (e.g., a mixture of ethylenically unsaturated monomers that include at least some monomer selected from acrylic acid, methacrylic acid, or esters thereof).

In another embodiment, a polymer preferably containing segments of Formula (I) and including —$CH_2$—CH(OH)—$CH_2$— or —$CH^2$—$CH_2$—CH(OH)— segments, which are derived from an oxirane, is reacted with an anhydride. This provides acid functionality which, when combined with an amine or other suitable base to at least partially neutralize the acid functionality, is water dispersible.

In some embodiments, the coating composition of the present invention is a low VOC coating compositions that preferably includes no greater than 0.4 kilograms ("kg") of volatile organic compounds ("VOCs") per liter of solids, more preferably no greater than 0.3 kg VOC per liter of solids, even more preferably no greater than 0.2 kg VOC per liter of solids, and optimally no greater than 0.1 kg VOC per liter of solids.

Reactive diluents may optionally be used to yield such low VOC coating compositions. The reactive diluent preferably functions as a solvent or otherwise lowers the viscosity of the blend of reactants. The use of one or more reactive diluents as a "solvent" eliminates or reduces the need to incorporate a substantial amount of other cosolvents (such as butanol) during processing.

Reactive diluents suitable for use in the present invention preferably include free-radical reactive monomers and oligomers. A small amount of reactive diluent that can undergo reaction with the polymer of the present invention may be used (e.g., hydroxy monomers such as 2-hydroxy ethylmethacrylate, amide monomers such as acrylamide, and N-methylol monomers such as N-methylol acrylamide). Suitable reactive diluents include, for example, vinyl compounds, acrylate compounds, methacrylate compounds, acrylamides, acrylonitriles, and the like and combinations thereof. Suitable vinyl compounds include, for example, vinyl toluene, vinyl acetate, vinyl chloride, vinylidene chloride, styrene, substituted styrenes, and the like and combinations thereof. Suitable acrylate compounds include butyl acrylate, ethyl acrylate, 2-ethylhexyl acrylate, isobutyl acrylate, tert-butyl acrylate, methyl acrylate, 2-hydroxyethyl acrylate, poly(ethylene glycol)acrylate, isobornyl acrylate, and combinations thereof. Suitable methacrylate compounds include, for example, butyl methacrylate, methyl methacrylate, ethyl methacrylate, isobutyl methacrylate, 2-hydroxyethyl methacrylate, poly(ethylene glycol)methacrylate, poly(propylene glycol)methacrylate, and the like and combinations thereof. Preferred reactive diluents include styrene and butyl acrylate. U.S. Pat. No. 7,037,584 provides additional discussion of suitable materials and methods relating to the use of reactive diluents in low-VOC packaging coating compositions.

Any suitable amount of one or more reactive diluents may optionally be employed in coating composition of the present invention. For example, an amount of one or more reactive diluents sufficient to achieve the VOC content of the aforementioned low-VOC coating compositions may be used. In some embodiments, the coating composition includes at least about 1 wt-%, at least about 5 wt-%, or at least 10 wt-% of polymerized reactive diluent.

In one embodiment, a polyether polymer of the present invention is blended, in any suitable order, with acrylic component (e.g., acrylic resin) and reactive diluent. The polyether polymer and the acrylic component are preferably reacted with one another (although they may be used as a simple blend), either before or after addition of reactive diluents, to form a polyether-acrylate copolymer. The polyether-acrylate and the reactive diluents are preferably further dispersed in water. The reactive diluent is then preferably polymerized in the presence of the polyether-acrylate copolymer to form a coating composition having the desired low VOC content. In this context, the term "reactive diluent" relates to monomers and oligomers that are preferably essentially non-reactive with the polyether resin or any carboxylic acid moiety (or other functional group) that might be present, e.g., on the acrylic resin, under contemplated blending conditions. The reactive diluents are also preferably capable of undergoing a reaction to form a polymer, described as an interpenetrating network with the polymer of the present invention, or with unsaturated moieties that may optionally be present, e.g., on an acrylic resin.

A coating composition of the present invention may also include other optional ingredients that do not adversely affect the coating composition or a cured coating composition resulting therefrom. Such optional ingredients are typically included in a coating composition to enhance composition esthetics; to facilitate manufacturing, processing, handling, or application of the composition; or to further improve a particular functional property of a coating composition or a cured coating composition resulting therefrom. For example, the composition that includes a polymer of the present invention may optionally include crosslinkers, fillers, catalysts, lubricants, pigments, surfactants, dyes, colorants, toners, coalescents, extenders, anticorrosion agents, flow control agents, thixotropic agents, dispersing agents, antioxidants, oxygen-scavenging materials, adhesion promoters, light stabilizers, and mixtures thereof, as required to provide the desired film properties. Each optional ingredient is preferably included in a sufficient amount to serve its intended purpose, but not in such an amount to adversely affect a coating composition or a cured coating composition resulting therefrom.

Preferred compositions are substantially free of one or both of mobile BPA or mobile BADGE, and more preferably essentially free of these compounds, even more preferably essentially completely free of these compounds, and optimally completely free of these compounds. The coating composition (and preferably each ingredient included therein) is also preferably substantially free of one or both of bound BPA and bound BADGE, more preferably essentially free of these compounds, even more preferably essentially completely free of these compounds, and optimally completely free of these compounds. In addition, preferred compositions (and preferably each ingredient included therein) are also substantially free, more preferably essentially free, even more preferably essentially completely free, and optimally completely free of one or more or all of: bisphenol S, bisphenol F, and the diglycidyl ether of bisphenol F or bisphenol S.

It has been discovered that coating compositions incorporating the aforementioned polymer-containing compositions may be formulated using one or more optional curing agents (e.g., crosslinking resins, sometimes referred to as "crosslinkers"). The choice of particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker.

Preferred curing agents are substantially free of mobile or bound BPA and BADGE and more preferably completely free of mobile or bound BPA and BADGE. Suitable examples of such curing agents are hydroxyl-reactive curing resins such as phenoplasts, aminoplast, blocked or unblocked isocyanates, or mixtures thereof.

Suitable phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, cyclopentylphenol, and compounds of Formula (III) or any other polyhydric phenols disclosed herein.

Suitable aminoplast resins are the condensation products of aldehydes such as formaldehyde, acetaldehyde, crotonaldehyde, and benzaldehyde with amino- or amido-group-containing substances such as urea, melamine, and benzoguanamine. Examples of suitable aminoplast crosslinking resins include, without limitation, benzoguanamine-formaldehyde resins, melamine-formaldehyde resins, etherified melamine-formaldehyde, and urea-formaldehyde resins.

Examples of other generally suitable curing agents are the blocked or non-blocked aliphatic, cycloaliphatic or aromatic di-, tri-, or poly-valent isocyanates, such as hexamethylene diisocyanate, cyclohexyl-1,4-diisocyanate, and the like. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have an Mn of at least about 300, more preferably at least about 650, and even more preferably at least about 1,000.

Polymeric blocked isocyanates are useful in certain embodiments. Some examples of suitable polymeric blocked isocyanates include a biuret or isocyanurate of a diisocyanate, a trifunctional "trimer," or a mixture thereof. Examples of suitable blocked polymeric isocyanates include TRIXENE BI 7951, TRIXENE BI 7984, TRIXENE BI 7963, TRIXENE BI 7981 (TRIXENE materials are available from Baxenden Chemicals, Ltd., Accrington, Lancashire, England), DESMODUR BL 3175A, DESMODUR BL3272, DESMODUR BL3370, DESMODUR BL 3475, DESMODUR BL 4265, DESMODUR PL 340, DESMODUR VP LS 2078, DESMODUR VP LS 2117, and DESMODUR VP LS 2352 (DESMODUR materials are available from Bayer Corp., Pittsburgh, Pa., USA), or combinations thereof. Examples of suitable trimers may include a trimerization product prepared from on average three diisocyanate molecules or a trimer prepared from on average three moles of diisocyanate (e.g., HMDI) reacted with one mole of another compound such as, for example, a triol (e.g., trimethylolpropane).

The level of curing agent (e.g., crosslinker) used will typically depend on the type of curing agent, the time and temperature of the bake, the molecular weight of the binder polymer, and the desired coating properties. If used, the crosslinker is typically present in an amount of up to 50 wt-%, preferably up to 30 wt-%, and more preferably up to 15 wt-%. If used, a crosslinker is preferably present in an amount of at least 0.1 wt-%, more preferably at least 1 wt-%, and even more preferably at least 1.5 wt-%. These weight percentages are based upon the total weight of the resin solids in the coating composition.

In some embodiments, the coating composition of the present invention are "formaldehyde-free" coatings that include, or liberate as a result of curing, no greater than 1% by weight formaldehyde, no greater than 0.5% by weight formaldehyde, no greater than 0.25% by weight formaldehyde, or no greater than 5 ppm formaldehyde. The absence of phenolic resin and/or melamine is believed to contribute to a coating composition that is appreciably free of formaldehyde.

As previously discussed, in some embodiments, the coating composition of the present invention includes an acrylic component which may optionally be covalently attached to the polyether polymer described herein. In some embodiments, the acrylic component may be present as a separate polymer blended with the polyether polymer (in addition to any acrylic component that may optionally be covalently attached to the polyether polymer).

The coating composition of the present invention may include any amount of acrylic component suitable to produce the desired film or coating properties. In some acrylic-component-containing embodiments, the coating composition includes an amount of acrylic component of at least about 5 wt-%, more preferably at least about 10 wt-%, and even more preferably at least about 15 wt-%, as determined by an amount of a monomer mixture used to prepare the acrylic component and based on the total weight of resin solids in the coating system. In such embodiments, the coating composition preferably includes an amount of acrylic component of less than about 95 wt-%, more preferably less than about 75 wt-%, and even more preferably less than about 30 to 40 wt-%, as determined by an amount of a monomer mixture used to prepare the acrylic component and based on the total weight of resin solids in the coating system.

In certain water-based embodiments in which at least some of the acrylic component is covalently attached to the polyether polymer, at least a portion of the acrylic monomers used to form the acrylic component are preferably capable of rending the polyether polymer dispersible in water. In such embodiments, the acrylic component is preferably formed from an ethylenically unsaturated monomer mixture that includes one or more α,β-unsaturated carboxylic acid. The one or more α,β-unsaturated carboxylic acid preferably renders the polymer water-dispersible after neutralization with a base. Suitable α,β-unsaturated carboxylic acid monomers include, for example, acrylic acid, methacrylic acid, crotonic acid, itaconic acid, maleic acid, mesaconic acid, citraconic acid, sorbic acid, fumaric acid, and mixtures thereof. The acrylic monomer also can include, for example, acrylamide or methacrylamide, which can render the polymer water dispersible. Preferred acrylic components for use in packaging coating applications are substantially free, or completely free, of acrylamide- or methacrylamide-type monomers.

The acrylic monomers used to form the acrylic component can include 0% up to about 95%, by total weight of monomers, of vinyl monomers.

The acrylic component preferably includes one or more non-functional monomers and one or more functional monomers (more preferably acid-functional monomers, and even more preferably acid-functional acrylic monomers). In presently preferred embodiments, the acrylic component includes one or more vinyl monomers. The acrylic component is preferably prepared through chain-growth polymerization using one or more ethylenically unsaturated monomers.

Examples of suitable ethylenically unsaturated non-functional monomers such as styrene, halostyrenes, α-methylstyrene, alkyl esters of acrylic acid (e.g., methyl acrylate, ethyl acrylate, butyl acrylate, etc.), alkyl esters of methacrylic acid and/or crotonic acid (e.g., methyl, ethyl, propyl, butyl, pentyl, hexyl, octyl, decyl, dodecyl methacrylates and crotonates), vinyl cyclohexane, vinyl cyclooctane, vinyl cyclohexene, hexanediol diacrylate, dimethyl maleate, dibutyl fumarate and similar diesters, vinyl naphthalene, vinyl toluene, vinyl acetate, vinyl propionate, vinyl cyclooctane, ally methacrylate, 2-ethylhexyl acrylate, and diesters of maleic anhydride. Preferred non-functional monomers include styrene, ethyl acrylate, butyl methacrylate, and combinations thereof.

Examples of functional monomers include α,β-unsaturated carboxylic acids such as, e.g., those previously described; amide-functional monomers; hydroxy-functional monomers (e.g., hydroxyalkyl acrylate or methacrylate monomers such as hydroxyethyl acrylate (HEA), hydroxyethyl methacrylate (HEMA), hydroxypropyl acrylate (HPA), hydroxypropyl methacrylate (HPMA), etc.); oxirane-functional monomers (e.g., glycidyl acrylate and glycidyl methacrylate) and variations and combinations thereof. Preferred non-functional monomers include styrene, ethyl acrylate, butyl methacrylate, and combinations thereof. Preferred functional monomers include acrylic acid, methacrylic acid, and combinations thereof.

The combination and/or ratio(s) of the above monomers of the acrylic component may be adjusted to provide a desired coating or film property. Preferably, at least a portion of the above monomers of the acrylic component are capable of rendering the resin system dispersible in an aqueous carrier. Examples of monomers capable of rendering the resin system dispersible in an aqueous carrier include acid-functional monomers that form salt groups upon neutralization with a base.

While not intending to be bound by theory, it is believed that, for certain embodiments of the present invention, the Tg of the acrylic component is a factor that can contribute to coating compositions exhibiting suitable resistance to retort processes associated with certain food and beverage products. In general, the Fox equation may be employed to calculate the theoretical Tg of the acrylic component. In some embodiments, the acrylic component has a Tg of at least about 40° C., preferably at least about 60° C., more preferably at least about 80° C., and even more preferably at least about 90° C. By way of example, a water-dispersible polymer having an E-L-A described previously herein can include an acrylic component having such a Tg. The acrylic component preferably has a Tg of less than about 280° C., more preferably less than about 220° C., even more preferably less than about 180° C., even more preferably less than about 160° C., and optimally less than about 150° C. In some embodiments, the acrylic component has a Tg of less than about 130° C., or less than about 120° C. In some embodiments, the acrylic component has a Tg greater than about 100° C., more preferably from about 100° C. to about 120° C.

In other embodiments, it may be beneficial to use an acrylic component having a Tg of less than 50° C., 40° C., or even less than 30° C. For example, in certain embodiments in which high resistance to retort processing conditions is not a requirement, such an acrylic component may be used to confer one or more other desired properties.

A coating composition of the present invention may also include other optional polymers that do not adversely affect the coating composition or a cured coating composition resulting therefrom. Such optional polymers are typically included in a coating composition as a filler material, although they can also be included, for example, as a binder polymer, a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom.

Such additional polymeric materials can be nonreactive, and hence, simply function as fillers. Such optional nonreactive filler polymers include, for example, polyesters, acrylics, polyamides, polyethers, and novalacs. Alternatively, such additional polymeric materials or monomers can be reactive with other components of the composition (e.g., an acid-functional or unsaturated polymer). If desired, reactive polymers can be incorporated into the compositions of the present invention, to provide additional functionality for various purposes, including crosslinking or dispersing the polymer of the present invention into water. Examples of such reactive polymers include, for example, functionalized polyesters, acrylics, polyamides, and polyethers. Preferred optional polymers are substantially free or essentially free of bound BPA and BADGE, and more preferably essentially completely free or completely free of bound such compounds.

One preferred optional ingredient is a catalyst to increase the rate of cure. Examples of catalysts, include, but are not limited to, strong acids (e.g., phosphoric acid, dodecylbenzene sulphonic acid (DDBSA), available as CYCAT 600 from Cytec, methane sulfonic acid (MSA), p-toluene sulfonic acid (pTSA), dinonylnaphthalene disulfonic acid (DNNDSA), and triflic acid); quaternary ammonium compounds; phosphorous compounds; and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material in the coating composition. If used, a catalyst is preferably present in an amount of no greater than 3 wt-%, and more preferably no greater than 1 wt-%, based on the weight of nonvolatile material in the coating composition.

Another useful optional ingredient is a lubricant (e.g., a wax), which facilitates manufacture of fabricated metal articles (e.g., closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the coating composition in an amount of at least 0.1 wt-%, and preferably no greater than 2 wt-%, and more preferably no greater than 1 wt-%, based on the total weight of nonvolatile material in the coating composition.

Another useful optional ingredient is a pigment, such as titanium dioxide. If used, a pigment is present in the coating composition in an amount of no greater than 70 wt-%, more preferably no greater than 50 wt-%, and even more preferably no greater than 40 wt-%, based on the total weight of solids in the coating composition.

Surfactants can be optionally added to the coating composition, e.g., to aid in flow and wetting of the substrate. Examples of surfactants, include, but are not limited to, nonylphenol polyethers and salts and similar surfactants known to persons skilled in the art. If used, a surfactant is preferably present in an amount of at least 0.01 wt-%, and more preferably at least 0.1 wt-%, based on the weight of resin solids. If used, a surfactant is preferably present in an amount no greater than 10 wt-%, and more preferably no greater than 5 wt-%, based on the weight of resin solids.

In some embodiments, the polyether polymer of the invention is included in a layer of a monolayer or multilayer coating system including a layer incorporating a thermoplastic dispersion (e.g., a halogenated polyolefin dispersion such as, e.g., a polyvinylchloride ("PVC") organosol). In one embodiment, the polyether polymer is included a primer layer of such a multilayer coating system including another layer (e.g., a top layer) incorporating a thermoplastic dispersion. Such multilayer coating systems are described in the application entitled "Container Coating System" (Attorney Docket Number 160-P-2218USP1) filed on even date herewith. In another embodiment, the polyether polymer is included in the layer incorporating the thermoplastic dispersion, e.g., as a stabilizer for PVC and/or as a co-resin, which is described in the application entitled "Stabilizer and Coating Compositions Thereof" (Attorney Docket Number 160P-2207USP1) filed on even date herewith.

In some embodiments, the coating composition is "PVC-free." That is, in some embodiments, the coating composition preferably contains less than 2 wt-% of vinyl chloride materials, more preferably less than 0.5 wt-% of vinyl chloride materials, and even more preferably less than 1 ppm of vinyl chloride materials.

The coating composition of the present invention can be present as a layer of a mono-layer coating system or one or more layers of a multi-layer coating system. The coating composition can be used as a primer coat, an intermediate coat, a top coat, or a combination thereof. The coating thickness of a particular layer and the overall coating system will vary depending upon the coating material used, the substrate, the coating application method, and the end use for the coated article. Mono-layer or multi-layer coating systems including one or more layers formed from a coating composition of the present invention may have any suitable overall coating thickness, but will typically have an overall average dry coating thickness of from about 1 to about 60 microns and more typically from about 2 to about 15 microns. Typically, the average total coating thickness for rigid metal food or beverage can applications will be about 3 to about 10 microns. Coating systems for closure applications may have an average total coating thickness up to about 15 microns. In certain embodiments in which the coating composition is used as an interior coating on a drum (e.g., a drum for use with food or beverage products), the total coating thickness may be approximately 25 microns.

The coating composition of the present invention may be applied to a substrate either prior to, or after, the substrate is formed into an article (such as, for example, a food or beverage container or a portion thereof). In one embodiment, a method is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, riveted beverage can ends having a cured coating of the present invention on a surface thereof can be formed in such a process. In another embodiment, the coating composition is applied to a pre-formed metal food or beverage can, or a portion thereof. For example, in some embodiments, the coating composition is spray applied to an interior surface of a preformed food or beverage can (e.g., as typically occurs with "two-piece" food or beverage cans). After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the present invention can be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If metal coil is the substrate to be coated, curing of the applied coating composition may be conducted, for example, by heating the coated metal substrate over a suitable time period to a peak metal temperature ("PMT") of preferably greater than about 350° F. (177° C.). More preferably, the coated metal coil is heated for a suitable time period (e.g., about 5 to 900 seconds, more typically about 5 to 30 seconds) to a PMT of at least about 425° F. (218° C.).

The coating compositions of the present invention are particularly useful for coating metal substrates. The coating compositions may be used to coat packaging articles such as a food or beverage container, or a portion thereof. In preferred embodiments, the container is a food or beverage can and the surface of the container is the surface of a metal substrate. The polymer can be applied to a metal substrate either before or after the substrate is formed into a can (e.g., two-piece cans, three-piece cans) or portions thereof, whether it be a can end or can body. Preferred polymers of the present invention are suitable for use in food-contact situations and may be used on the inside of such cans. They are particularly useful on the interior of two-piece or three-piece can ends or bodies.

The metal substrate used in forming rigid food or beverage cans, or portions thereof, typically has a thickness in the range of about 0.005 inches to about 0.025 inches. Electro tinplated steel, cold-rolled steel, and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The coating compositions of the present invention may be suitable, for example, for spray coating, coil coating, wash coating, sheet coating, and side seam coating (e.g., food can side seam coating). A further discussion of such application methods is provided below. It is contemplated that coating compositions of the present invention may be suitably used in each of these application methods discussed further below, including the end uses associated therewith.

Spray coating includes the introduction of the coated composition into the inside of a preformed packaging container. Typical preformed packaging containers suitable for spray coating include food cans, beer and beverage containers, and the like. The spray process preferably utilizes a spray nozzle capable of uniformly coating the inside of the preformed packaging container. The sprayed preformed container is then subjected to heat to remove any residual carriers (e.g., water or solvents) and harden the coating.

In one embodiment, the coating composition of the present invention is a water-based "inside spray" coating suitable for spray application to the interior surfaces of a two-piece food or beverage can, which preferably includes from about 15 to about 40 wt-% of nonvolatile materials, more preferably 15 to 25 wt-% nonvolatile materials for inside spray for two-piece beer and beverage cans. Preferred inside spray coatings of the present invention are capable of passing both the Initial Metal Exposure and Metal Exposure After Drop Can Damage tests described in the below Test Methods section.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like. In one embodiment, the coating composition of the present invention is a water-based coating composition that is applied to aluminum or steel coating from which riveted beverage can ends are subsequently fabricated. Accordingly, in certain preferred embodiments, the coating composition is capable of passing the Metal Exposure test described in the below Test Methods.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets." Typical dimensions of these sheets are approximately one square meter. Once coated, the coating is hardened (e.g., dried and cured) and the coated sheets are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends (including, e.g., riveted beverage can ends having a rivet for attaching a pull tab thereto), and the like. In one embodiment, the coating composition of the present invention is a solvent-based coating composition that is applied to steel or aluminum sheets that are subsequently fabricated into the above described packaging articles.

A side seam coating is described as the application of a powder coating or the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of coating, which protects the exposed "weld" from subsequent corrosion or other effects to the contained foodstuff. The coatings that function in this role are termed "side seam stripes." Typical side seam stripes are spray applied and cured quickly via residual heat from the welding operation in addition to a small thermal, ultraviolet, and/or electromagnetic oven.

Other commercial coating application and curing methods are also envisioned, for example, electrocoating, extrusion coating, laminating, powder coating, and the like.

In certain preferred embodiments, the coating composition of the present invention is capable of exhibiting one or more (and in some embodiments all) of the following coating properties: good blush resistance, good corrosion resistance, good stain resistance, good flexibility (e.g., good resistance to drop can damage, suitability for use as a beverage can end coating, etc), and good adhesion to metal substrate), when subjected to the testing described below in Examples.

In embodiments in which the coating composition is intended for use as an internal packaging coating, the coating composition, when suitably cured, preferably has suitable corrosion resistance to withstand prolonged contact with the packaged product, as well as any processing conditions, without unsuitably degrading. Preferred interior packaging coating compositions, when applied on suitable metal substrate (e.g., a metal substrate used in the below Examples section) at a coating thickness consistent with that typically used in the particular packaging end use and suitably cured, are capable of withstanding being immersed in a 2% aqueous NaCl solution for 90 minutes at a temperature of 121° C. and a pressure of 1.05 kilograms per square centimeter without exhibiting any unsuitable film integrity reduction such as blistering or loss of adhesion (e.g., using the methods of the Test Methods section). Preferred interior beverage can end coatings are preferably capable of passing the above test using an aqueous 1% citric acid solution in place of the 2% NaCl solution.

The polymer of the present invention can be used in powder coating applications, e.g., for use in forming an adherent polymeric coating. Thus, in some embodiments, the coating composition of the present invention is a powder coating composition that preferably does not include a liquid carrier (although it may include trace amounts of residual water or organic solvent). The powder coating composition is preferably in the form of a finely divided, free flowing powder. In preferred embodiments, the powder composition is a thermosettable powder composition that forms a thermoset coating when suitably cured. The discussion that follows relates to powder coating embodiments of the present invention.

The powder coating composition of the present invention may be particularly useful in end uses in which a coated substrate is intended to contact substances for consumption by humans or intimate contact with humans. For example, the powder coating compositions may be used to coat: surfaces of food or beverage containers, cosmetic containers, or medicinal containers; surfaces of valves and fittings, including surfaces intended for contact with potable water or other consumable liquids; surfaces of pipes, including internal surfaces of water pipes or other liquid conveying pipes; and surfaces of tanks, including internal surfaces of water tanks such as bolted steel tanks. For powder coatings that will contact potable water, the cured powder coating composition should preferably comply with ANSI NSF standard 61. Some examples of fittings include articles for use in liquid conveying systems (e.g., for use in conveying potable water) such as connectors (e.g., threaded or flanged connectors), elbows, flow splitters (e.g., T-fittings, etc.), backflow preventers, pipe end caps, and the like.

The powder coating composition preferably includes at least a film-forming amount of the polymer of the present invention, which in preferred embodiments is a polyether polymer having segments of Formula (I). In order to facilitate stability of the powder coating composition during storage prior to use, a polymer of the present invention is preferably selected that has a Tg of at least about 40° C., more preferably at least about 50° C., and even more preferably at least about 60° C. The powder coating composition preferably includes at least about 50 wt-%, more preferably at least 70 wt-%, and even more preferably at least 90 wt-% of the polymer of the present invention, based on total resin solids.

Powder coating compositions typically utilize binder polymers having a different molecular weight (typically a lower molecular weight) than those of liquid packaging coating compositions for use on metal food or beverage cans. When used in powder coating compositions, the polymer of the present invention preferably has a number average molecular weight (Mn) of at least about 1,000, more preferably at least about 1,200, and even more preferably at least about 1,500. In such applications, the polymer of the present invention preferably has an Mn of less than about 6,000, more preferably less than about 5,000, and even more preferably less than about 4,000.

The powder coating composition preferably includes at least one base powder that includes the polymer of the present invention. The base powder may further include one or more optional ingredients, which may include any suitable ingredients disclosed herein. The base powder preferably includes the polymer of the present invention as a major component on a weight basis, and more preferably includes at least 50 wt-% of the polymer. In some embodiments, the polymer of the present invention comprises all or substantially all of the base powder.

The particles of the base powder may be of any suitable size. Preferably, the particles of the base powder exhibit a particle size diameter of from about 1 micron to about 200 microns, more preferably from about 10 to about 150 microns.

The base powder may exhibit any suitable distribution of particle sizes. In some embodiments, the median particle size of the base powder is preferably at least about 20 microns, more preferably at least about 30 microns, and even more preferably at least about 40 microns. In some embodiments, the median particle size is preferably less than about 150 microns, more preferably less than about 100 microns, and even more preferably less than about 60 microns. The median particle sizes referenced in this paragraph are median diameter particle sizes expressed on a volume basis, which may be determined, for example, via laser diffraction.

Powder compositions of the present invention may also contain one or more other optional ingredients. The optional ingredients preferably do not adversely affect the powder compositions or articles formed therefrom. Such optional ingredients may be included, for example, to enhance aesthetics; to facilitate manufacturing, processing, and/or handling of powder compositions or articles formed therefrom; and/or to further improve a particular property of powder compositions or articles formed therefrom. Each optional ingredient is preferably included in a sufficient amount to serve its intended purpose, but not in such an amount to adversely affect a powder composition or a cured coating resulting therefrom. The one or more optional ingredients may be present in a same or different particle than the polymer of the present invention, or a combination thereof. In preferred embodiments, one or more optional ingredients are present in the particles of the base powder along with the polymer of the present invention. If present in particles other than those of the base powder, the particles of the optional ingredient(s) preferably have a particle size in the general range of the particles sizes of the base powder.

The powder composition preferably includes one or more optional curing agents (e.g., crosslinkers). Suitable curing agents may include phenolic crosslinkers, preferably BPA-free phenolic crosslinkers; dicyandiamide, which may be optionally substituted; carboxyl-functional compounds such as, e.g., carboxyl-functional polyester resins or carboxyl-functional acrylic resins; and combinations thereof. The powder composition may include any suitable amount of the one or more crosslinkers. In some embodiments, crosslinker is present in the powder composition in an amount of up to about 15 wt-%, preferably up to about 10 wt-%, and more preferably up to about 5 wt-%, based on the total weight of the powder coating composition. If used, crosslinker is preferably present in an amount of at least about 0.1 wt-%, more preferably at least about 0.5 wt-%, and even more preferably at least about 1 wt %, based on the total weight of the powder coating composition.

An optional cure accelerator may be present in the powder coating composition to facilitate cure. When used, the powder coating composition typically includes from about 0.1 wt-% to about 3 wt-% of one or more cure accelerators. 2-methylimidazole is an example of a preferred cure accelerator. Other suitable cure accelerators may include imidazoles, phosphonium salts, tertiary amines, quaternary ammonium salts, anhydrides, polyamides, aliphatic amines, epoxy resin-amine adducts, and combinations thereof.

The powder coating composition may optionally include one or more flow control agents to improve the flow, wetting, and/or leveling properties of the cured film. If used, flow control agents are typically present in an amount of about 0.01 wt-% to about 5 wt-%, more typically from about 0.2 wt-% to about 2 wt-%, based on the total weight of the powder coating composition. Examples of suitable flow control agents include polyacrylates such as poly(2-ethylhexyl acrylate) and various co-polymers of 2-ethylhexyl acrylate.

The powder coating composition may optionally include one or more fluidizing agents to facilitate the preparation of a free-flowing powder composition. If used, fluidizing agent is typically present in an amount of about 0.01 wt-% to about 5 wt-%, more typically from about 0.05 wt-% to about 0.5 wt-%, based on the total weight of the powder coating composition. Suitable fluidizing agents include, for example, fumed silicas of a suitable particle size. Such fluidizing agents may preferably be added after the melt blending process, such as to the extruded flake before or after grinding.

Inorganic filler and/or colored pigment may optionally be included in the powder coating compositions. Examples of suitable such materials may include calcium silicates such as, e.g., wollastonite; barium sulfate; calcium carbonate; mica; talc; silica; iron oxide; titanium dioxide; carbon black; phthalocyanines; chromium oxide; and combinations thereof.

The powder coating compositions can be prepared via any suitable methods. In one embodiment, some or all of the ingredients are melt-blended together, which may be accomplished, for example, using conventional single-screw or twin-screw extruders. The temperature of the melt-blending step is preferably controlled to avoid any appreciable cross-linking. Typically, a melt-blending temperature is selected such that the temperature of the molten blend does not exceed about 100° C. to about 150° C. The ingredients may optionally be pre-mixed prior to melt blending. After melt blending and cooling, the resulting blend, which is typically an extrudate, can be processed into powder using conventional milling techniques. The resulting milled powder can optionally be sieved to remove particles falling outside the desired particle size range. The powder can optionally be mixed with one or more additional powders to form the finished powder coating composition. For example, in some embodiments, the milled powder is combined with fluidizing agent powder either before or after optional sieving.

The powder coatings compositions can be applied to substrate using any suitable method. Typically, the substrate is a metal substrate (e.g., cast iron, steel, etc.), which may be bare metal or may be optionally pretreated and/or primed. One suitable such method is the electrostatic spray application of charged powder to substrate. Alternatively, the substrate may be applied, for example, by dipping the substrate in a fluidized powder bed. In a preferred embodiment, the powder is applied to heated substrate that has been heated to between 190° C. and 240° C. Upon contacting the heated metal substrate, the powder melts, reacts, and forms a continuous coating that is preferably smooth and uniform. In another embodiment, the powder is applied to a near ambient temperature substrate and the powder coated substrate is then heated to a temperature sufficient to cause the powder to melt, react, and form a continuous coating that is preferably smooth and uniform.

The melting and curing (e.g., crosslinking) of the powder composition may be performed in combined or discrete heating steps. In presently preferred embodiments, a combined heating step is used in which the powder coating composition is heated to a temperature sufficient to both melt the powder and cure the resulting continuous coating. The bake temperature and the duration of the bake will vary depending upon a variety of factors, including, for example, the end use. For purposes of curing the coating, the bake temperature is typically at least about 150° C., and more typically at least about 200° C. In general, a lower cure temperature may be used if a longer cure time is employed. The cure temperature typically will not exceed about 240° C. The cure time may range, for example, from about 30 seconds to about 30 minutes, depending upon the cure temperature and the end use.

The thickness of the cured powder coating will vary depending upon the particular end use. However, typically the cured powder coating will have an average coating thickness in the range of about 25 to about 1,500 microns, and more typically about 50 to about 500 microns. In some embodiments, an average coating thickness in the range of about 125 to about 300 microns is used.

EMBODIMENTS

Some additional non-limiting embodiments are provided below to further exemplify the present invention.

Embodiment 1: A polymer, more preferably a polyether polymer, having one or more segments of the below Formula (I):

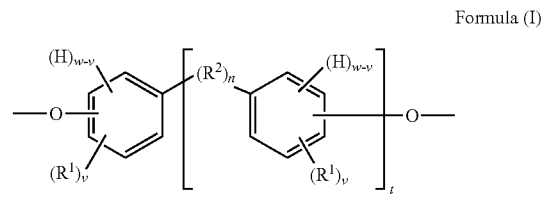

Formula (I)

wherein:
each of the pair of oxygen atoms depicted in Formula (I) is preferably present in an ether or ester linkage, more preferably an ether linkage;
H denotes a hydrogen atom, if present;
each $R^1$ is independently an atom or group preferably having an atomic weight of at least 15 Daltons, wherein each of the phenylene groups depicted in Formula (I) preferably includes at least one $R^1$ attached to the ring at an ortho or meta position relative to the oxygen atom;
v is independently 0 to 4, preferably 1 to 4, more preferably 2 to 4;
w is 4;
$R^2$, if present, is preferably a divalent group;
n is 0 or 1, with the proviso that if n is 0, the phenylene groups depicted in Formula (I) can optionally join to form a fused ring system with each other (e.g., a substituted naphthalene group), in which case w is 3 and v is 0 to 4;
t is 0 or 1;
wherein two or more $R^1$ and/or $R^2$ groups can join to form one or more cyclic groups; and
the polymer is preferably free of bound BPA or BADGE.

Embodiment 2: A polymer, more preferably a polyether polymer, that is the reaction product of ingredients including:

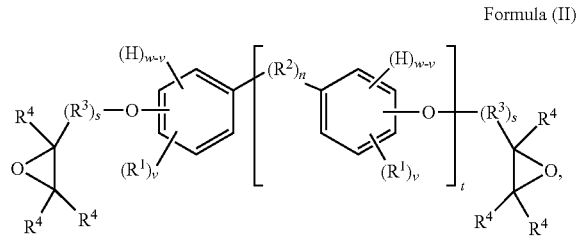

Formula (II)

wherein:
$R^1$, $R^2$, n, t, v, and w are as described above for Formula (I);
each of the phenylene groups depicted in Formula (I) includes at least one $R^1$ that is preferably attached to the ring at an ortho or meta position relative to the depicted oxygen atom, more preferably an ortho position;
s is 0 to 1;

R³, if present, is a divalent group, more preferably a divalent organic group; and preferably each R⁴ is independently a hydrogen atom, a halogen atom, or a hydrocarbon group that may include one or more heteroatoms.

Embodiment 3: A coating composition comprising the polymer of Embodiments 1 or 2 (preferably in at least a film-forming amount) and one or more optional ingredients selected from a crosslinker and a liquid carrier.

Embodiment 4: An article (preferably a packaging article, more preferably a food or beverage container or a portion thereof) having a substrate (preferably a metal substrate), wherein the coating composition of Embodiment 3 is applied on at least a portion of the substrate.

Embodiment 5: A method comprising: providing a substrate (preferably a metal substrate) and applying the coating composition of Embodiment 3 on at least a portion of the substrate.

Embodiment 6: A polymer, coating composition, article, or method of any preceding embodiment, wherein the polymer and/or coating composition is at least substantially free of BPA or BADGE.

Embodiment 7: A polymer, coating composition, article, or method of any preceding embodiment, wherein each of the depicted phenylene groups in Formula (I) or Formula (II) has at least one ortho or meta $R^1$ (relative to the depicted oxygen) that is an organic group, more preferably an organic group that includes from 1 to 4 carbon atoms, even more preferably 1 to 2 carbon atoms.

Embodiment 8: A polymer, coating composition, article, or method of any preceding embodiment, wherein each of the depicted phenylene groups in Formula (I) or Formula (II) has at least one ortho or meta $R^1$ (relative to the depicted oxygen) that is independently a group selected from substituted or unsubstituted methyl groups, ethyl groups, propyl groups, butyl groups, or an isomer thereof.

Embodiment 9: A polymer, coating composition, article, or method of any preceding embodiment, wherein each phenylene group depicted in Formula (I) or Formula (II) includes $R^1$'s attached to the ring at both ortho positions relative to the depicted oxygen atom.

Embodiment 10: A polymer, coating composition, article, or method of any preceding embodiment, wherein the segment of Formula (I) is derived from 4,4'-methylenebis(2,6-di-t-butylphenol); 2,2'-methylenebis(4-methyl-6-t-butylphenol); 4,4'-methylenebis(2,6-dimethylphenol); 4,4'butylidenebis(2-t-butyl-5-methylphenol), 2,5-di-t-butylhydroquinone, a derivative thereof, or a diepoxide thereof (more preferably a diglycidyl ether thereof).

Embodiment 11: A polymer, coating composition, article, or method of any preceding embodiment, wherein each phenylene group depicted in Formula (I) or Formula (II) includes at least one $R^1$ attached to the ring at an ortho position relative to the depicted oxygen atom.

Embodiment 12: A polymer, coating composition, article, or method of any preceding embodiment, wherein both t and n are 1.

Embodiment 13: A polymer, coating composition, article, or method of any preceding embodiment, wherein both t and n are 1 and $R^2$ has an atomic mass of less than 500, more less than 200, or less than 100.

Embodiment 14: A polymer, coating composition, article, or method of any preceding embodiment, wherein $R^2$ is an organic group containing either (i) 1 or 2 carbon atoms or (ii) at least: 8, 9, 10, 11, 12, 13 or 14 carbon atoms.

Embodiment 14.5: A polymer, coating composition, article, or method of any preceding embodiment, wherein both t and n are 1 and $R^2$ is an organic group of the formula —C($R^7$)($R^8$)—, wherein $R^7$ and $R^8$ are each independently a hydrogen atom, a halogen atom, an organic group, a sulfur-containing group, a nitrogen-containing group, or any other suitable group that is preferably substantially non-reactive with an epoxy group, and wherein $R^7$ and $R^8$ can optionally join to form a cyclic group.

Embodiment 15: A polymer, coating composition, article, or method of any preceding embodiment, wherein the polymer (preferably a polyether polymer) includes one or more pendant hydroxyl groups attached to backbone carbon atoms.

Embodiment 16: A polymer, coating composition, article, or method of any preceding embodiment, wherein a backbone of the polymer includes one or both of —CH₂—CH(OH)—CH₂— or —CH²—CH₂—CH(OH)— segments.

Embodiment 17: A polymer, coating composition, article, or method of any preceding embodiment, wherein the —CH₂—CH(OH)—CH₂— or —CH²—CH₂—CH(OH)- segments are attached to each of the ether oxygen atoms depicted in Formula (I).

Embodiment 18: A polymer, coating composition, article, or method of any preceding embodiment, wherein the polymer (preferably a polyether polymer) has a Tg of at least 60° C., more preferably at least 70° C., even more preferably at least 80° C.

Embodiment 19: A polymer, coating composition, article, or method of any preceding embodiment, wherein aryl or heteroaryl groups (more typically phenylene groups) constitute at least 20 wt-% of the polyether polymer, based on the total weight of aryl and heteroaryl groups present in the polymer relative to the weight of the polymer.

Embodiment 20: A polymer, coating composition, article, or method of any preceding embodiment, wherein the polymer includes a plurality of segments of Formula (I) and, in some embodiments, includes at least: 1 wt-%, 5 wt-%, 10 wt-%, 20 wt-%, 30 wt-%, or 50 wt-% of the segments of Formula (I).

Embodiment 21: A polymer, coating composition, article, or method of any preceding embodiment, wherein the polymer is a polyether polymer and the polyether polymer (or polyether polymer fraction of a copolymer such as a polyether-acrylic copolymer) includes at least 20 wt-%, at least 30 wt-%, or at least 50 wt-% of segments of Formula (I).

Embodiment 22: A polymer, coating composition, article, or method of any preceding embodiment, wherein the polymer and/or coating composition is at least substantially free of acrylic (e.g., includes less than 1 wt-% of polymerized acrylic monomers, if any).

Embodiment 23: A polymer, coating composition, article, or method of any preceding embodiment, wherein the polymer includes a plurality of segments of Formula (I), wherein t is 1 and $R^2$ includes one or more ester backbone ester linkages.

Embodiment 24: A polymer, coating composition, article, or method of Embodiment 23, wherein $R^2$ includes one or more monocyclic or polycyclic groups.

Embodiment 25: A polymer, coating composition, article, or method of any preceding embodiment, wherein the polymer comprises a polyether polymer that is a reaction product of ingredients including (i) a diepoxide having a segment of Formula (I) or a diepoxide compound of Formula (II) and (ii) a dihydric phenol.

Embodiment 26: A polymer, coating composition, article, or method of Embodiment 25, wherein one or more (and more preferably all) of the following are true:
(a) the diepoxide of (i) is formed from a dihydric phenol that does not exhibit appreciable estrogenic activity);
(b) the diepoxide of (i) does not exhibit mutagenicity or any other unsuitable genotoxicity (e.g., the diepoxide is non-genotoxic in the comet assay); and
(c) the dihydric phenol of (ii) does not exhibit appreciable estrogenic activity.

Embodiment 27: A polymer, coating composition, article, or method of Embodiment 25, wherein the dihydric phenol is of the formula:

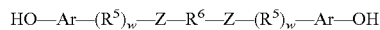

HO—Ar—$(R^5)_w$—Z—$R^6$—Z—$(R^5)_w$—Ar—OH wherein:
each Ar is independently a divalent aryl group or heteroaryl group (more typically a substituted or unsubstituted phenylene group);
each $R^5$, if present, is independently a divalent organic group;
$R^6$ is a divalent organic group;
each Z is independently an ester linkage of either directionality (e.g., —C(O)—O— or —O—C(O)—); and
each w is 0 or 1.

Embodiment 28: A polymer, coating composition, article, or method of any preceding embodiment, wherein the polymer has an Mn of from 2,000 to 20,000.

Embodiment 29: A coating composition, article, or method of any preceding embodiment, wherein the coating composition, by weight total resin solids, includes at least 5 wt-% or 10 wt-% of the polyether polymer.

Embodiment 30: A coating composition, article, or method of any preceding embodiment, wherein the coating composition is a food-contact coating.

Embodiment 31: A coating composition, article, or method of any preceding embodiment, wherein the coating composition is one of: a solvent-based coating composition or a water-based coating composition.

Embodiment 32: A coating composition, article, or method of any preceding embodiment, wherein the coating composition is a water-based coating composition that is at least substantially free of acrylic.

Embodiment 33: A method of any preceding embodiment, wherein the substrate is formed into a packaging container or a portion thereof (e.g., a food or beverage container or a portion thereof) after application of the coating composition.

Embodiment 34: A method or article of any preceding embodiment, wherein the coated article comprises a metal food or beverage container, a cosmetic container, a pharmaceutical container, or a portion thereof (e.g., a can end) having the coating composition applied to one or more of: an exterior surface or an interior (i.e., product-contact) surface.

Embodiment 35: A coating composition, article, or method of any of Embodiments 1-30, 33, and 34, wherein the coating composition comprises a powder coating composition.

Embodiment 36: The article or Embodiment 35, wherein the article is an article for conveying or storing potable water (e.g., a water valve, water fitting, water pipe, a bolted steel water tank or a panel for use therein, etc.).

Embodiment 37: The polymer, coating composition, article, or method of any preceding embodiment wherein one or both of the polymer or the coating composition are at least substantially free, more preferably essentially free, even more preferably essentially completely free, and optimally completely free of bound polyhydric phenol compounds, or epoxides thereof, that exhibit a degree of estrogen agonist activity, in a competent in vitro human estrogen receptor assay (e.g., the MCF-7 assay) greater than that exhibited by 4,4'-(propane-2,2-diyl)diphenol in the assay.

Embodiment 38: The polymer, coating composition, article, or method of any preceding embodiment wherein one or both of the polymer or the coating composition are at least substantially free, more preferably essentially free, even more preferably essentially completely free, and optimally completely free of bound polyhydric phenol compounds, or epoxides thereof, that exhibit a degree of estrogen agonist activity, in a competent in vitro human estrogen receptor assay (e.g., the MCF-7 assay) greater than that exhibited by bisphenol S in the assay.

Embodiment 39: The polymer, coating composition, article, or method of any preceding embodiment wherein one or both of the polymer or the coating composition are at least substantially free, more preferably essentially free, even more preferably essentially completely free, and optimally completely free of bound polyhydric phenol compounds, or epoxides thereof, that exhibit a degree of estrogen agonist activity, in a competent in vitro human estrogen receptor assay (e.g., the MCF-7 assay) greater than that exhibited by 4,4'-(propane-2,2-diyl)bis(2,6-dibromophenol) in the assay, Embodiment 40: The polymer, coating composition, article, or method of any preceding embodiment wherein one or both of the polymer or the coating composition are at least substantially free, more preferably essentially free, even more preferably essentially completely free, and optimally completely free of bound polyhydric phenol compounds, or diepoxides thereof, that exhibit a degree of estrogen agonist activity, in a competent in vitro human estrogen receptor assay (e.g., the MCF-7 assay) greater than that exhibited by 2,2-bis(4-hydroxyphenyl)propanoic acid in the assay.

Segments of Formula (I) and compounds of Formulas (II) or (III) wherein each of the depicted phenylene groups include one or two ortho $R^1$ groups (relative to the depicted oxygen atom) are preferred in some embodiments. Below is a table exemplifying some non-limiting combinations of one or more ortho $R^1$ and $R^2$, if present, for a given phenylene group. The table is non-limiting with respect to the ring position of $R^2$ (e.g., ortho, meta, para), although typically $R^2$, if present, will be located at a para position relative to the oxygen atom. The columns labeled "Ortho Position A" and "Ortho Position B" indicate the $R^1$ group present at each ortho position of the phenylene group (assuming $R^2$ is not located at an ortho position). Positions "A" or "B" can be either ortho position relative to the depicted oxygen atom. If $R^2$ is located at an ortho position of the phenylene group, then the group listed in the "Ortho Position B" column is not present. Typically, though not required, the phenylene groups in a given segment of Formula (IA) or compound of Formula (IIA) or (IIIA) will be "symmetric" relative to the second phenylene group such that the same ortho group (as delineated in the ortho position column "A" or "B") is located on each ring at the same ortho position.

The below table is also intended as a listing of independent examples of $R^1$ or $R^2$, as well as examples of combinations of $R^1$ and $R^2$ (regardless of whether $R^1$ is ortho or meta relative to the oxygen atom, whether other $R^1$ are present in a particular phenylene group, or whether the one or more W are the same for both of the phenylene groups).

| Ortho Position "A" | Ortho Position "B" | R² |
|---|---|---|
| Butyl | Hydrogen | 2-Butylidene |
| Butyl | Methyl | 2-Butylidene |
| Butyl | Ethyl | 2-Butylidene |
| Butyl | Propyl | 2-Butylidene |
| Butyl | Isopropyl | 2-Butylidene |
| Butyl | Butyl | 2-Butylidene |
| Ethyl | Hydrogen | 2-Butylidene |
| Ethyl | Methyl | 2-Butylidene |
| Ethyl | Ethyl | 2-Butylidene |
| Isopropyl | Hydrogen | 2-Butylidene |
| Isopropyl | Methyl | 2-Butylidene |
| Isopropyl | Ethyl | 2-Butylidene |
| Isopropyl | Propyl | 2-Butylidene |
| Isopropyl | Isopropyl | 2-Butylidene |
| Methyl | Hydrogen | 2-Butylidene |
| Methyl | Methyl | 2-Butylidene |
| Propyl | Hydrogen | 2-Butylidene |
| Propyl | Methyl | 2-Butylidene |
| Propyl | Ethyl | 2-Butylidene |
| Propyl | Propyl | 2-Butylidene |
| sec-Butyl | Hydrogen | 2-Butylidene |
| sec-Butyl | Methyl | 2-Butylidene |
| sec-Butyl | Ethyl | 2-Butylidene |
| sec-Butyl | Propyl | 2-Butylidene |
| sec-Butyl | Isopropyl | 2-Butylidene |
| sec-Butyl | Butyl | 2-Butylidene |
| sec-Butyl | sec-Butyl | 2-Butylidene |
| tert-Butyl | Hydrogen | 2-Butylidene |
| tert-Butyl | Methyl | 2-Butylidene |
| tert-Butyl | Ethyl | 2-Butylidene |
| tert-Butyl | Propyl | 2-Butylidene |
| tert-Butyl | Isopropyl | 2-Butylidene |
| tert-Butyl | Butyl | 2-Butylidene |
| tert-Butyl | sec-Butyl | 2-Butylidene |
| tert-Butyl | tert-Butyl | 2-Butylidene |
| Butyl | Hydrogen | Butylene |
| Butyl | Methyl | Butylene |
| Butyl | Ethyl | Butylene |
| Butyl | Propyl | Butylene |
| Butyl | Isopropyl | Butylene |
| Butyl | Butyl | Butylene |
| Ethyl | Hydrogen | Butylene |
| Ethyl | Methyl | Butylene |
| Ethyl | Ethyl | Butylene |
| Isopropyl | Hydrogen | Butylene |
| Isopropyl | Methyl | Butylene |
| Isopropyl | Ethyl | Butylene |
| Isopropyl | Propyl | Butylene |
| Isopropyl | Isopropyl | Butylene |
| Methyl | Hydrogen | Butylene |
| Methyl | Methyl | Butylene |
| Propyl | Hydrogen | Butylene |
| Propyl | Methyl | Butylene |
| Propyl | Ethyl | Butylene |
| Propyl | Propyl | Butylene |
| sec-Butyl | Hydrogen | Butylene |
| sec-Butyl | Methyl | Butylene |
| sec-Butyl | Ethyl | Butylene |
| sec-Butyl | Propyl | Butylene |
| sec-Butyl | Isopropyl | Butylene |
| sec-Butyl | Butyl | Butylene |
| sec-Butyl | sec-Butyl | Butylene |
| tert-Butyl | Hydrogen | Butylene |
| tert-Butyl | Methyl | Butylene |
| tert-Butyl | Ethyl | Butylene |
| tert-Butyl | Propyl | Butylene |
| tert-Butyl | Isopropyl | Butylene |
| tert-Butyl | Butyl | Butylene |
| tert-Butyl | sec-Butyl | Butylene |
| tert-Butyl | tert-Butyl | Butylene |
| Butyl | Hydrogen | Ethylidene |
| Butyl | Methyl | Ethylidene |
| Butyl | Ethyl | Ethylidene |
| Butyl | Propyl | Ethylidene |
| Butyl | Isopropyl | Ethylidene |
| Butyl | Butyl | Ethylidene |
| Ethyl | Hydrogen | Ethylidene |
| Ethyl | Methyl | Ethylidene |
| Ethyl | Ethyl | Ethylidene |
| Isopropyl | Hydrogen | Ethylidene |
| Isopropyl | Methyl | Ethylidene |
| Isopropyl | Ethyl | Ethylidene |
| Isopropyl | Propyl | Ethylidene |
| Isopropyl | Isopropyl | Ethylidene |
| Methyl | Hydrogen | Ethylidene |
| Methyl | Methyl | Ethylidene |
| Propyl | Hydrogen | Ethylidene |
| Propyl | Methyl | Ethylidene |
| Propyl | Ethyl | Ethylidene |
| Propyl | Propyl | Ethylidene |
| sec-Butyl | Hydrogen | Ethylidene |
| sec-Butyl | Methyl | Ethylidene |
| sec-Butyl | Ethyl | Ethylidene |
| sec-Butyl | Propyl | Ethylidene |
| sec-Butyl | Isopropyl | Ethylidene |
| sec-Butyl | Butyl | Ethylidene |
| sec-Butyl | sec-Butyl | Ethylidene |
| tert-Butyl | Hydrogen | Ethylidene |
| tert-Butyl | Methyl | Ethylidene |
| tert-Butyl | Ethyl | Ethylidene |
| tert-Butyl | Propyl | Ethylidene |
| tert-Butyl | Isopropyl | Ethylidene |
| tert-Butyl | Butyl | Ethylidene |
| tert-Butyl | sec-Butyl | Ethylidene |
| tert-Butyl | tert-Butyl | Ethylidene |
| Butyl | Hydrogen | Methylidene |
| Butyl | Methyl | Methylidene |
| Butyl | Ethyl | Methylidene |
| Butyl | Propyl | Methylidene |
| Butyl | Isopropyl | Methylidene |
| Butyl | Butyl | Methylidene |
| Ethyl | Hydrogen | Methylidene |
| Ethyl | Methyl | Methylidene |
| Ethyl | Ethyl | Methylidene |
| Isopropyl | Hydrogen | Methylidene |
| Isopropyl | Methyl | Methylidene |
| Isopropyl | Ethyl | Methylidene |
| Isopropyl | Propyl | Methylidene |
| Isopropyl | Isopropyl | Methylidene |
| Methyl | Hydrogen | Methylidene |
| Methyl | Methyl | Methylidene |
| Propyl | Hydrogen | Methylidene |
| Propyl | Methyl | Methylidene |
| Propyl | Ethyl | Methylidene |
| Propyl | Propyl | Methylidene |
| sec-Butyl | Hydrogen | Methylidene |
| sec-Butyl | Methyl | Methylidene |
| sec-Butyl | Ethyl | Methylidene |
| sec-Butyl | Propyl | Methylidene |
| sec-Butyl | Isopropyl | Methylidene |
| sec-Butyl | Butyl | Methylidene |
| sec-Butyl | sec-Butyl | Methylidene |
| tert-Butyl | Hydrogen | Methylidene |
| tert-Butyl | Methyl | Methylidene |
| tert-Butyl | Ethyl | Methylidene |
| tert-Butyl | Propyl | Methylidene |
| tert-Butyl | Isopropyl | Methylidene |
| tert-Butyl | Butyl | Methylidene |
| tert-Butyl | sec-Butyl | Methylidene |
| tert-Butyl | tert-Butyl | Methylidene |
| Butyl | Hydrogen | Propylidene |
| Butyl | Methyl | Propylidene |
| Butyl | Ethyl | Propylidene |
| Butyl | Propyl | Propylidene |
| Butyl | Isopropyl | Propylidene |
| Butyl | Butyl | Propylidene |
| Ethyl | Hydrogen | Propylidene |
| Ethyl | Methyl | Propylidene |
| Ethyl | Ethyl | Propylidene |
| Isopropyl | Hydrogen | Propylidene |
| Isopropyl | Methyl | Propylidene |
| Isopropyl | Ethyl | Propylidene |
| Isopropyl | Propyl | Propylidene |
| Isopropyl | Isopropyl | Propylidene |
| Methyl | Hydrogen | Propylidene |
| Methyl | Methyl | Propylidene |

| Ortho Position "A" | Ortho Position "B" | $R^2$ |
|---|---|---|
| Propyl | Hydrogen | Propylidene |
| Propyl | Methyl | Propylidene |
| Propyl | Ethyl | Propylidene |
| Propyl | Propyl | Propylidene |
| sec-Butyl | Hydrogen | Propylidene |
| sec-Butyl | Methyl | Propylidene |
| sec-Butyl | Ethyl | Propylidene |
| sec-Butyl | Propyl | Propylidene |
| sec-Butyl | Isopropyl | Propylidene |
| sec-Butyl | Butyl | Propylidene |
| sec-Butyl | sec-Butyl | Propylidene |
| tert-Butyl | Hydrogen | Propylidene |
| tert-Butyl | Methyl | Propylidene |
| tert-Butyl | Ethyl | Propylidene |
| tert-Butyl | Propyl | Propylidene |
| tert-Butyl | Isopropyl | Propylidene |
| tert-Butyl | Butyl | Propylidene |
| tert-Butyl | sec-Butyl | Propylidene |
| tert-Butyl | tert-Butyl | Propylidene |
| Butyl | Hydrogen | 1-phenylethylidene |
| Butyl | Methyl | 1-phenylethylidene |
| Butyl | Ethyl | 1-phenylethylidene |
| Butyl | Propyl | 1-phenylethylidene |
| Butyl | Isopropyl | 1-phenylethylidene |
| Butyl | Butyl | 1-phenylethylidene |
| Ethyl | Hydrogen | 1-phenylethylidene |
| Ethyl | Methyl | 1-phenylethylidene |
| Ethyl | Ethyl | 1-phenylethylidene |
| Isopropyl | Hydrogen | 1-phenylethylidene |
| Isopropyl | Methyl | 1-phenylethylidene |
| Isopropyl | Ethyl | 1-phenylethylidene |
| Isopropyl | Propyl | 1-phenylethylidene |
| Isopropyl | Isopropyl | 1-phenylethylidene |
| Methyl | Hydrogen | 1-phenylethylidene |
| Methyl | Methyl | 1-phenylethylidene |
| Propyl | Hydrogen | 1-phenylethylidene |
| Propyl | Methyl | 1-phenylethylidene |
| Propyl | Ethyl | 1-phenylethylidene |
| Propyl | Propyl | 1-phenylethylidene |
| sec-Butyl | Hydrogen | 1-phenylethylidene |
| sec-Butyl | Methyl | 1-phenylethylidene |
| sec-Butyl | Ethyl | 1-phenylethylidene |
| sec-Butyl | Propyl | 1-phenylethylidene |
| sec-Butyl | Isopropyl | 1-phenylethylidene |
| sec-Butyl | Butyl | 1-phenylethylidene |
| sec-Butyl | sec-Butyl | 1-phenylethylidene |
| tert-Butyl | Hydrogen | 1-phenylethylidene |
| tert-Butyl | Methyl | 1-phenylethylidene |
| tert-Butyl | Ethyl | 1-phenylethylidene |
| tert-Butyl | Propyl | 1-phenylethylidene |
| tert-Butyl | Isopropyl | 1-phenylethylidene |
| tert-Butyl | Butyl | 1-phenylethylidene |
| tert-Butyl | sec-Butyl | 1-phenylethylidene |
| tert-Butyl | tert-Butyl | 1-phenylethylidene |
| Butyl | Hydrogen | Diphenylmethylidene |
| Butyl | Methyl | Diphenylmethylidene |
| Butyl | Ethyl | Diphenylmethylidene |
| Butyl | Propyl | Diphenylmethylidene |
| Butyl | Isopropyl | Diphenylmethylidene |
| Butyl | Butyl | Diphenylmethylidene |
| Ethyl | Hydrogen | Diphenylmethylidene |
| Ethyl | Methyl | Diphenylmethylidene |
| Ethyl | Ethyl | Diphenylmethylidene |
| Isopropyl | Hydrogen | Diphenylmethylidene |
| Isopropyl | Methyl | Diphenylmethylidene |
| Isopropyl | Ethyl | Diphenylmethylidene |
| Isopropyl | Propyl | Diphenylmethylidene |
| Isopropyl | Isopropyl | Diphenylmethylidene |
| Methyl | Hydrogen | Diphenylmethylidene |
| Methyl | Methyl | Diphenylmethylidene |
| Propyl | Hydrogen | Diphenylmethylidene |
| Propyl | Methyl | Diphenylmethylidene |
| Propyl | Ethyl | Diphenylmethylidene |
| Propyl | Propyl | Diphenylmethylidene |
| sec-Butyl | Hydrogen | Diphenylmethylidene |
| sec-Butyl | Methyl | Diphenylmethylidene |
| sec-Butyl | Ethyl | Diphenylmethylidene |
| sec-Butyl | Propyl | Diphenylmethylidene |
| sec-Butyl | Isopropyl | Diphenylmethylidene |
| sec-Butyl | Butyl | Diphenylmethylidene |
| sec-Butyl | sec-Butyl | Diphenylmethylidene |
| tert-Butyl | Hydrogen | Diphenylmethylidene |
| tert-Butyl | Methyl | Diphenylmethylidene |
| tert-Butyl | Ethyl | Diphenylmethylidene |
| tert-Butyl | Propyl | Diphenylmethylidene |
| tert-Butyl | Isopropyl | Diphenylmethylidene |
| tert-Butyl | Butyl | Diphenylmethylidene |
| tert-Butyl | sec-Butyl | Diphenylmethylidene |
| tert-Butyl | tert-Butyl | Diphenylmethylidene |

Test Methods

Unless indicated otherwise, the following test methods were utilized in the Examples that follow.

Differential Scanning calorimetry

Samples for differential scanning calorimetry ("DSC") testing were prepared by first applying the liquid resin composition onto aluminum sheet panels. The panels were then baked in a Fisher Isotemp electric oven for 20 minutes at 300° F. (149° C.) to remove volatile materials. After cooling to room temperature, the samples were scraped from the panels, weighed into standard sample pans and analyzed using the standard DSC heat-cool-heat method. The samples were equilibrated at −60° C., then heated at 20° C. per minute to 200° C., cooled to −60° C., and then heated again at 20° C. per minute to 200° C. Glass transitions were calculated from the thermogram of the last heat cycle. The glass transition was measured at the inflection point of the transition.

Adhesion

Adhesion testing is performed to assess whether the coating adheres to the coated substrate. The adhesion test was performed according to ASTM D 3359—Test Method B, using SCOTCH 610 tape (available from 3M Company of Saint Paul, Minn.). Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

Corrosion

Corrosion is a measure of a coatings ability to resist a corrosive/acidic environment. It is generally measured on a scale of 0-10. A "0" indicates the coating is completely corroded, observed by bubbling or blistering of the film in all areas. A "10" indicates the coating is unchanged from before it was subjected to the corrosive environment.

Stain

Stain is a measure of a coating's ability to resist staining by a media. It is generally measured on a scale of 0-10. A "0" indicates that the coating is completely stained with a complete color change of the film observed in all areas. A "10" indicates that the coloration of the coating is unchanged from before it was subjected to the staining environment.

Pencil Hardness

This test measures the hardness of a cured coating. Pencil hardness was assessed using ASTM D3363, with the test run against metal grain. The data is reported in the form of the last successful pencil prior to film rupture. Thus, for example, if a coating does not rupture when tested with a 2H pencil, but ruptures when tested with a 3H pencil, the coating is reported to have a pencil hardness of 2H.

Metal Exposure

This test measures the ability of a coated substrate to retain its integrity as it undergoes the formation process necessary to produce a fabricated article such as a riveted beverage can end. It is a measure of the presence or absence of cracks or fractures in the formed end. The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted riveted 202 standard opening beverage ends were exposed for a period of approximately 4 seconds to a room-temperature electrolyte solution comprised of 1% NaCl by weight in deionized water. The coating evaluated was present on the interior surface of the beverage end. Metal exposure was measured using a WACO Enamel Rater II (available from the Wilkens-Anderson Company, Chicago, Ill.) with an output voltage of 6.3 volts. The measured electrical current, in milliamps, is reported. End continuities were tested initially and then after the ends were subjected to a boiling Dowfax detergent solution (0.19% in deionized water, the Dowfax 2A1 product is available from Dow Chemical) for 60 minutes. After cooling and drying, the milliamps of current passing through the end was measured again.

Preferred coatings of the present invention initially pass less than 10 milliamps (mA) when tested as described above, more preferably less than 5 mA, most preferably less than 2 mA, and optimally less than 1 mA. After Dowfax, preferred coatings give continuities of less than 20 mA, more preferably less than 10 mA, and even more preferably less than 5 mA.

Solvent Resistance

The extent of "cure" or crosslinking of a coating is measured as a resistance to solvents, such as methyl ethyl ketone (MEK) (available from Exxon, Newark, N.J.). This test is performed as described in ASTM D 5402-93. The number of double-rubs (i.e., one back- and forth motion) is reported. This test is often referred to as "MEK Resistance."

Initial Metal Exposure

This test method determines the amount the inside surface of a can that has not been effectively coated by the sprayed coating in an "inside spray" application. This determination is made through the use of an electrolyte solution (1% NaCl in deionized water). The interior "inside spray" coating is typically applied using a high pressure airless spray. The following film weights are typically used: 1.0 msi for a beer can, 1.5 msi for a soda can, and 2.2 msi for a can intended for use in packaging a "hard-to-hold" product. A typical cure condition would be a minimum bake for 30 minutes at 370° F. (390° F. peak on center dome of can).

The inside spray coated can is filled with this electrolyte solution, and an electrical probe is attached in contact to the outside of the can (uncoated, electrically conducting). A second probe is immersed in the electrolyte solution in the middle of the inside of the can. If any uncoated metal is present on the inside of the can, a current is passed between these two probes and registers as a value on an LED display. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred "inside spray" coatings give metal exposure values of less than 3 mA, more preferred values of less than 2 mA, and even more preferred values of less than 1 mA.

Metal Exposure after Drop can Damage

Drop can damage resistance measures the ability of the coated food or beverage can to resist cracks after being subjected to conditions simulating dropping of a filled can. The presence of cracks is measured by passing electrical current via an electrolyte solution, as previously described in the Initial Metal Exposure section. A food or beverage can coated on the interior with the coating to be tested is filled with an electrolyte solution (1% NaCl in deionized water) and the initial metal exposure is recorded. The electrolyte solution is removed and the can is filled with room-temperature tap water. For two-piece "inside spray" cans, the film weights described in the Initial Metal Exposure test can be used.

The filled can, which does not include a "top" can end, is dropped through a cylindrical tube having a 2 and ⅞ inch internal diameter, can bottom down, onto an impact wedge (e.g., an inclined plane angled upwards at 45 degrees). The impact wedge is positioned relative to the tube such that a dent is formed in the rim area where the can bottom end meets the sidewall (typically referred to as the "chime" of a beverage can). The can is dropped from a height of 24 inches as measured between the can bottom and the point of impact on the impact wedge. The can is then turned 180 degrees, and the process is repeated. Water is then removed from the can and metal exposure is again measured as described above. If there is no damage to the coating, no change in current (mA) will be observed relative to the Initial Metal Exposure value. Typically, an average of at least 5 container runs is recorded. Both metal exposures results before and after the drop are reported. The lower the milliamp value, the better the resistance of the coating to drop damage. Preferred coatings give metal exposure values after drop can damage testing of less than 3.5 mA, more preferred valued of less than 2.5 mA, and even more preferred values of less than 1.5 mA.

EXAMPLES

The following examples are offered to aid in understanding of the present invention and are not to be construed as limiting the scope thereof. Unless otherwise indicated, all parts and percentages are by weight. The constructions cited were evaluated by tests as follows:

Example 1: Diepoxides of Ortho-Substituted Dihydric Phenols

Run I: Diglycidyl ether of 4,4'-methylenebis(2,6-di-tert-butylphenol)

A solution of 4,4'-methylenebis(2,6-di-t-butylphenol) (500 grams, 1.076 moles obtained from Albemarle Corporation) in anhydrous dimethylformamide (1.5 liters) was cooled to −10° C. and a solution of sodium tert-pentoxide (374 grams, 3.23 moles) in anhydrous dimethylformamide (1.5 liters) was added drop wise at −10 to −5° C. The mixture was stirred for 30 minutes at −10° C. Epichlorohydrin (1.9 liters, 24.2 moles) was added via dropping funnel at −10 to −5° C. The solution was allowed to warm up to room temperature and then was heated for 16 hours at a temperature of from 75 to 82° C. After cooling down to ambient temperature, the mixture was added to cold tap water (12 liters). Ethyl acetate (5 liters) was added to the mixture, which was stirred for 10 minutes and separated. The aqueous layer was extracted again with additional ethyl acetate (3 liters). The combined ethyl acetate extracts were washed twice with brine (2×6 liters), dried over anhydrous sodium sulfate (600 grams), and filtered. The solvent was removed under reduced pressure to give 887 grams of crude product as a purple oil. The crude product was dissolved in toluene (600 milliliters) and passed over a silica gel pad (1.4 kilograms), and eluted with a mixture of toluene and heptane (8 parts toluene to 2 parts heptane). The fractions containing product were combined and evaporated under reduced pressure. The product was mostly the desired diepoxide (756 grams, yellow oil which crystallizes in time), with some monoepoxide present. The purified material (756 grams) was dissolved at 70° C. in 2-propanol (2.3 liters) and then allowed to cool down to room temperature overnight. The flask was kept in an ice-water bath for 3 hours, filtered and the solids were washed three times with cold 2-propanol (3×400 milliliters). The obtained solid was dried under high vacuum at ambient temperature to give the final product as a white solid (371 grams having an HPLC purity of 95.2%, and a yield of 60%). The epoxy value of the final product was 0.367 equivalents per 100 grams. The resulting diglycidyl ether of 4,4'-methylenebis(2,6-di-t-butylphenol) was tested using suitable genotoxicity assays (e.g., Ames II assay) and was found to be non-genotoxic.

Run II: Diglycidyl ether of 4,4'Butylidenebis(2-t-butyl-5-methylphenol))

A 20-gram batch of the diglycidyl ether of 4,4'-butylidenebis(2-t-butyl-5-methylphenol) was prepared by reacting epichlorohydrin with 4,4'-butylidenebis(2-t-butyl-5-methylphenol). Multiple purification steps were required to obtain a suitably pure batch. The purified batch exhibited an epoxy value of 0.402 equivalents per 100 grams. The resulting diglycidyl ether of 4,4'-butylidenebis(2-t-butyl-5-methylphenol) was tested using suitable genotoxicity assays (e.g., Ames II assay) and was found to be non-genotoxic.

Run III: Diglycidyl ether of 4,4'-methylenebis(2,6-dimethylphenol)

4,4'-Methylenebis(2,6-dimethylphenol) (32 grams, 0.125 moles), epichlorohydrin (140 milliliters, 1.79 moles), and 2-propanol (150 milliliters) were heated to 80° C. in an oil bath. Sodium hydroxide (12.5 grams, 0.313 moles) in water (20 milliliters) was added in portions over 5 minutes. The purple solution was heated for 2 hours at 80° C. The mixture was cooled to room temperature, filtered, and concentrated on a rotary evaporator at a temperature of about 30-40° C. The remaining oil was mixed with dichloromethane (50 milliliters) and heptane (100 milliliters) and allowed to stir for 30 minutes at ambient temperature. The salts were removed by filtration and the filtrate was concentrated on a rotary evaporator at 30-40° C. The remaining oil was dried under high vacuum at ambient temperature until a constant weight was obtained. The crude product was crystallized twice from methanol (250 milliliters) and dried under high vacuum at ambient temperature until a constant weight was obtained. The experiment generated diglycidyl ether of 4,4'-methylenebis(2,6-dimethylphenol) (28 grams, 60% yield) as a white solid. The epoxy value was 0.543 equivalents per 100 grams.

Example 2: Dihydric Phenol Adducts

Run I: Dihydric Phenol Adduct of 1 mole 4,8-Bis (hydroxymethyl)tricyclo[5.2.1.0]decane with 2 moles of 3-hydroxy benzoic acid To a 4-neck round-bottom flask equipped with a mechanical stirrer, a water-cooled condenser on top of a Dean-Stark Trap, and a thermocouple connected to heating control device and a heating mantle was added 249.24 parts of tricyclodecane dimethanol or "TCDM" (from OXEA), 350.76 parts of 3-hydroxybenzoic acid (from Aldrich), and 0.6 parts of a polymerization catalyst. Stirring and heating was begun over 4 hours until the batch reached 230° C. The batch was heated at 230° C. for 4 more hours, at which time about 43 parts of water was collected and the acid value was 2.0 mg KOH/gram. At that time, heating was discontinued until the batch reached 120° C., at which time the batch was discharged. The material was a solid at room temperature that could be broken up.

Run II: Dihydric Phenol Adduct of 1 mole 4,8-Bis (hydroxymethyl)tricyclo[5.2.1.0]decane with 2 moles of 4-hydroxy phenylacetic acid To a 4-neck round-bottom flask equipped with a mechanical stirrer, a water-cooled condenser on top of a Dean-Stark Trap, and a thermocouple connected to heating control device and a heating mantle was added 235.3 parts of TCDM (from OXEA), 364.7 parts of 4-hydroxy phenyl acid (from Aceto), and 0.65 parts of polymerization catalyst. Stirring and heating was begun over 7 hours until the batch reached 230° C. The batch was heated at 230° C. for 8 more hours, at which time a total of 40 parts of water were collected and the acid value was 1.8 mg KOH/gram. At that time, heating was discontinued until the batch reached 120° C., at which time the batch was discharged. The material was a tacky semisolid at room temperature.

Run III: Dihydric Phenol Adduct of 1 mole 1,4-Cyclohexanedimethanol (CHDM) with 2 moles of 3-hydroxy benzoic acid To a 4-neck round-bottom flask equipped with a mechanical stirrer, a water-cooled condenser on top of a Dean-Stark Trap, and a thermocouple connected to heating control device and a heating mantle was added 228.6 parts of the CHDM-90 product (90% cyclohexane dimethanol in water from Eastman), 394.2 parts of 3-hydroxybenzoic acid (from Aceto), and 0.6 parts polymerization catalyst. Stirring and heating was begun over 4 hours until the batch reached 230° C. The batch was heated at 230° C. for 8 more hours, at which time 70 parts of water were collected and the acid value was 1.6 mg KOH/gram. At that time, heating was discontinued until the batch reached 120° C., at which time the batch was discharged. The material was a solid at room temperature that could be broken up.

Run IV: Dihydric Phenol Adduct of 1 mole 1,4-Cyclohexanedimethanol (CHDM) with 2 moles of 4-hydroxy phenylacetic acid To a 4-neck round-bottom flask equipped with a mechanical stirrer, a water-cooled condenser on top of a Dean-Stark Trap, and a thermocouple connected to heating control device and a heating mantle was added 214.3 parts of the CHDM-90 product, 407.1 parts of 4-hydroxy phenylacetic acid (from Aceto), and 0.6 parts polymerization catalyst. Stirring and heating was begun over 4 hours until the batch reached 230° C. The batch was heated at 230° C. for 6 more hours, at which time 65 parts of water were collected and the acid value was 3.0 mg KOH/gram. At this time, heating was discontinued until the batch reached 120° C., at which time the batch was discharged. The material was a solid at room temperature that could be broken up.

Example 3: Polyether Polymers

As indicated in the below Table 1, 15 different polyether polymers (i.e., Runs 1 to 15) were made by upgrading various diepoxides ("DGE" in Table 1) of Example 1 with various dihydric phenols of Example 2.

The following general procedure was used to prepare each of the polyether polymers of Runs 1-15 in Table 1: To a 4-neck round-bottom flask equipped with a mechanical stirrer, a water-cooled condenser, and a thermocouple connected to heating control device and a heating mantle was added a specified amount of a diepoxide of Example 1, a specified amount of a dihydric phenol of Example 2 or hydroquinone, 0.1% parts CATALYST 1201 polymerization catalyst (from Shell), and an amount of methylisobutylketone (from Ashland) suitable to take the batch to 95 wt-% solids. Stirring and heating was begun until the batch became homogeneous and reached the temperature indicated Table 1. The batch was held at that temperature until the target epoxy value ("EV") was reached. At that time, heating was discontinued and cyclohexanone (from Ashland) was slowly added until the weight percent solids (or weight percent nonvolatile material) indicated in Table 1 was achieved. The batch was discharged when the temperature was below 70° C. As indicated in the below Table 1, all of polymers Runs 1-10 exhibited good molecular weight build and a high Tg.

The aforementioned methodology can also be used to formulate polyether polymers using the diepoxides of Example 1, Runs II, III, and IV.

TABLE 1

| Run | Ex. 1 DGE | Weight Parts | Dihythic Phenol | Weight Parts | Reaction Temp (° C.) | Target EV | Act. EV | NV** | Mn | Mw | Tg (° C.) |
|---|---|---|---|---|---|---|---|---|---|---|---|
| 1 | Run I | 45.3 | Ex. 2, Run I | 29.7 | 120 | 0.036 | 0.036 | 45.6 | 4280 | 10780 | 91 |
| 2 | Run I | 44.3 | Ex. 2, Run II | 30.7 | 120 | 0.036 | 0.034 | 41.7 | 4240 | 15680 | 82 |
| 3 | Run I | 47.4 | Ex. 2, Run III | 27.6 | 120 | 0.036 | 0.032 | 40.4 | 5200 | 15330 | 94 |
| 4 | Run I | 46.2 | Ex. 2, Run IV | 28.8 | 120 | 0.036 | 0.034 | 43.3 | 5560 | 17800 | 82 |
| 5 | Run I | 46 | Ex. 2, Run III | 29 | 120 | 0.02 | 0.18 | 30.9 | 7380 | 29540 | 99 |
| 6 | Run I | 45.2 | Ex. 2, Run III | 29.8 | 120 | 0.01 | 0.007 | 31.2 | 5870 | 28620 | 97 |
| 7 | Run I | 145.4 | Ex. 2, Run IV | 94.6 | 120 | 0.032 | 0.032 | 42.8 | 5230 | 14970 | 80 |
| 8 | Run I | 142.3 | Ex. 2, Run IV | 97.7 | 120 | 0.021 | 0.021 | 41.9 | 6460 | 26900 | 82 |
| 9 | Run I | 203 | HQ* | 36.96 | 160 | 0.032 | 0.032 | 40.8 | 4700 | 10650 | 100 |
| 10 | Run I | 201.8 | HQ* | 38.2 | 160 | 0.021 | 0.019 | 40.4 | 6100 | 14280 | 105 |
| 11 | Run II | 339.2 | HQ* | 60.8 | 160 | 0.028 | 0.029 | 40.8 | 5700 | 13280 | 98 |
| 12 | Run II | 244.5 | Ex. 2, Run IV | 155.5 | 130 | 0.028 | 0.027 | 41.0 | 3800 | 8320 | 82 |
| 13 | Run II | 250.8 | Ex. 2, Run III | 149.2 | 130 | 0.028 | 0.028 | 40.8 | 6130 | 17570 | 91 |
| 14 | Run III | 63.2 | HQ* | 16.8 | 160 | 0.035 | 0.033 | 39.3 | 5400 | 12900 | 95 |
| 15 | Run III | 41.9 | Ex. 2, Run III | 38.1 | 130 | 0.029 | 0.023 | 42.2 | 7600 | 48900 | 90 |

*HQ stands for hydroquinone.
**NV stands for wt-% non-volatile material.

Example 4: Coating Compositions

The polyether polymer composition of Example 3, Run 2 and Example 3, Run 4 were each cut to a non-volatile content of 35 wt-% using cyclohexanone. Then 20 wt-% (solids on solids) of phenolic crosslinker was added, followed by 0.1 wt-% $H_3PO_4$ (solids on solids) added as a 10% solution in butanol. Thus, were provided two acid-catalyzed 80:20 polyether:phenolic formulations. The coating composition formulated using Example 3, Run 2 is referred to herein as Example 4, Run 1, whereas the coating composition formulated using Example 3, Run 4 is referred to herein as Example 4, Run 2.

Example 5: Coated Substrate

The two coating compositions above, along with an industry standard BPA-based polyether coating composition, were each applied to both 75 #tinplate (ETP) and tin-free steel (TFS). The coatings were drawn down with the appropriate-sized wire bars to obtain coatings having a dry-film thickness of 4.5-5.0 milligrams/square-inch (msi). The coated metal samples were then baked for 12 minutes in a 403° F. (~206° C.) gas-fired oven. 202 sanitary food can ends were formed from the resulting coated plates. Each can end was given a 14-inch-pound reverse impact in the center of the uncoated side of the can end. The can ends were then immersed in two different aggressive food products (i.e., Aggressive Food Products 1 and 2 in Table 2) having an initial temperature of 180° F. (82° C.) and stored for 2 weeks at 120° F. (~49° C.). After 2 weeks, the can ends were removed from the food product, rinsed with water, and evaluated for adhesion, corrosion, stain, and blush. The results are shown in Table 2 below. The coating compositions of Example 4 exhibited coating properties equal to or better than that of the industry standard epoxy coating.

TABLE 2

| Coating Composition | Commercial Control | Example 4, Run 1 | Example 4, Run 2 |
|---|---|---|---|
| ETP | | | |
| Aggressive Food Product 1 | | | |
| Adhesion/Blush | 10/10 | 10/10 | 10/10 |
| Stain/Corrosion | 10/10 | 10/10 | 10/10 |
| Aggressive Food Product 2 | | | |
| Adhesion/Blush | 10/10 | 10/10 | 10/10 |
| Stain/ orrosion | 10/10 | 10/10 | 10/10 |
| TFS | | | |
| Aggressive Food Product 1 | | | |
| Adhesion/Blush | 10/10 | 10/10 | 10/10 |
| Stain/Corrosion | 10/10 | 10/10 | 10/10 |
| Aggressive Food Product 2 | | | |
| Adhesion/Blush | 10/10 | 10/10 | 10/10 |
| Stain/Corrosion | 10/9 | 10/10 | 10/10 |

Example 6: Water-Dispersible Polyether Polymers

Run 1:

To a 4-neck round-bottom flask equipped with a mechanical stirrer, a nitrogen inlet to maintain a nitrogen blanket, a water-cooled condenser, and a thermocouple connected to heating control device and a heating mantle was added 65.34 parts of the diepoxide of Example 1, Run III (i.e., the diglycidyl ether of 4,4'-methylenebis(2,6-dimethylphenol), 17.61 parts of hydroquinone, 0.054 parts CATALYST 1201 catalyst (from Shell), 0.305 parts sorbic acid, and 1.96 parts ethyl carbitol. This mixture was heated with stirring to 125° C., allowed to exotherm to 152° C., then heated at 155° C. for 4 hours until the epoxy value was 0.025 eq/100 g. A water-dispersible polymer was then produced using a mixture of styrene, ethyl acrylate, methylmethacrylate, acrylic acid, and methacrylic acid pursuant to the teachings of U.S. Pat. No. 5,830,952, with the above polyether polymer used in place of the polyether polymer taught in U.S. Pat. No. 5,830,952. The water-dispersible polymer yielded a water-based dispersion having a nonvolatile content of about 40% and an acid value of 15-45 mg KOH/gram.

The resin was formulated into an aqueous finish in the same fashion as a commercial epoxy polymer based on BPA and BADGE and baked on chrome-treated aluminum substrate for 60 seconds at 465° F. (241° C.) to a dry film thickness of 7 msi. The properties of the cured coating including the Example 6, Run 1 resin were similar to that of the commercial epoxy control coating. Table 3 below illustrates some of the coating properties of the Example 6, Run 1 coating relative to the control coating.

TABLE 3

| | Metal Exposure (milliamps) | | | | | |
|---|---|---|---|---|---|---|
| | Before | After | DI Water Retort | | MEK | |
| Coating | Boiling Dowfax | Boiling Dowfax | Blush (W/V)* | Adh. (W/V)* | Double Rubs | Pencil Hardness |
| BADGE/BPA Control | 0.2 | 0.9 | 10/10 | 10/10 | 20-50 | 4H |
| Example 6, Run 1 | 0.1 | 3.1 | 10/10 | 10/10 | 20-50 | 3H |

*Strips of coated aluminum were placed in a pressure cooker filled with deionized water and processed for 90 minutes at 250° F. (121° C.). Afterward, the coated strips were rated for blush and adhesion both in the area where the coated strip was immersed in the liquid ("W") and where the area of the strip was in the vapor phase ("V").

Run 2:

To a 4-neck round-bottom flask equipped with a mechanical stirrer, a nitrogen inlet to maintain a nitrogen blanket, a water-cooled condenser, and a thermocouple connected to heating control device and a heating mantle was added 59.96 parts of the diepoxide of Example 1, Run II (i.e., the diglycidyl ether of 4,4'-butylidenebis(2-t-butyl-5-methylphenol)), 39.8 parts of the Example 2, Run 3 dihydric phenol adduct of CHDM and 3-HBA, 0.08 parts CATALYST 1201 catalyst, and 2.22 parts xylene. This mixture was stirred and heated to 130° C. and held for 3 hours, at which time the epoxy value was 0.034 equivalents per 100 grams. 25.05 parts of butyl cellosolve were added, followed by 10.53 parts primary amyl alcohol and 14.47 parts n-butanol while the temperature was stabilized at 120° C. A premixture of methacrylic acid, styrene, and benzoyl peroxide was then added while maintaining the temperature. At the end of the addition, the addition device was flushed with butyl cellosolve. After holding at temperature for 2 hours after the end of the feed, deionized water was added and the temperature was stabilized at 90° C. A room-temperature premix of deionized water and dimethylethanol amine was added over time and the batch was held, followed by subsequent additions of deionized water. The resulting water-based dispersion had a nonvolatile content of about 20% and an acid value of 80-120 mg KOH/gram.

A finish was made by mixing the water-based resin of Example 6, Run 2 with a solution consisting of suitable amounts of phenol-based phenolic resin, t-butyl-phenol-based phenolic resin, and organic solvent. This was followed by an additional let-down of organic solvent and deionized water to yield a spray coating having a #4 Ford cup viscosity of 20 seconds and a nonvolatile content of about 20%. This water-based finish was sprayed on the interior of drawn and ironed ETP food cans and baked for 3.5 minutes at 425° F. (218° C.), yielding a cured coating having a dry film weight of 275 milligrams per can. When tested against a similar BADGE/BPA-based control coating, the coating properties of the coating formulated using the Example 6, Run 2 resin were similar, including corrosion resistance.

Example 7: Preparation of Solid Resin from Advancement of Diglycidyl Ether with Hydroquinone A reaction flask equipped with a mechanical stirrer, thermocouple, nitrogen inlet and vacuum outlet was charged with 900.0 parts of the diglycidyl ether described in Example 1, Run II, having a titrated epoxy value of 0.376 (epoxide equivalent weight=266) (3.383 equivalents). The contents were gently heated under nitrogen blanket until completely melted, then agitation was started and 0.80 parts of ethyltriphenylphosphonium iodide catalyst were added, followed by 124.0 parts of hydroquinone (2.252 equivalents). Heating was continued under a reduced pressure of approximately 50 torr (to reduce the level of residual moisture or other volatiles) to a temperature of 130° C., then heating was continued under atmospheric pressure. When the temperature reached 140° C., external heating was discontinued and the reaction was allowed to exotherm. Over a period of approximately 25 minutes, the reaction temperature increased to a peak exotherm temperature of 181° C. The contents were held for an additional 90 minutes at 180° C., then discharged to shallow aluminum pans and allowed to cool to form a friable solid. The product gave a titrated epoxide equivalent weight of 952 (theoretical target=907), and a melt viscosity of 19.3 P (150° C., 900 RPM, Brookfield CAP 2000).

Example 8: Preparation of the bis(3-hydroxybenzoate) of Cyclohexanedimethanol

A reaction flask equipped with mechanical stirrer, thermocouple, nitrogen inlet, and a Dean-Stark trap under a reflux condenser was charged with 259.6 parts of 1,4-cyclohexanedimethanol (CHDM, 1.8 mol). Agitation was started under a nitrogen blanket, and 497.2 parts of 3-hydroxybenzoic acid (3.6 mol), 3.4 parts of p-toluenesulfonic acid monohydrate (0.018 mol), and 200 parts of xylene were successively added. The contents were heated gradually to reflux and the water of esterification was collected as a lower layer in the Dean-Stark trap. After approximately 12 hours at 145-150° C., approximately 94% of the theoretical quantity of water had been collected, and additional collection of water in the trap had ceased. The bulk of the xylene was removed at ambient pressure, and then vacuum was gradually applied while holding the product at 150° C. When only minimal evolution of volatiles was observed at approximately 50 torr, the product was discharged into a shallow aluminum pan and allowed to cool to ambient temperature.

Example 9: Preparation of Solid Resin from Advancement of Diglycidyl Ether with the bis(3-hydroxybenzoate) of CHDM A reaction flask equipped with mechanical stirrer, thermocouple, nitrogen inlet, and vacuum outlet was charged with 750.0 parts of the diglycidyl ether described in Example 1, Run II having a titrated epoxy value of 0.376 (epoxide equivalent weight=266) (2.819 epoxide equivalents), followed by 315.0 parts of the bis(3-hydroxybenzoate) of CHDM which was prepared according to the procedure of Example 8 (calculated theoretical phenolic equivalent weight of 192.2) (1.639 equivalents), and 1.30 parts of ethyltriphenylphosphonium iodide catalyst. The contents were gradually heated until fully melted at about 90° C., then agitation was started and the pressure was reduced to approximately 50 torr in order to remove residual volatiles. Heating was continued to a temperature of 140° C., at which point external heating was discontinued. The reaction was allowed to exotherm, and the vacuum was broken once the temperature reached 145° C. The exotherm continued over the course of approximately 30 minutes to a peak temperature of 158° C. The temperature set-point was increased to 160° C. and the product was held for an additional 2 hours before discharge. The final product gave a titrated epoxide equivalent weight of 1016 (theoretical target 903) and a melt viscosity of 39.0 P (150° C., 900 RPM, Brookfield CAP 2000).

Examples 10-12: Preparation of Powder Coatings

The solid resins from Examples 7 and 9 were broken into smaller flake size using a high-intensity paddle mixer (Reos Inc., Cleveland, Ohio) for two cycles of 10 seconds each at approximately 1,000 revolutions-per-minute ("RPM"). The resins were then combined with the additional ingredients listed in Table 4. The composition shown in Example 10 is a comparative example based upon a conventional commercially available BPA-based epoxy resin. All quantities in Table 4 are expressed in parts by weight.

TABLE 4

| Ingredient | Comparative Example 10 | Example 11 | Example 12 |
|---|---|---|---|
| Epon 2004 | 900.0 | | |
| Epoxy Upgrade from Example 7 | | 900.0 | |
| Epoxy Upgrade from Example 9 | | | 900.0 |
| DYHARD 100S | 27.0 | 27.0 | 27.0 |
| 2-methylimidazole | 2.0 | 2.0 | 2.0 |
| ESCAT 60 | 10.0 | 10.0 | 10.0 |
| RESIFLOW PF-67 | 13.0 | 13.0 | 13.0 |
| R2899 Red Iron Oxide | 42.0 | 42.0 | 42.0 |
| VANSIL W-20 | 325.0 | 325.0 | 325.0 |

Further explanation of certain ingredients included in Table 4 is provided below. EPON 2004 is a conventional BPA-based epoxy resin available from Hexion, Columbus, Ohio Dyhard 100S is a micronized grade of dicyandiamide treated with silica dry flow agent, available from Alzchem, Trostberg, Germany. Dyhard MI is a micronized form of 2-methylimidazole available from Alzchem. Resiflow PF-67 is a polyacrylate flow control agent available from Estron Chemical, Calvert City, Ky. Escat 60 is an alkyl imidazole on a silica carrier, available from Estron chemical, Calvert City, Ky. R2899 Red Iron Oxide was obtained from Rockwood Pigments, Beltsville, Md. Vansil W-20 is a wollastonite pigment available from R. T. Vanderbilt Company, Norwalk, Conn.

The ingredients in Table 4 were dry blended in a Reos high-intensity paddle mixer for two cycles of ten seconds each at approximately 1000 RPM. After dry blending, the samples were extruded in a Coperion ZSK-30 extruder operating at approximately 200 RPM with temperature set points of 90° C. in zone 1 and 110° C. in zone 2. The extrudate was discharged through chilled rollers, and the resulting solid flake was ground in a Mikropul Bantam laboratory mill and then sieved through a 94 mesh screen.

Samples of the finished powder coatings were electrostatic sprayed at approximately 70 kilovolts onto 0.5 mm thick cold rolled steel panels and baked for 30 minutes at 220° C. Film properties were as shown in Table 5. The test method for impact resistance can be found in ASTM D2794.

TABLE 5

| Test | Comparative Example 10 | Example 11 | Example 12 |
|---|---|---|---|
| Adhesion | 9 | 9 | 10 |
| Pencil Hardness | 3H | 3H | 3H |
| Impact Resistance (direct) | 80 inch-pounds | 80 inch-pounds | 80 inch-pounds |
| Solvent Resistance (MEK Double Rubs) | 50 | 20 | 50 |

Example 13: Powder Coating Composition

The powder compositions as described in Examples 10-12 are repeated except the dicyandiamide is increased to 36 parts and the accelerators are replaced with triphenyl phosphine.

Example 14: Powder Coating Composition

The powder compositions as described in Examples 10-12 are repeated except the dicyandiamide is increased to 36 parts and the accelerators are replaced with Curezol C17Z accelerator (available from Air Products, Allentown, Pa.).

Example 15: Synthesis of the diglycidyl ether of 4,4'-(1,4-Phenylenebis(propane-2,2-diyl))diphenol and a Polyether Polymer Therefrom 4,4'-(1,4-Phenylenebis(propane-2,2-diyl))diphenol (51.3 grams, 0.125 moles), epichlorohydrin (140 milliliters, 1.79 moles), and 2-propanol (150 milliliters) is heated to 80° C. in an oil bath. Sodium hydroxide (12.5 grams, 0.313 moles) in water (20 milliliters) is added in portions over 5 minutes. The solution is heated for 2 hours at 80° C. The mixture is cooled to room temperature, filtered, and concentrated on a rotary evaporator at a temperature of about 30-40° C. The remaining oil is mixed with dichloromethane (50 milliliters) and heptane (100 milliliters) and allowed to stir for 30 minutes at ambient temperature. The salts are removed by filtration and the filtrate is concentrated on a rotary evaporator at 30-40° C. The remaining oil is dried under high vacuum at ambient temperature until a constant weight is obtained. The experiment is expected to generate the diglycidyl ether of 4,4'-(1,4-Phenylenebis(propane-2,2-diyl))diphenol (34 grams, 60% yield). The epoxy value is expected to be about 0.44 equivalents per 100 grams.

To a 4-neck round-bottom flask equipped with a mechanical stirrer, a nitrogen inlet to maintain a nitrogen blanket, a water-cooled condenser, and a thermocouple connected to heating control device and a heating mantle is added 30 parts of the diglycidyl ether of 4,4'-(1,4-Phenylenebis(propane-2, 2-diyl))diphenol, 20.7 parts of 4,4'-(1,4-Phenylenebis(propane-2,2-diyl))diphenol (or, alternatively, a suitable amount of any other upgrade dihydric phenol such as, e.g., hydroquinone), 0.05 parts polymerization catalyst, and 2.66 parts methylisobutyl ketone. This mixture is heated with stirring to 125° C., allowed to exotherm, and is then heated at 160° C. for 3 hours until the epoxy value is 0.032 eq/100 g. At this point to the mixture is added 48 parts cyclohexanone, while the mixture is cooled to 70° C. The batch is discharged affording a solvent-based polymer with a nonvolatile content of 50% and an Epoxy value of 0.030 eq/100 grams.

A packaging coating composition may be formulated pursuant to the methods and materials included herein using the resulting polyether polymer.

Example 15a: Preparation of Resin from Advancement of 4,4'-methylenebis(2,6-dimethylphenol)DGE and 4,4'-methylenebis(2,6-dimethylphenol) using 1-azabicyclo[2.2.2]octane catalyst To a flask equipped with a mechanical stirrer, nitrogen inlet, a thermocouple connected to a heat controlling device, and a water cooled condenser was added 126.29 parts 4,4'-methylenebis(2,6-dimethylphenol) diglycidyl ether ("DGE") (Epoxy Value=0.502), 73.71 parts 4,4'-methylenebis(2,6-dimethylphenol), 0.2 parts 1-azabicyclo[2.2.2]octane, and 6.19 parts methyl isobutyl ketone. This mixture was heated with stirring to 125° C., where it became homogeneous and dissolved. The batch was allowed to exotherm to about 159° C., at which time the batch was heated to 160° C. and held for a total of 3 hours. The batch was increased in temperature to 170° C. and held for 7.5 hours. The epoxy value at this point was determined to be 0.032. The batch was then diluted with 250 parts cyclohexanone as it was cooled to room temperature. The solids were determined to be 43.3%, the epoxy value was 0.030 eq/100 g.

Example 15b: Preparation of Resin from Advancement of 4,4'-methylenebis(2,6-dimethylphenol)-DGE and 4,4'-methylenebis(2,6-dimethylphenol) using 1,5,7-triazabicyclo[4.4.0]dec-5-ene catalyst To a flask equipped with a mechanical stirrer, nitrogen inlet, a thermocouple connected to a heat controlling device, and a water cooled condenser was added 126.29 parts 4,4'-methylenebis(2,6-dimethylphenol)-DGE (Epoxy Value=0.502), 73.71 parts 4,4'-methylenebis(2,6-dimethylphenol), 0.2 parts 1,5,7-triazabicyclo[4.4.0]dec-5-ene, and 6.19 parts methyl isobutyl ketone. This mixture was heated with stirring to 130° C., where it became homogeneous and dissolved. The batch was allowed to exotherm to about 181° C., at which time the batch was allowed to cool to 170° C. and held for a total of 4.5 hours. The batch was then diluted with 226.9 parts cyclohexanone as it was cooled to room temperature. The solids were determined to be 38.6%, the epoxy value was 0.019 eq/100 g.

Comparative Example 15c: Preparation of Resin from Advancement of 4,4'-METHYLENEBIS(2,6-DIMETHYLPHENOL)-DGE and 4,4'-METHYLENEBIS(2,6-DIMETHYLPHENOL) using 1,2,2,6,6-pentamethylpiperidine catalyst To a flask equipped with a mechanical stirrer, nitrogen inlet, a thermocouple connected to a heat controlling device, and a water cooled condenser was added 126.29 parts 4,4'-methylenebis(2,6-dimethylphenol)-DGE (Epoxy Value=0.502), 73.71 parts 4,4'-methylenebis(2,6-dimethylphenol), 0.2 parts 1,2,2,6,6-pentamethylpiperidine, and 6.19 parts methyl isobutyl ketone. This mixture was heated with stirring to 130° C., where it became homogeneous and dissolved. The batch was allowed to exotherm to about 145° C., at which time the batch was heated to 170° C. and held for a total of 1.25 hours. There was no viscosity increase during this time, indicating very little polymerization had occurred. Another shot of catalyst was added and the batch was heated another 5 hours and no viscosity increase was observed.

Comparative Example 15d: Preparation of Resin from Advancement of 4,4'-METHYLENEBIS(2,6-DIMETHYLPHENOL)-DGE and 4,4% METHYLENEBIS(2,6-DIMETHYLPHENOL) using 1,4-diazabicyclo[2.2.2]octane catalyst To a flask equipped with a mechanical stirrer, nitrogen inlet, a thermocouple connected to a heat controlling device, and a water cooled condenser was added 126.29 parts 4,4'-methylenebis(2,6-dimethylphenol)-DGE (Epoxy Value=0.502), 73.71 parts 4,4'-methylenebis(2,6-dimethylphenol), 0.2 parts 1,4-diazabicyclo[2.2.2]octane, and 6.19 parts methyl isobutyl ketone. This mixture was heated with stirring to 130° C., where it was homogeneous and dissolved. The batch was heated to 150-170° C. for 6 hours. There was no viscosity increase during this time, indicating very little polymerization had occurred.

Example 15e: Preparation of Resin from Advancement of 4,4'-METHYLENEBIS(2,6-DIMETHYLPHENOL)-DGE and 4,4'-METHYLENEBIS(2,6-DIMETHYLPHENOL) using DBN catalyst To a flask equipped with a mechanical stirrer, nitrogen inlet, a thermocouple connected to a heat controlling device, and a water cooled condenser was added 178.46 parts 4,4'-methylenebis(2,6-dimethylphenol)-DGE (Epoxy Value=0.498), 113.50 parts 4,4'-methylenebis(2,6-dimethylphenol), 0.43 parts DBN catalyst, and 20.43 parts methyl isobutyl ketone. This mixture was heated with stirring to 125° C., until it became homogeneous and dissolved, was then allowed to exotherm to about 172° C., at which time the batch was heated to 160° C. and held for a total of 10 hours. The batch was then diluted with 31.27 parts cyclohexanone, 226.34 parts toluene and 226.34 parts methyl ethyl ketone as it was cooled to room temperature. The solids were determined to be 37.0%, the epoxy value was 0.017 eq/100 g.

Example 15f: Preparation of Resin from Advancement of 4,4'-METHYLENEBIS(2,6-DIMETHYLPHENOL)-DGE and 4,4'-METHYLENEBIS(2,6-DIMETHYLPHENOL) using DBU catalyst To a flask equipped with a mechanical stirrer, nitrogen inlet, a thermocouple connected to a heat controlling device, and a water cooled condenser is added 126.29 parts 4,4'-methylenebis(2,6-dimethylphenol)-DGE (Epoxy Value=0.502), 73.71 parts 4,4'-methylenebis(2,6-dimethylphenol), 0.2 parts DBU catalyst, and 6.19 parts methyl isobutyl ketone. This mixture is heated with stirring to 125° C., until it becomes homogeneous and dissolved, is then allowed to exotherm to about 159° C., at which time the batch is heated to 160° C. and held for a total of 3 hours. The batch is increased in temperature to 170° C. and held for 7.5 hours. The batch is then diluted with 250 parts cyclohexanone as it is cooled to room temperature.

Examples 16A-G: Preparation of Resins Using Various Materials

The following DGE oligomers and diphenols were loaded in a glass vessel and heated to 140° C. for melting. As soon as the mixture was a clear liquid, catalyst was added. Then, the mixture was slowly heated to 190° C. The mixture was maintained at 190° C. until targeted WPE is reached, then cooled and thinned. The ingredients used and results are shown in the Tables 16A and 16B below.

TABLE 16A

|  | Ex. 16A | Ex. 16B | Ex. 16C | Ex. 16D |
|---|---|---|---|---|
| DGE oligomer | TCFDGE | BUDGE VA015 | TCFDGE | BUDGE V A015 |
| Diphenol | Lowinox 44B25 | Lowinox 44B25 | 4,4'-methylenebis(2,6-dimethylphenol) | 4,4'-methylenebis(2,6-dimethylphenol) |
| Catalyst | DBN | DBN | DBN | DBN |
| Catalyst % on solid | 0.5% | 0.5% | 0.5% | 0.6% |
| Targeted WPE (g/mol) | 2200 | 2199 | 2206 | 2197 |
| synthesis T° | 190° C. | 190° C. | 190° C. | 190° C. |
| synthesis NVC | 100% | 100% | 100% | 100% |
| Theoretical NVC | 60% | 58% | 60% | 60% |
| Final specifications |  |  |  |  |
| NVM (30' @ 180° C.) | 60.2% | 57.7% | 60.2% | 60.3% |
| Noury 25° C. (P) | 106 | 78 | 132 | 208 |
| WPE (g/mol) | 2335 | 2268 | 2178 | 2391 |
| Mn (g/mol) | 2762 | 2401 | 2987 | 2619 |
| Mw (g/mol) | 6927 | 6097 | 6588 | 6209 |
| Polidispersity | 2.508 | 2.539 | 2.206 | 2.205 |
| free diphenol on liquid | 0.70% | 0.80% | 0.19% | 0.56% |

TCFDGE = 4,4'-methylenebis(2,6-di-t-butylphenol)
BUDGE VA015 = the DGE of 4,4'-Butylidenebis(2-t-butyl-5-methylphenol)
Lowinox 44B25 = 4,4'-Butylidenebis(2-t-butyl-5-methylphenol)

TABLE 16B

|  | Ex. 16E | Ex. 16F | Ex. 16G |
|---|---|---|---|
| Date | Dec. 4, 2012 | Dec. 5, 2012 | Dec. 13, 2012 |
| DGE oligomer | MBDDGE | MBDDGE | MBDDGE |
| Diphenol | MBD | MBD | MBD |
| Catalyst | DBN | DBN | DBN |
| Catalyst % on solid | 0.5% | 0.1% | 0.2% |
| Targeted WPE (g/mol) | 2201 | 2201 | 3500 |
| synthesis T° | 190° C. | 190° C. | 190° C. |
| synthesis NVC | 100% | 100% | 100% |
| Theoretical NVC | 50% | 50% | 50% |
| Final specifications |  |  |  |
| NVM (30' @ 180° C.) | 51.2% | 50.9% | 50.7% |
| Noury 25° C. (P) | 414 | 75 | 307 |
| WPE (g/mol) | 2948 | 2251 | 3664 |
| Mn (g/mol) | 7463 | 5773 | 4659 |
| Mw (g/mol) | 17473 | 13727 | 9854 |
| Polidispersity | 2.341 | 2.378 | 2.115 |

MBD = 4,4'-methylenebis(2,6-dimethylphenol)
MBDDGE = the DGE of 4,4'-methylenebis(2,6-dimethylphenol)

Comparative Example 17

To a flask equipped with a mechanical stirrer, nitrogen inlet, a thermocouple connected to a heat controlling device, and a water cooled condenser was added 15.656 parts 4,4'-methylenebis(2,6-dimethylphenol)-DGE, 9.344 parts 4,4'-methylenebis(2,6-dimethylphenol), 0.025 parts catalyst 1201 (ethyltriphenyl phosphonium iodide), and 1.325 parts methyl isobutyl ketone. This mixture was heated with stirring to 130° C., where it was homogeneous and dissolved. The batch was allowed to exotherm to about 145° C., at which time the batch was heated to 160° C. and held for a total of 25 hours. At this point in time the Epoxy value was determined to be 0.073 equivalents/100 grams. The target was an epoxy value of 0.034. This relatively standard method for polymerization of a diglycidyl ether and a diphenol, was unsuccessful in terms of processing time and obtaining the target epoxy value.

Example 18: Preparation of Polyether Resin

The following charges were prepared:
4,4'-methylenebis(2,6-dimethylphenol): 366.57 g, 1.43 mols
NaOH: 75.60 g, 1.89 mols
Epichlorohydrin: 152.15 g, 1.64 mols To a 3 L flask equipped with an agitator, a thermometer and a condenser were charged 760 g of water, 75.60 g of NaOH and 366.57 g of 4,4'-methylenebis(2,6-dimethylphenol). After several minutes of agitation at 50° C., 152.15 g of epichlorohydrin mixed with 45.6 g of solvesso-100 were added to the reaction mixture. With a combination of exothermic heat of reaction and external heat, the reaction temperature was brought to 95° C. over a period of 25 minutes. The reaction was then held between 95-100° C. for 60 additional minutes.

The mother liquor was decanted from the product and hot water was then introduced to the flask to wash the taffy resin. The mixture was continuously agitated at 90° C., and the wash water was decanted. The wash continued until the decanted water was tested neutral and free of salt.

To remove as much as possible of the water from the kettle, the resin was then dried under vacuum at 120° C. The hot resinous product was then poured into a pan to cool.

Example 19

To a flask equipped with a mechanical stirrer, nitrogen inlet, a thermocouple connected to a heat controlling device, and a water cooled condenser was added 159.3 parts 4,4'-methylenebis(2,6-dimethylphenol)-DGE, 90.48 parts 4,4'-methylenebis(2,6-dimethylphenol), 0.25 parts DBN, and 13.15 parts methyl isobutyl ketone. This mixture was heated with stirring to 130° C., where it was homogeneous and dissolved. The batch was allowed to exotherm to about 148° C., at which time the batch was heated to 160° C. and held for a total of 5 hours. At this point in time 236.85 parts cyclohexanone were added as the batch was slowly cooled to room temperature. The Epoxy value was determined to be 0.033 equivalents/100 grams. The target was an epoxy value of 0.035. The solids were 50.8%. The Mn was determined to be 5800 Daltons. As in the tables above, this Mw is quite close to the desired value.

Example 20—Film Properties

The Table below shows the film properties of the resin prepared in Example 19 drawn down on tinplate and tin free steel and baked 10 minutes at 400 F (204° C.):

TABLE 20

| Material | Ex. 20A Wt % | Ex. 20A Charge | Ex. 20B Wt % | Ex. 20B Charge | Ex. 20C Wt % | Ex. 20C Charge |
|---|---|---|---|---|---|---|
| Ex. 19 Resin (50%) | 69.79 | 16.0976 | — | — | — | — |
| Cyclohexanone | 30.21 | 6.9677 | 15.00 | 3.8216 | — | — |
| Ex. 20A Resin | — | — | 74.35 | 18.9407 | — | — |
| Ex. 20B Resin | — | — | — | — | 97.87 | 15.9317 |
| Cresol based phenolic resin (available as PR612 from Cytec/Allnex) (80.0%) | — | — | 10.65 | 2.7140 | — | — |
| BYK-310 | — | — | — | — | 0.63 | 0.1030 |
| Phosphoric acid solution (92.05 Glycol Ether EB + 7.95 parts 85% Phosphoric Acid) | — | — | — | — | 1.50 | 0.2449 |
| Total: | 100.00 | 23.0653 | 100.00 | 25.4763 | 100.00 | 16.2796 |
| NVM: | 34.9% | | 34.5% | | 34.5% | |
| Resin/Crosslinker (sos): | 100/0 | | 75/25 | | 75/25 | |
| Film Wt (mg/in$^2$): | 4.4 | | 3.8 | | 4.8 | |
| Meyer Bar: | .014 | | .014 | | .018 | |
| Bake (Box oven): | 10' @ 400° F. | | 10' @ 400° F. | | 10' @ 400° F. | |
| Substrate: | .25 75# ETP | 75# TFS | .25 75# ETP | 75# TFS | .25 75# ETP | 75# TFS |
| Wetting: | Fair | — | Poor | Poor | Fair-Poor | Fair-Poor |
| Visual Gloss: | High | — | High | High | High | High |
| Visual Clarity: | Clear | — | Clear | Clear | Clear | Clear |
| Visual Color: | V. Light Gold | — | Gold | Gold | Gold | Gold |
| Adhesion: | 10 | — | 10 | 10 | 10 | 10 |
| MEK (Double Rubs): | 3 | — | 30 | 30 | >100 | >100 |
| Rev. Imp. Crazing (36 in-lbs): | Fail (0) | — | Pass (10) | Pass (10) | Pass (10) | Pass (10) |
| Process (90' @ 250° F.): | | | | | | |
| Blush (W/WV) | — | — | 9/10 | — | 10/10 | — |
| Adhesion (W/WV) | — | — | 10/10 | — | 10/10 | — |

As can be seen in the above Table 20, when formulated as in 3, the MEK rubs, craze resistance, and water process results are very good.

This application incorporates by reference the disclosures of each of the following: US 2013/0206756 [Attorney Docket Number 06-2085-0101] and US 2013/0316109 [Attorney Docket Number 06-2085-0102] which were both filed on Aug. 9, 2012 and entitled "Compositions for Containers and Other Articles and Methods of Using Same" and filed as Continuations in Part of International Application Numbers PCT/US2012/024191 and PCT/US2012/024193 which were both filed on Feb. 7, 2012 and entitled "Coating Compositions for Containers and Other Articles and Methods of Coating" each of which claims the benefit of U.S. Provisional Application 61/440,085 filed on Feb. 7, 2011 and entitled "Coating Compositions for Containers and Other Articles and Methods of Coating" and U.S. Provisional Application 61/579,072 filed on Dec. 22, 2011 and entitled "Coating Compositions for Containers and Other Articles and Methods of Coating"; U.S. Provisional Application 61/681,394 entitled "Compositions for Containers and Other Articles and Methods of Using Same" (Attorney Docket Number 06-2223-010A) filed Aug. 9, 2012; U.S. Provisional Application 61/681,434 entitled "Compositions for Containers and Other Articles and Methods of Using Same" (Attorney Docket Number 06-2224-010A) filed Aug. 9, 2012.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A food or beverage packaging container, comprising a coating on an interior surface thereof that is made from a coating composition including a polyether polymer having a polydispersity index of from about 2 to about 3.5, a number average molecular weight (Mn) of at least 2,000, and a glass transition temperature (Tg) of at least 60° C., wherein the polyether polymer is a reaction product of reactants including:
   (i) a diepoxide compound, and
   (ii) a hindered polyhydric phenol compound having an atom or group with an atomic weight of at least 15 Daltons in an ortho position relative to an oxygen atom on a phenol ring; and
   wherein the polyether polymer includes at least 25% by weight of aryl or heteroaryl groups and
   wherein the coating composition is substantially free of bisphenol A, bisphenol F, bisphenol S, polyhydric phenols having estrogenic activity greater than or equal to that of bisphenol S, and epoxides thereof.

2. The food or beverage packaging container of claim 1, wherein the coating composition contains less than about 0.5 wt-% of vinyl chloride materials, if any, and wherein the hindered polyhydric phenol compound has the below Formula (III):

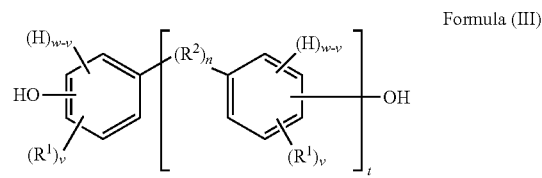

Formula (III)

wherein:
H denotes a hydrogen atom, if present;
v is independently 1 to 4;
w is 4;
$R^2$, if present, is a divalent group;
each $R^1$ is independently an atom or group having at atomic weight of at least 15 Daltons that is substantially non-reactive with an epoxy group, and at least one $R^1$ or $R^2$ group is in an ortho position relative to the oxygen atom on each phenol ring;
n is 0 or 1, with the proviso that if n is 0, the phenylene groups depicted in Formula (I) can optionally join to form a fused ring system (e.g., a substituted naphthalene group) in which case w is 3 (as opposed to 4) and v is 0 to 3 (as opposed to 3);
t is 0 or 1; and
two or more $R^1$ and/or $R^2$ groups can optionally join to form one or more cyclic groups.

3. The food or beverage packaging container of claim 2, wherein each phenol group independently has two ortho groups, relative to the hydroxyl group, selected from $R^1$, $R^2$, or a combination thereof.

4. The food or beverage container of claim 2, wherein the hindered polyhydric phenol compound of Formula (III) has an atomic weight of less than 600 Daltons and constitutes at least about 30% by weight of the polyether polymer.

5. The food or beverage packaging container of claim 1, wherein the hindered polyhydric phenol compound comprises 4,4'-methylenebis(2,6-dimethylphenol).

6. The food or beverage packaging container of claim 1, wherein the hindered polyhydric phenol compound constitutes at least about 30% by weight of the polyether polymer.

7. The food or beverage packaging container of claim 1, wherein the diepoxide compound has the below Formula (II):

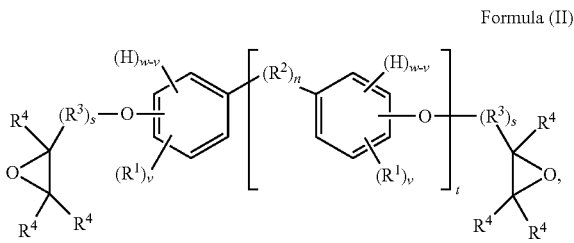

Formula (II)

wherein:
H denotes a hydrogen atom, if present;
v is independently 0 to 4;
w is 4;
$R^2$, if present, is a divalent group;
each $R^1$ is independently an atom or group having at atomic weight of at least 15 Daltons that is substantially non-reactive with an epoxy group, and at least one $R^1$ or $R^2$ group is in an ortho position relative to the oxygen atom on each phenol ring;

n is 0 or 1, with the proviso that if n is 0, the phenylene groups depicted in Formula (I) can optionally join to form a fused ring system (e.g., a substituted naphthalene group) in which case w is 3 (as opposed to 4) and v is 0 to 3 (as opposed to 3);

t is 0 or 1;

two or more R¹ and/or R² groups can optionally join to form one or more cyclic groups;

s is 0 to 1;

R³, if present, is a divalent group; and each R⁴ is independently a hydrogen atom, a halogen atom, or a hydrocarbon group that may include one or more heteroatoms.

8. The food or beverage packaging container of claim 1, wherein the diepoxide compound has a formula other than that of Formula (II):

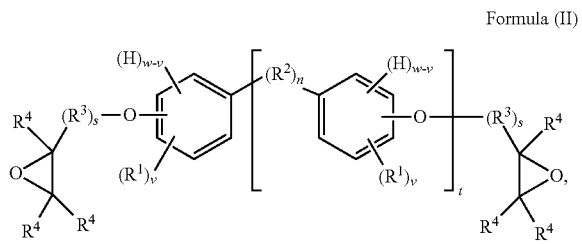

Formula (II)

wherein:

H denotes a hydrogen atom, if present;

v is independently 0 to 4;

w is 4;

R², if present, is a divalent group;

each R¹ is independently an atom or group having at atomic weight of at least 15 Daltons that is substantially non-reactive with an epoxy group, and at least one R¹ or R² group is in an ortho position relative to the oxygen atom on each phenol ring;

n is 0 or 1, with the proviso that if n is 0, the phenylene groups depicted in Formula (I) can optionally join to form a fused ring system (e.g., a substituted naphthalene group) in which case w is 3 (as opposed to 4) and v is 0 to 3 (as opposed to 3);

t is 0 or 1;

two or more R¹ and/or R² groups can optionally join to form one or more cyclic groups;

s is 0 to 1;

R³, if present, is a divalent group; and each R⁴ is independently a hydrogen atom, a halogen atom, or a hydrocarbon group that may include one or more heteroatoms.

9. The food or beverage packaging container of claim 8, wherein the diepoxide compound comprises an aliphatic diepoxide compound.

10. The food or beverage packaging container of claim 1, wherein the diepoxide compound is formed during polymerization of the polyether polymer via the taffy process.

11. The food or beverage packaging container of claim 1, wherein the coating composition includes at least 10 weight percent of the polyether polymer, based on total resin solids.

12. The food or beverage packaging container of claim 1, wherein the coating composition is a water-based coating composition.

13. The food or beverage packaging container of claim 1, wherein the polyether polymer is present as a polyether portion of a polyether-acrylic copolymer.

14. The food or beverage packaging container of claim 1, wherein the coating composition is a solvent-based coating composition.

15. The food or beverage packaging container of claim 14, wherein the solvent-based coating compositions includes no more than 2 weight percent of water, if any, and includes, on a solids basis, from about 50 to about 85 weight percent of the polyether polymer and a phenolic crosslinker or anhydride crosslinker, and wherein the polyether polymer has a Tg of at least 70° C. and Mn of about 7,500 to about 10,500.

16. The food or beverage packaging container of claim 1, wherein the coating has an average coating thickness of from about 2 to about 15 microns, and the polyether polymer has a Tg of at least about 80° C. to less than about 150° C.

17. The food or beverage packaging container of claim 16, wherein the polyether polymer is substantially free of bound polyhydric phenols, or epoxies thereof, having estrogenic activity greater than that of 4,4'-(propane-2,2-diyl)bis(2,6-dibromophenol).

18. The food or beverage packaging container of claim 1, wherein the polyether polymer is completely free of bound polyhydric phenols, or epoxies thereof, having estrogenic activity greater than that of 2,2-bis(4-hydroxyphenyl)propanoic acid.

19. The food or beverage packaging container of claim 1, wherein the coating composition includes a lubricant.

20. The food or beverage packaging container of claim 1, wherein the coating composition includes TiO₂.

21. The food or beverage packaging container of claim 1, wherein the polyether polymer is a reaction product of ingredients including a nitrogen-containing catalyst having at least one bridgehead Nitrogen atom.

22. The food or beverage packaging container of claim 21, wherein the catalyst has a pka of at least 9.

23. The food or beverage packaging container of claim 21, wherein the catalyst comprises a polycyclic amidine base catalysts or an azabicycloalkane or mixtures thereof.

24. The food or beverage packaging container of claim 23, wherein the catalyst is selected from the group consisting of 1,5,7-Triazabicyclo(4.4.0)dec-5-ene; 7-Methyl-1,5,7-triazabicyclo(4.4.0)dec-5-ene; 1,8-diazabicyclo[5.4.0]undec-7-ene; 1,5-diazabicyclo[4.3.0]non-5-ene; 1-Azabicyclo[2.2.2]octane; and similar compounds.

25. The food or beverage packaging container of claim 21, wherein the coating comprises a detectable amount of the a catalyst.

26. A food or beverage packaging container, comprising a coating having average coating thickness of from about 2 to about 15 microns on an interior surface thereof that is made from a coating composition including:

at least about 10 weight percent, based on total resin solids, of a polyether polymer having a polydispersity index of from about 2 to about 3.5, a number average molecular weight (Mn) or at least 2,000, and a glass transition temperature (Tg) of at least about 70° C. to less than about 150° C., wherein the polyether polymer is a reaction product of reactants including:

(i) a diepoxide compound, and (ii) a hindered polyhydric phenol compound;

wherein the hindered polyhydric phenol compound comprises 4,4'-methylenebis(2,6-dimethylphenol) and constitutes at least about 30% by weight (wt %) of the polyether polymer; and about 1.5 wt % to about 30 wt %, based on total resin solids, of crosslinker selected from one or more of a phenolic crosslinker, an anhydride crosslinker, a block isocyanate, a benzoguanamine-formaldehyde resin, a melamine-formaldehyde resin, an etherified melamine-formaldehyde resin, or a urea-formaldehyde resin;
wherein the polyether polymer includes at least 25% by weight of aryl or heteroaryl groups and wherein the coating composition is substantially free of bisphenol A, bisphenol F, bisphenol S, polyhydric phenols having estrogenic activity greater than that of 4,4'-(propane-2,2-diyl)bis(2,6-dibromophenol, and epoxides thereof.

27. The food or beverage packaging container of claim 26, wherein the diepoxide compound comprises a diglycidyl ether of 4,4'-methylenebis(2,6-dimethylphenol).

28. The food or beverage packaging container of claim 26, wherein the diepoxide compound comprises an aliphatic diepoxide compound.

29. The food or beverage packaging container of claim 26, wherein the polyether polymer has an Mn of about 5,000 to about 8,000.

* * * * *